(12) United States Patent
Tatarka et al.

(10) Patent No.: US 6,815,023 B1
(45) Date of Patent: Nov. 9, 2004

(54) PUNCTURE RESISTANT POLYMERIC FILMS, BLENDS AND PROCESS

(75) Inventors: Paul David Tatarka, Woodridge, IL (US); Paul Nick Georgelos, Naperville, IL (US); Scott Allan Idlas, Downers Grove, IL (US)

(73) Assignee: Curwood, Inc., Oshkosh, WI (US)

( * ) Notice: Subject to any disclaimer, the term of this patent is extended or adjusted under 35 U.S.C. 154(b) by 0 days.

(21) Appl. No.: 09/401,692

(22) Filed: Sep. 22, 1999

Related U.S. Application Data

(63) Continuation-in-part of application No. 09/168,282, filed on Oct. 8, 1998, now abandoned, which is a continuation-in-part of application No. 09/110,455, filed on Jul. 7, 1998.

(51) Int. Cl.[7] .......................... B32B 27/00; C08L 33/00
(52) U.S. Cl. .................. 428/34.9; 428/35.1; 428/35.7; 428/26.9; 428/220; 428/500; 428/515; 428/516; 428/518; 428/520; 428/910; 525/221; 525/222; 525/227; 525/237; 525/240; 264/464
(58) Field of Search .......................... 428/220, 515, 428/516, 36.9, 34.3, 34.9, 34.8, 518, 35.1, 35.2, 35.4, 35.5, 357, 520, 910; 525/240, 221, 222, 227, 237; 264/464

(56) References Cited

U.S. PATENT DOCUMENTS

| | | | |
|---|---|---|---|
| 3,456,044 A | 7/1969 | Pahlke | 264/25 |
| 4,064,296 A | 12/1977 | Bornstein et al. | 428/35 |
| 4,178,401 A | 12/1979 | Weinberg et al. | 428/35 |
| 4,247,584 A | 1/1981 | Widiger et al. | 428/35 |
| 4,737,391 A | 4/1988 | Lustig et al. | 428/35 |
| 4,857,399 A | 8/1989 | Vicik | 428/515 |
| 5,055,328 A | 10/1991 | Evert et al. | 428/34.9 |
| 5,272,016 A | 12/1993 | Ralph | 428/516 |
| 5,279,872 A | 1/1994 | Ralph | 428/34.9 |
| 5,283,128 A | 2/1994 | Wilhoit | 428/516 |
| 5,397,613 A | 3/1995 | Georgelos | 428/36.7 |
| 5,397,640 A | 3/1995 | Georgelos et al. | 428/349 |
| 5,403,668 A | 4/1995 | Wilhoit | 428/500 |
| 5,460,861 A | 10/1995 | Vicik et al. | 428/34.9 |
| 5,593,747 A | 1/1997 | Georgelos | 428/36.7 |
| 5,635,261 A | 6/1997 | Georgelos | 428/35.4 |
| 5,707,751 A | 1/1998 | Garza et al. | 428/515 |
| 5,759,648 A | 6/1998 | Idlas | 428/34.9 |
| 5,914,164 A | 6/1999 | Ciocca et al. | 428/36.7 |
| 5,928,740 A | 7/1999 | Wilhoit et al. | 428/34.9 |
| 5,972,444 A | 10/1999 | Patel et al. | 428/35.2 |

FOREIGN PATENT DOCUMENTS

| | | |
|---|---|---|
| EP | 436 196 | 7/1991 |
| GB | 2296005 A | 6/1996 |
| WO | PCT WO 93/13143 | 7/1993 |
| WO | WO 98/38035 | 9/1998 |

*Primary Examiner*—Monique R. Jackson
(74) *Attorney, Agent, or Firm*—Cedric M. Richeson

(57) ABSTRACT

A polymer blend and mono-and multilayer films made therefrom suitable for processing or packaging articles which have an improved combination of properties e.g. such as lower tear strength and higher puncture resistance, or higher puncture resistance at both room temperature in air and at elevated temperatures in contact with water wherein the blend preferably has a first copolymer of ethylene and hexene-1 having a copolymer melting point of 80 to 98° C., preferably of 80 to 92° C.; a second copolymer of ethylene and at least one α-olefin having a copolymer melting point of 115 to 128° C.; and a third copolymer of ethylene and a vinyl ester or alkyl acrylate and having a melting point of 60 to 110° C., and a process for making such films, especially shrink films having at least 40% shrink at 90° C. in at least one direction.

105 Claims, 3 Drawing Sheets

PUNCTURE RESISTANT POLYMERIC FILMS, BLENDS AND PROCESS

CROSS-REFERENCE TO RELATED APPLICATION

This application is a continuation-in part of U.S. application Ser. No. 09/168,282, filed Oct. 8, 1998, now abandoned, which is hereby incorporated by reference, and is a continuation-in-part of U.S. application Ser. No. 09/110,455, filed Jul. 7, 1998, now allowed.

BACKGROUND OF THE INVENTION

The invention relates to thermoplastic $C_2$-α-olefin copolymer resin blends and flexible films thereof having heat sealing and/or puncture resistance properties. Such blends are useful for making films, particularly heat shrinkable, oriented films for packaging articles and for processing and/or packaging food articles, especially cook-in foods subject to pasteurization processes as well as fresh, frozen, or processed foods such as meat, poultry or cheese.

Manufacturers and wholesalers use flexible thermoplastic packaging films to provide economical, sanitary containers which help protect and/or preserve the freshness and wholesomeness of their products. These films are often sold in bag form. For example, a single or multilayer film is made into bags using a tubular film or one or more flat sheets or webs of film by well known processes involving e.g. cutting, folding and/or sealing the film to form bags. These films and bags may be printed and may also be uniaxially or biaxially oriented, heat shrinkable, irradiated, or may contain film layers which are abuse resistant or puncture resistant or which are crosslinked or which enhance or retard or prevent transmission of light, gases, or liquids therethrougb. Frequently, multilayer films having one or more barrier layers to oxygen and/or moisture such as: saran(a polyvinylidene chloride copolymer); a modified saran e.g. containing methyl acrylate polymer units; ethylene vinyl alcohol copolymer; nylon; or acrylonitrile may be used with a heat sealing layer such as a copolymer of ethylene and vinyl acetate (EVA) to produce bags for packaging oxygen and/or moisture sensitive foods e.g. fresh red meat Such bags help preserve meat in its original condition by preventing or reducing moisture loss and chemical changes in the meat structure due to oxidation reactions.

A typical packaging bag has 1–3 sides heat sealed by the bag manufacturer leaving one open side to allow product insertion. For example, a processor may insert ham, poultry, cheese, primal or subprimal meat cuts, ground beef, fruits, vegetables, bread or other products making a final seal to hermetically enclose the product in the bag. This final seal may follow gas evacuation (i.e. vacuum removal) or replacement of the gaseous environment within the bag by one or more gases to provide some advantage such as to assist product preservation. This final seal is frequently a heat seal similar to the initial seals produced by the bag manufacturer although the actual heat sealing equipment may vary.

Thus, bags are made: by transversely sealing tubular stock of monolayer or multilayer film and cutting off the tube portion containing the sealed end; by making two spaced apart transverse seals on tubular stock and cutting open the side of the tube; by superimposing flat sheets of film and sealing on three sides; or by folding a flat sheet and sealing two sides.

Generally heat seals are made by applying sufficient heat and pressure to adjacent film layer surfaces for a sufficient time to cause a fusion bond between the plastic film layers.

A common type of seal used in manufacturing bags is known to those skilled in the art as a hot bar seal. In making a hot bar seal, adjacent thermoplastic layers are held together by opposing bars of which at least one is heated to cause the layers to fusion bond by application of heat and pressure across the area to be sealed. For example, bags may be made from a tube stock by making one hot bar bottom seal transverse to a tubular film. Once the bottom seal is made, the tube stock is transversely cut to form the mouth of the bag.

After a product is inserted, the bag is typically evacuated and the bag mouth sealed to enclose the product. At one time, the standard method for sealing was to fasten a clip around the mouth of the bag. However, heat sealing techniques are now also commonly employed to produce the final closure of the bag. For example, a bag mouth may be either hot bar sealed or impulse sealed. An impulse seal is made by application of heat and pressure using opposing bars similar to the hot bar seal except that at least one of these bars has a covered wire or ribbon through which electric current is passed for a very brief time period (hence the name "impulse"), to cause the adjacent film layers to fusion bond. Following the impulse of heat the bars are typically cooled (e.g. by circulating coolant) while continuing to hold the bag inner surfaces together to achieve adequate sealing strength.

Relative to hot bar seals, impulse seals may be made faster because of the quick cool down of the ribbon following the heat impulse. Impulse seals are also generally narrower giving an improved package appearance, but narrower seals also leave less margin for error in the production of continuous sealed edges. Less area is usually bonded in an impulse seal relative to a hot bar seal, thus the performance of the film's sealing layer is more critical.

Disadvantageously, the film in the seal area often becomes extruded during impulse sealing of known films. This results in thinning of the film and a reduction of film strength in the seal area. In extreme situations, the thinned film is severed or pulled apart. Those skilled in the art refer to severely extruded seals as "burn through" seals. A "burn through" seal does not have adequate strength or integrity to protect the packaged product. One attempt to solve this "burn trough" problem is to irradiate the film prior to manufacture of the bag.

Irradiation of a film made from cross-linkable polymer resins causes resin layers in the film to crosslink. Under controlled conditions, crosslinking by irradiation raises and may also broaden the temperature range for heat sealing, and depending upon the film composition may also enhance puncture resistance of the film. If the heat sealing layer of the thermoplastic film is crosslinked too heavily, it is more difficult to fusion bond which makes achieving strong seals difficult, particularly by impulse sealing. All bag seals must maintain their integrity to preserve and protect enclosed products, especially food products.

There must be a strong continuous seal to prevent unwanted egress and ingress of gaseous, liquid or solid materials between the bag exterior and interior. This is particularly necessary when the package is made of heat shrinkable film and is to be immersed in hot water to shrink the film against the packaged article since such shrinkage increases the stress on these seals. It is even more critical where the packages are to be immersed at sufficient times and temperatures for pasteurization or cooking. Thus, there is a continuing need for films which can be made into bags having strong seals especially those formed by hot bar and/or impulse sealing. Such films should provide strong seals able to withstand a range of temperatures and also be able to make such seals over a wide sealing temperature range without burn through.

Variations in sealing temperatures, times and pressure are known to exist from one brand or type of sealer to another and also between different sealing machines sold under the same brand. This increases the desirability for films that may be usefully sealed on different sealing machines and over a wide range of temperatures to produce strong integral seals.

Another heat sealing problem is that of inadvertent folding. Normally, a heat seal is made by applying heat and pressure across two portions of film, however, occasionally the area to be sealed will be inadvertently folded to produce a section of film having four or six film portions which are pressed between the opposing sealer bars. In such situations it is desirable to be able to seal the film without burn through. A wider impulse heat sealing temperature range is indicative of a greater latitude in sealing through folds than a narrower range.

Another problem during heat sealing is that of excessively high tear propagation strengths. Lower tear propagation strengths are an advantage in heat sealing operations using impulse sealing technology where the sealing apparatus both seals and cuts the film with the film trim being removed by tearing along the cut. Low tear propagation strengths enable quick trim removal without damage to the seal, film or bag.

A very demanding application for heat shrinkable, heat sealable thermoplastic flexible films is for processing meats. Bacterial contamination during food processing e.g. by Listeria monocytogenes is of great concern. To address health and safety concerns with processed foods, some processors have adopted a surface heat treatment at elevated temperatures sufficient to kill bacteria on already cooked food.

In some demanding applications a food product such as a ham is sealed inside a plastic processing bag or film in which the ham is cooked, refrigerated, shipped and subsequently displayed for retail sale.

In a more common demanding application, food such as a turkey breast, ham, or beef is cooked in a pan, net, or processing film from which the cooked food is removed for further processing such as: slicing; smoking in a smokehouse; treatment with colorants and/or flavorants such as caramel, spices, liquid smoke or honey; glazing; and/or removal of liquid (known as purge) resulting from e.g. the cooking process. Following this further processing, the food product is packaged, often in a printed bag, for shipment and sale. The cooked food is typically placed into a heat sealable, heat shrinkable bag which is then emptied of atmospheric gases by vacuum, heat sealed and subjected to a film shrinking operation usually in a water tank at elevated temperature for a brief period of time to produce a compact attractive package. During these steps which follow cooking and occur prior to packaging for shipment and sale, the food product surface is subject to environmental contamination, for example, by airborne particles, microbes, and dust. The risk from contamination after packaging may be minimized by surface pasteurizing the encased sealed package e.g. in a water bath or steam chamber held at elevated temperatures for a time sufficient to provide the desired degree of protection from microbial contamination and growth. The time and temperatures of this post-cooking pasteurization step may vary widely.

Significantly this surface treatment is in addition to the cooking or pasteurization process and follows hermetically sealing the cooked or pasteurized food in a plastic packaging film. In this demanding use, this "post-cooking pasteurization" surface treatment is performed after placing the food into the packaging film that will remain on the pasteurized product through sale to an ultimate customer. Often the films are printed with consumer information and brand identification and frequently at least a portion of the film is clear to allow viewing of the enclosed product. Therefore, optical properties and film appearance are important for consumer appeal and sale.

This "post-pasteurization" film must perform a variety of functions well. It must be puncture resistant and have strong seals at the elevated temperatures encountered in the shrinking operation, and also with the post-cooking pasteurization process. It should also keep tight conformation of the film around the product at refrigeration temperatures with an attractive appearance and act as a good barrier to oxygen, moisture and environmental contaminates.

Various polymers, blends thereof and multilayer films have been employed in attempts to address the above needs and desires of the marketplace. Copolymers of ethylene and vinyl esters such as vinyl acetate have previously been disclosed as useful materials in monolayer and multilayer thermoplastic films and are known for providing heat sealing properties.

An example of a typical fresh red meat bag currently in commerce is a film having three layers which are coextruded and oriented. The core or middle layer of the film is an oxygen and moisture barrier material, the outer layer provides abrasion resistance and is formulated to provide support for the film during the expansion of the primary tube for orientation, and the inner layer provides heat seal properties and contributes to puncture resistance.

The core or barrier layer of this film is a relatively small percentage of total film thickness and is made of polyvinylidene chloride—vinyl chloride copolymer (PVDC or VDC-VC) or vinylidene chloride—methylacrylate copolymer (VDC-MA, or MA-Saran).

The outer layer is thicker than the core layer and is a blend of very low density polyethylene (VLDPE) and EVA. VLDPE, also called ultra low density polyethylene (ULDPE) is a class of ethylene-alpha olefin copolymers having a density ranging from less than 0.915 g/cm$^3$ down to about 0.860 g/cm$^3$, and many commercial VLDPE resins are available having densities from 0.900 up to 0.915 g/cm$^3$. The EVA and VLDPE components contribute to the shrink properties of the film and the VLDPE component contributes to the abrasion and puncture resistance. The VLDPE also adds orientation strength to minimize breaks of the secondary bubble during expansion of the softened primary tube.

By far, the thickest film layer is the inner or heat seal layer. In the above film, this layer is over 60% of the total film thickness and comprises a blend of VLDPE and EVA. The heat seal layer significantly contributes to the puncture resistance of this film. Another desirable characteristic provided by this layer is the heat seal temperature range. It is preferred that the temperature range for heat sealing the film be as broad as possible. This allows greater variation in the operation of the heat sealing equipment relative to a film having a very narrow range. For example, it is desirable for a suitable film to heat seal over a temperature range of 350° F. to 550° F., providing a heat sealing window of 200° F.

Films similar to the general structure and composition as described above have been in commercial use for many years, but efforts continue to be made to increase puncture resistance while maintaining ease of processability, a broad heat seal temperature range and a high degree of both machine direction (MD) and transverse direction (TD) shrink.

Recent developments for improving properties of a heat shrinkable film include U.S. Pat. No. 5,272,016(Ralph). The '016 Patent improves properties of a multilayer nonoxygen barrier film by use of a blend of EVA, VLDPE and a Plastomer.

U.S. Pat. No. 5,635,261 (Georgelos et al) which application is hereby incorporated by reference, disclose EVA blends useful for their heat sealing properties.

U.S. Pat. No. 5,397,640 (Georgelos et al) discloses a multilayer oxygen barrier film using a three component blend of VLDPE, EVA and a Plastomer. (See e.g. Example 7).

U.S. Pat. No. 5,403,668 (Wilhoit) discloses a multilayer heat shrinkable oxygen barrier film using a four component blend of VLDPE, LLDPE, EVA and Plastomer.

U.S. Pat. No. 5,759,648 (Idlas) discloses a five layer film having a $C_3C_2$ heat sealing layer, an EVOH layer, and a VLDPE surface layer connected by special adhesive blend layers. This film is particularly useful in cook-in processing and/or packaging applications.

U.S. Pat. No. 5,928,740 (Wilhoit et al) discloses a flexible film having a blend of an of ethylene alpha-olefin copolymer (EAO) having a melting point (m.p.) between 55 to 75° C.; a second EAO having an m.p. between 85 to 110° C.; and an unmodified thermoplastic polymer of EAO, LDPE, HDPE, or propylene copolymers, having an m.p. between 115 to 130° C. These films may be multilayer, biaxially stretched, heat shrinkable films.

Recent polymer manufacturing changes in catalysts and processes have provided increasing numbers of polymeric resins having different melting characteristics, melting points, and narrower molecular weight distributions (MWD). MWD is the ratio of $M_w/M_n$ where $M_w$ is the weight-average molecular weight of the resin and $M_n$ is the number-average molecular weight. For example, most older EAO and VLDPE resins have a MWD in the range of about 3.5 to 8.0. Improvements in catalysis technology have been able to produce many resins in which this ratio has been reduced to below 3, often in the range of about 1.5 to about 2.5 and most typically about 2.0. A narrower MWD means that the polymer chains of these resins are more uniform in length. A higher MWD resin may be said to comprise polymer chains of more varied lengths. Other changes in resin properties have been attributed to differences in comonomer distribution along an ethylene backbone resulting in materials produced from single-site catalysts having a lower melting point than a multisite catalyst produced polymer of comparable density and melt index. Also, in the case of the above-noted commercial film wherein the heat seal layer is primarily a blend of EVA and VLDPE, it was found that using a more narrow $\overline{M}_w/\overline{M}_n$ VLDPE having a lower melting point in place of a broader $\overline{M}_w/\overline{M}_n$ VLDPE having a higher melting point considerably decreased the operable heat sealing range. For example, where the sealing layer used only a very narrow $\overline{M}_w/\overline{M}_n$, lower melting point VLDPE in the blend, the heat seal temperature was in the order of 400° F. to about 475° F. giving a sealing window of only 75° F.

Past attempts at providing improved puncture resistance and heat sealing in films, while making some progress, leave much to be desired. Variability in heat sealing equipment and process parameters continue to produce bags with weak seals which are subject to tearing and stress on the seals during cutting operations, which are subject to burn through, which fail to seal through folds, and which produce leaking bags having discontinuous seals and which are not sufficiently resistant to punctures. It would be highly desirable to have biaxially stretched, heat shrinkable films and bags which are highly puncture resistant and/or whose heat sealing layer in particular and film construction in general allows greater flexibility and variability in heat sealing process parameters while producing strong, integral, continuous seals rapidly and with a lower failure rate relative to prior art films and bags.

Accordingly, one object of the present invention is to provide a novel polymeric blend having an improved combination of properties.

It is another object to provide a film of sufficient integrity to withstand the cook-in process with intact seals and film layers.

It is another object to provide a film of sufficient integrity to withstand the post-cooking pasteurization with intact seals and film layers.

Another object is to provide a flexible film having improved heat sealing properties.

Another object is to provide a heat shrinkable biaxially oriented monolayer film having improved puncture resistance and/or lower tear propagation strengths.

Another object is to provide a heat shrinkable biaxially oriented multilayer film having low tear propagation strengths.

Another object is to provide a heat shrinkable biaxially oriented multilayer film having improved puncture resistance.

Another object is to provide a heat shrinkable multilayer film having an improved combination of puncture resistance and low tear propagation strengths.

Yet another object is to provide a heat shrinkable, multilayer film having a puncture resistance and heat sealing range suitable for use in the packaging of fresh bone-in meats.

Yet another object is to provide a heat shrinkable, multilayer film having a combination of hot water puncture resistance and heat seal strengths suitable for use in the pasteurization processing of meats and having low haze and high gloss suitable for retail packaging.

A still further object is to provide a heat shrinkable film having an improved combination of optical and heat sealing properties, and puncture and abrasion resistance.

It is an object of the invention to provide a film for packaging foods such as turkey breasts, beef, or hams which are cooked and shipped in the same film.

It is another object of the invention to provide a process for making a processing or packaging, oxygen barrier, multilayer film having excellent optical properties, strong seals, puncture resistance in hot water and at room temperature, and high shrink values at 90° C.

The above and other objects, benefits and advantages of the invention will be apparent from the disclosure below which is exemplary and nonlimiting. It is not necessary that each and every object listed above be found in all embodiments of the invention. It is sufficient that the invention may be usefully employed.

SUMMARY OF THE INVENTION

According to the present invention, a novel biaxially stretched, heat shrinkable, thermoplastic, flexible film comprising at least one layer and suitable for use in making bags for packaging e.g. food articles such as primal and subprimal meat cuts is provided. A special inventive blend of at least three copolymers is suitable to being formed into a wide variety of articles including packaging films useful for packaging food and nonfood items alike. In its various embodiments the inventive blend may be used to fabricate inventive films of superior properties and combinations of properties relative to prior art films. These inventive films may have excellent properties relating to tear propagation strength, optics, puncture and abrasion resistance, heat shrinkability, flexibility, heat sealing properties as well as excellent combinations of such properties. Haze values of 10% or less are achievable.

In various embodiments the inventive film comprises a blend including:
  (a) a first polymer having a melting point of 80 to 98° C., preferably 80–92° C., comprising a copolymer of ethylene and hexene-1;
  (b) a second polymer having a polymer melting point of 115 to 128° C. comprising ethylene and at least one α-olefin; and
  (c) a third polymer having a melting point of 60 to 110° C. comprising a copolymer of ethylene with an alkyl acrylate or vinyl ester; and optionally
  (d) a fourth polymer having a melting point of 80 to 110° C. (preferably of 85 to 105° C.), preferably selected from the group of ethylene homopolymers such as HDPE and LDPE, and ethylene copolymers with at least one α-olefin.

Various embodiments of the present invention provide a biaxially stretched film having an improved combination of properties e.g. especially high puncture resistance values such as maximum puncture forces of at least 70 Newtons and often at least 120 Newtons or higher, and desirably low tear propagation strength (as measured by the Elmendorf Tear Strength Test) e.g. a tear strength "x" such that 10≦x≦40 grams per mil in either or each of the machine or transverse directions or x<25 grams per mil in at least one of the machine direction (M.D.) or transverse direction (T.D.), without sacrificing high shrinkage at 90° C. and other desirable properties. In some embodiments of the invention, films having M.D. and/or T.D. tear strengths of 15 to 25 g/mil (0.59–0.98 g/μ) are achieved. Additional embodiments of the invention include films which achieve: a hot water puncture resistance of at least 100 seconds at 95° C.; a hot water seal strength of at least 200 seconds at 95° C.; a tensile seal strength of at least 400 g/cm at 88° C.; a maximum puncture force of at least 70 Newtons, preferably at least 120 Newtons; a shrinkage value at 90° C. of at least 40% in at least one direction; a haze value of less than 10%; and/or a gloss value at 45° of at least 70 Hunter Units; and preferably combinations of several of these properties.

A preferred four layer embodiment of the invention that is well suited for cook-in or post-cooking pasteurization processing and/or packaging has:
  (a) a heat sealing surface layer of at least 50% by weight of (i) a copolymer of propene and at least one α-olefin selected from the group consisting of ethylene, butene-1, methylpentene-1, hexene-1, octene-1 and mixtures thereof having a propene content of at least 60 wt. %, or (ii) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm$^3$;
  (b) a second polymeric layer having (i) from 5 to 60% of a first copolymer of ethylene and at least one $C_4$–$C_8$ α-olefin, having a melting point of 115° C. to 128° C., (ii) from 10 to 85% of a second copolymer of ethylene and at least one $C_3$–$C_8$ α-olefin having a melting point of 55 to 98° C., and (iii) from 0 to 50% of a third copolymer having a melting point of 60 to 110° C. of ethylene with a vinyl ester or alkyl acrylate, wherein the first and second copolymers have a combined weight percentage of at least 50 weight percent, this weight percent being based upon the total weight of the layer;
  (c) a third layer having at least 80% by weight (based on the third layer's weight) of at least one copolymer of vinylidene chloride with from 2 to 20 weight percent (based on said copolymer(s) weight) of vinyl chloride and/or methyl acrylate; and
  (d) a fourth polymeric layer having (i) from 5 to 60% of a first copolymer of ethylene and at least one $C_4$–$C_8$ α-olefin, having a melting point of 115° C. to 128° C., (ii) from 10 to 85% of a second copolymer of ethylene and at least one $C_3$–$C_8$ α-olefin having a melting point of 55 to 95° C., and (iii) from 0 to 50% of a third copolymer having a melting point of 60 to 110° C. of ethylene with a vinyl ester or alkyl acrylate, wherein the combined weight percentage of the first and second copolymers is at least 50 wt. %, based upon the total weight of this layer; and
  wherein the film has an M.D. and/or T.D. shrinkage value at 90° C. of at least 40%, and a seal strength of at least 400 g/cm at 88° C.

Advantageously, the process of the present invention produces films and bags which are easy to make while having great resistance to puncture and excellent optical properties relative to commercially available prior art films. For example, a process for making biaxially stretched, heat shrinkable film is taught involving the steps of:
  (a) extruding a melt plastified primary tube comprising, e.g. the four layer construction described above, or e.g. 20 to 85 weight percent of a first polymer having a melting point of 80 to 98° C. comprising at least one copolymer of ethylene and hexene-1;

5 to 35 wt. % of a second polymer having a melting point of 115 to 128° C. comprising at least one copolymer of ethylene and at least one α-olefin; and 10 to 50 wt. % of a third polymer having a melting point of 60 to 110° C. comprising at least one copolymer of ethylene and a vinyl ester or an alkyl acrylate; wherein the first and second polymers have a combined weight percentage of at least 50 wt. %, the weight percentage being based upon the total weight of the first, second and third polymers;
  (b) cooling the primary tube;
  (c) reheating the cooled tube to a draw point temperature of 68 to 88° C.;
  (d) biaxially stretching said tube to a circumference of at least 2½ times the circumference of the primary tube; and
  (e) cooling the stretched tube to form a biaxially stretched, heat shrinkable film.

DETAILED DESCRIPTION OF THE INVENTION

Figure 1:
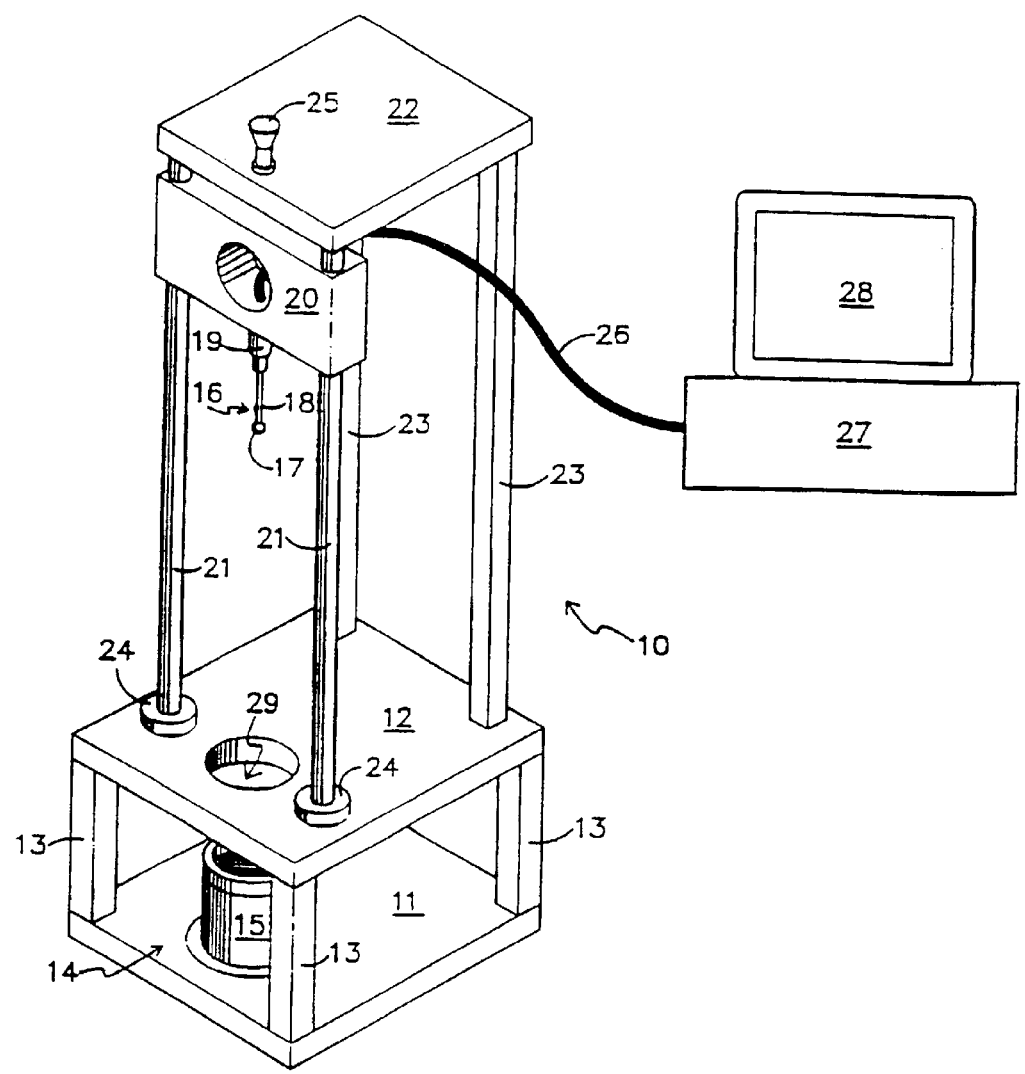
FIG. 1 is a schematic view of a ram puncture tester.

The inventive film, bag, process and package of the present invention may be used as a heat sealable, oxygen and moisture barrier film for holding a foodstuff during cooking and/or for packaging for sale a foodstuff before or after a pasteurization or cooking period. The present invention is particularly well adapted to processing and packaging pasteurized foods, and has particular utility in packaging cook-in hams, turkey breasts and beef. "Cook-in" is the term used to indicate a film or bag in which a foodstuff is pasteurized or cooked. This film or bag is used to hold together, protect and/or form the shape of the foodstuff by a food processor (manufacturer) during the cooking or pasteurization process after which the film may be removed (sometimes termed "stripped"), or may be left on as a protective barrier during shipping, and optionally left on during retail sale.

Benefits of the inventive film include: relatively low permeability to oxygen and water vapor; high delamination resistance and unexpectedly good combinations of shrinkability, seal strengths, puncture resistance, and optical properties especially at elevated temperatures simulating cook-in conditions. The inventive films are easily oriented and may have high shrinkage values at low temperatures (90° C. or lower); superb resistance to degradation by food acids, salts and fat; sufficient residual shrink force to form and maintain a compact product; controllable meat adhesion; good to excellent sealability over a broad temperature range; low levels of extractables complying with governmental regulations for food contact; low haze; high gloss; not imparting off tastes or odors to packaged food; good tensile strength; a printable surface ; high seal strength at room temperature in atmospheric conditions and in contact with water at elevated temperatures for prolonged periods of time e.g. 30 minutes at 205° F. (96° C.), and a long lasting seal under especially demanding conditions e.g. at cook-in temperatures.

Advantageously, a preferred embodiment has low $O_2$ and water vapor permeabilities in combination with high meat adhesion which prevents undesirable cook-out of liquid during processing. In an especially preferred embodiment, the film has at least 30% (preferably 40% or higher) shrinkage values in at least one direction at 90° C. Also, the oxygen barrier properties of the inventive film reduce or eliminate losses from spoilage e.g. by rancidity due to oxidation. The inventive films and bags are particularly useful for processing and/or packaging cook-in foodstuffs, but may also be used as packaging for a wide variety of food and non-food articles.

The invention in all of its embodiments comprises or utilizes a monolayer or multilayer thermoplastic polymeric flexible film of 10 mils (254 microns) or less. The invention may be employed as bags in various typical sizes. By "flatwidth" is meant the transverse width of a flattened tubular film. The flatwidth is also equal to ½ of the circumference of the tubular film.

In certain preferred embodiments well suited for use with cook-in foods or for post-cooking pasteurization processing and packaging, the heat sealing inner layer comprises a propene-based copolymer. This layer contacts and thereby controls adhesion of the film to an enclosed food (termed e.g. "meat adhesion"), and also controls heat sealability and seal strength, particularly at elevated temperatures over time.

Typical inventive films for a variety of uses may advantageously have a thickness of about 2–3 mils (50.8–76.2 microns), although suitable films for packaging foodstuffs as thick as 5–7 mils (127–178 microns) or as thin as 1 mil (25.4 microns) may be advantageously employed. Typically, films will be between about 1.5–3.5 mil (38.1–88.9 microns). Especially preferred for use as films for packaging cook-in meats are films wherein the multilayer film has a thickness of between about 2 to 3 mils (50.8–76.2 microns). Such films have good abuse resistance. Films thinner than 2 mils are less abuse resistant and more difficult to handle in packaging processes. Films of 4–7 mils (102–178$\mu$) have extremely good abuse resistance and puncture resistance and surprisingly good sealability. Films greater than 7 mil (178$\mu$) may be advantageous in some demanding applications.

Preferred films are heat shrinkable. Preferred films may also provide a beneficial combination of one or more or all of the above and below noted properties including strong seals, puncture resistance, low tear strengths, low haze, high gloss, high shrinkage values at 90° C. or less, good machinability, good mechanical strength and good barrier properties including high barriers to oxygen and water permeability.

Suitable films of the present invention may have low haze and high gloss e.g. less than 20% haze and a gloss greater than 50 Hunter Units(H.U.) at 45° . Advantageously, some embodiments may have haze values of less than 10–12% and preferably less than 6%, and very high gloss values e.g. greater than 65 H. U. and preferably greater than 75 H.U.

The term "heat sealing layer" means a layer which is heat sealable, preferably to itself, i.e., be capable of fusion bonding by conventional indirect heating means which generate sufficient heat on at least one film contact surface for conduction to the contiguous film contact surface and formation of a bond interface therebetween without loss of the film integrity. Advantageously, the bond interface should be sufficiently thermally stable to prevent gas or liquid leakage therethrough when exposed to above or below ambient temperatures during processing of food sealed within the film, e.g., in bag form. Finally, the bond interface between contiguous inner layers must have sufficient physical strength to withstand the tension resulting from stretching or shrinking around the food body sealed within the tube.

Various copolymers of ethylene and at least one alpha olefin are employed in the film of the invention. The term "copolymer of ethylene" means that the copolymer is predominantly comprised of ethylene and that at least 50% by weight of the copolymer is derived from ethylene monomer units. Suitable alpha olefins include $C_3$ to $C_{10}$ alpha-olefins such as propene, butene-1, pentene-1, hexene-1, methylpentene-1, octene-1, decene-1 and combinations thereof. The invention contemplates use not only of bipolymers, but copolymers of multiple monomers such as terpolymers e.g. ethylene-butene-1-hexene-1 terpolymer. The ethylene $\alpha$-olefin copolymers(EAOs) used may have various molecular weights, molecular weight distributions ( $\overline{M}_w/\overline{M}_n$) and melt indices. The first and second polymers used e.g. the ethylene-hexene copolymer and the ethylene $\alpha$-olefin copolymers, typically will have a melt index of less than 2.5 dg/min.(ASTM D-1238, condition E 190° C.), preferably 1.5 dg/min. or less, more preferably of 0.3 to 1.0 dg/min. Some embodiments may use a first polymer having a melt index of 0.3 to 1.5 dg/min., while other embodiments may use first polymers having a melt index of 1.5 to 3.0 dg. min. or higher. Advantageously, the first polymer may have a $\overline{M}_w/\overline{M}_n$ of 1.5 to 3.0, preferably of 2.2 to 2.6, but higher or lower ratio polymers may be used.

The invention in a most preferred embodiment utilizes at least three different polymers. These polymers are defined in part by their melting point. The term "melting point" means the peak melting temperature of the dominant melting phase as measured by Differential Scanning Calorimetry (DSC) with a 10° C./min. heating rate according to ASTM D-3418. Two of the required polymers of the preferred inventive blend are ethylene α-olefin copolymers and one is an ethylene copolymer with a vinyl ester or an alkyl acrylate. It is preferred that the three required polymers of the preferred embodiment of the invention be present in an amount of at least 10% by weight each in the blend, and that the blend comprise at least 50% by weight of at least one layer. Where interpolymers are specified the interpolymer has at least two distinct melting points which are at least 5° C. apart and a single interpolymer may comprise two or more of the required polymers. By "interpolymer" is meant a polymer blend which has been formed in situ by a single polymerization reactor using multiple catalysts and/or process conditions or by sequential reactors using different catalysts and/or process conditions.

It is believed that the heat sealing range is improved by selecting for a blend polymers having melting points which are at least 5–10° C. apart to provide melting characteristics over a broad temperature range which leads to a broadened heat sealing range and enhanced properties. The first and third polymers have peak melting points which are at least 5 to 17° C. apart from the second polymer.

The first polymer of the preferred film blend has a melting point of 80 to 98° C., preferably 80 to 92° C., and comprises an ethylene hexene-1 copolymer. Exemplary suitable first polymers may have a density of 0.900 g/cm³ or less, a melt index of about 2.5 or less, preferably 1.5 dg/min. or less, and most preferably 0.3 to 1.0 as measured by ASTM D-1238, at 190° C. under a total load of 2.16 Kg (condition E), and have a $\overline{M}_w/\overline{M}_n$ of 3 or less, preferably 1.5 to 3.0, more preferably 2.2 to 2.6. In one preferred embodiment, the first polymer will have a melt index less than 1.0 dg/min. Preferably the first polymer comprises a copolymer of ethylene and hexene-1 having a melt index (M.I.) of 0.3 to 1 (more preferably less than 1.0) dg/min.

Preferred commercially available first polymers are sold under the trademarks EXACT SLX 9092 and Exact SLX 9110. EXACT is a trademark of EXXON Chemical Co., Houston, Tex., U.S.A. for their ethylene α-olefin polymers produced using metallocene single-site catalysts having a low level of crystallinity; 10–20% is typical.

The first polymer may comprise at least 10% and preferably 20 to 85 wt. % of the total weight of the required first, second and third polymer components in the layer comprising the preferred blend, and preferably of the total polymer content of the layer. Use of lesser amounts reduces shrinkability in those embodiments where heat shrinkability is desired. Higher amounts make orientation more difficult and may increase extractable moieties to amounts which are undesirable for certain food contact applications. Various embodiments utilize the first polymer is in an amount of 25 to 45 wt. %, or 30 to 40 wt. %, or 45 to 85 wt. % based upon the total weight of the first, second and third polymers in the layer. When an optional four polymer component blend is used, the first polymer will preferably be present in an amount of about 20 to 35% based upon the weight of the layer comprising the blend.

The second polymer of the inventive blend has a melting point of 115 to 128° C. and comprises a copolymer of ethylene and at least one alpha olefin. Examples of suitable second copolymers include copolymers of ethylene and at least one $C_3$ to $C_{10}$ alpha olefin, such as $C_2C_4$, $C_2C_6$, $C_2C_8$ and $C_2C_4C_6$ copolymers, e.g. ethylene butene-1 copolymer, ethylene hexene-1 copolymer, ethylene octene-1 copolymer, and ethylene butene-1 hexene-1 copolymer. Exemplary second polymers may have a density of 0.900 g/cm³ and higher, preferably 0.900 to 0.915 g/cm³; a melt index preferably of 2.5 dg/min. or less, more preferably 0.5–1.0 dg/min.; and a $\overline{M}_w/\overline{M}_n$ of preferably about 4.0 to 5.0. Preferred second copolymers include ATTANE™ XU 61509.32, and XU 61520.01. ATTANE™ is a trademark of Dow Chemical Co. of Midland, Mich., USA for its ethylene ULDPE(VLDPE) polymers.

It is preferred that the second polymer of the inventive film comprise a copolymer of ethylene having a melt index (M.I.) of about 0.25 and 2.5 (more preferably 0.7 to 1.5) dg/min. as measured by ASTM D-1238, at 190° C. under a total load of 2.16 Kg (condition E).

The second polymer may comprise at least 5%, preferably 5 to 35 weight %, of the total weight of the first, second and third polymer components, and preferably of the total polymer content of the film layer. Use of lesser amounts reduce the heat seal temperature range. When a preferred four component blend is used, the second polymer will preferably be present in an amount of 15 to 30%, more preferably greater than 20%, based upon the total weight of the layer comprising the four polymer blend.

The third polymer of the preferred inventive blend has a melting point of 60 to 110° C. and comprises a copolymer of ethylene and a vinyl ester or an alkyl acrylate. Preferred third copolymers include copolymers of ethylene and unsaturated esters having adhesive and/or heat sealing properties. Such copolymers are predominantly (>50 wt. %) ethylene. Suitable copolymers include ethylene vinyl esters and ethylene alkyl acrylates such as ethylene-vinyl acetate(EVA), ethylene-vinyl propionate, ethylene-methyl methacrylate, ethylene-ethyl methacrylate, ethylene-ethyl acrylate, and ethylene n-butyl acrylate. Preferred copolymers are ethylene-vinyl esters such as EVA, ethylene-vinyl formate, ethylene-vinyl propionate, and ethylene-vinyl butylate. Especially preferred is EVA. Many different EVA resins are commercially available having a wide range of vinyl acetate contents and melt flow indices.

Suitable vinyl ester or alkyl acrylate contents of the preferred third polymer components used include 4–28 (preferably 4–18) wt. % vinyl ester or alkyl acrylate based on the total copolymer weight. It is preferred that the third polymer comprise a copolymer of ethylene and a vinyl ester having a melt index (M.I.) of 0.1 to 2 (more preferably 0.1 to 0.5) dg/min. as measured by ASTM D-1238, at 190° C. under a total load of 2.16 Kg (condition E).

A most preferred EVA sold as ESCORENE™ LD 701 by the Exxon Chemical Company of Houston, Tex. and reportedly has a density of 0.93 g/cm³, a vinyl acetate content of 10.5 wt. %, a melt index of about 0. 19 dg/min., and a melting point of about 97° C.

The third polymer may comprise at least 10%, preferably 10 to 50 wt. % of the total weight of the first, second and third polymer components, and preferably of the total polymer content of the blend film layer. Use of lesser amounts reduce heat sealing properties (in those embodiments where the blend is utilized as the heat sealing surface layer and heat sealability is desired) and use of higher amounts reduce puncture resistance and may undesirably decrease optical properties. When an optional four component blend is used, the third polymer will be present in an amount of 10 to 30% based upon the weight of the layer comprising the blend.

The optional fourth polymer is a thermoplastic polymer; preferably a copolymer of ethylene and at least one alpha olefin. Examples of suitable optional fourth polymers include copolymers of ethylene and at least one $C_3$ to $C_{10}$ alpha olefin, such as $C_2C_4$, $C_2C_6$, $C_2C_8$ and $C_2C_4C_6$ copolymers, e.g. ethylene butene-1 copolymer, ethylene hexene-1 copolymer, ethylene octene-1 copolymer, and ethylene butene-1 hexene-1 copolymer; VLDPE; LLDPE; LDPE; HDPE; and propylene copolymers (i.e. copolymers having at least 50% by weight propylene units). Exemplary suitable fourth polymers may have a density of at least 0.900 g/cm$^3$, preferably 0.900 to 0.930 g/cm$^3$, more preferably 0.900 to 0.915 g/cm$^3$; a melt index of 2.5 dg/min. or less, preferably 1.0 dg/min. or less; and a $\overline{M}_w/\overline{M}_n$ of 1.5 to 12 or more. Suitable fourth polymers that may be used in the heat sealing layer of the films of the present invention include AFFINITY™ PL 1840, PL 1880, Exceed™ 350D60 and Exact™ 3032. AFFINITY™ is a trademark of Dow Chemical Co. of Midland, Mich., U.S.A. for its ethylene polymers produced using constrained geometry catalysts. Exact™ and Exceed™ are trademarks of Exxon Chemical Co. of Houston, Tex., U.S.A. for some of their metallocene catalyst produced polymers.

Preferably the fourth polymer when present comprises 10 to 30 wt. % of the total weight of four polymer components, and preferably of the total polymer content of the polymer blend.

The above reported melt indices for the various resins employed as the first, second, third and fourth polymers are initial melt index values for the pelletized resins as received by the manufacturer. Such "as received" values are intended when the term melt index is used herein unless otherwise noted. Crosslinking, especially irradiative crosslinking, is known to increase the average molecular weight by formation of longer chains of molecules than originally present. Therefore, crosslinking will also reduce the melt index of a polymer from its initial value to a lower value since the melt index is not only a measure of viscosity but also an indirect measure of molecular weight Also, the melt blended material will also have its own melt index which is not to be confused with that of the original copolymer components of the blend. The industry custom is that the term melt index refers to the resin (usually pelletized or powdered) as received from the polymer manufacturer unless otherwise specified.

Advantageously, the invention utilizes a polymeric blend material in at least one layer which has unexpected and surprising combinations of properties. Beneficially, such polymeric material may provide a broad combination of desirable properties having important commercial advantages for production and use of thermoplastic films, particularly biaxially stretched films having heat shrinkability properties at 90° C. Advantageously such films may have excellent puncture resistance, low tear propagation strength, high shrinkability, high tensile strengths, good modulus, low haze, high gloss, excellent optical properties, a broad sealing range and good seal strength. Beneficially, combinations of these desirable attributes are present in various embodiments of the invention. The blend has a sufficient film strength to withstand orientation (especially a tubular double-bubble type biaxial orientation process). The blend also resists "burn through" during heat sealing operations and produces strong fusion bonds. Such polymer blend films provide polymeric material having chain lengths suitable for diffusion and entanglement between adjacent layers during heat sealing operations to form strong integral fusion bonds.

In one embodiment, the invention comprises a polymer blend of at least three copolymers comprising:

(a) 20 to 85 wt. % of a first polymer having a melting point of 80 to 98° C. comprising at least one copolymer of ethylene and hexene-1;

(b) 5 to 35 wt. % of a second polymer having a melting point of 115 to 128° C. comprising at least one copolymer of ethylene and at least one α-olefin; and (c) 10 to 50 wt. % of a third polymer having a melting point of 60 to 110° C. comprising at least one copolymer of ethylene and a vinyl ester or an alkyl acrylate;

wherein the first and second polymers have a combined weight percentage of at least 50 wt. %, based upon the total weight of said first, second and third polymers.

Various embodiments of the inventive blends utilize 25 to 45 wt. % or 30 to 40 wt. % of the first polymer. These blends are capable of producing films having very good tear strength properties. Other blend embodiments use 45 to 85 wt. % of the first polymer. These embodiments are capable of producing films having exceptionally high puncture resistance values, especially high maximum puncture forces and total energy absorption values. Advantageously, one or more of the first, second and third polymers may comprise an interpolymer. In particular, an interpolymer of the first and second polymers may be used. This interpolymer which combines the first and second polymers would have at least two melting points, one melting point of 80 to 98° C. and a second melting point of 115 to 128° C.

The blend may contain other components e.g. other polymers and/or processing aids. Preferably, the blend of the first, second, and third polymers will comprise at least 50% by weight of the total blend of which it is a part. Thus, a film layer comprising the inventive blend will advantageously have at least 50 wt. % of the layer comprise the aforementioned first, second, and third polymers, although various embodiments may use less than 50%.

In another embodiment, the above blend is used to produce flexible films which may be e.g. blown, cast, tentered or stretched either uniaxially or biaxially. These films may be fabricated into bags or shirred as tubes. The inventive film layer may be irradiatively crosslinked by known methods. It may also be the innermost heat sealable layer of a tubular film.

Yet another embodiment uses the above blend to produce flexible, thermoplastic, biaxially stretched, heat shrinkable films. These heat shrinkable films may beneficially have a ram puncture force of at least 70 Newtons, a ram puncture stress of at least 110 MPa, and/or a tear propagation strength "x" such that 10≤x≤40 grams per mil in each of the machine and transverse directions or x<25 grams per mil in at least one of the machine and transverse directions (as measured by the Elmendorf Tear Strength Test).

In another embodiment a film having at least one layer comprising the inventive blend is made having at least one additional thermoplastic layer, and in a preferred embodiment has at least three or four additional layers. These additional layers may be added in sheet or tubular form and produced by known multilayer fabrication techniques including coating lamination or coextrusion. In one embodiment at least one additional layer comprises a polymer blend of at least three copolymers having an ethylene-α-olefin copolymer (EAO) "A" having a melting point of 55 to 75° C.; an EAO "B" having a melting point of 85 to 110° C.; and a thermoplastic polymer e.g. EVA having a melting point of 115 to 130° C. This additional layer is further described in PCT Application No. US 98/03914 entitled "Mermoplastic $C_2$-α-Olefin Copolymer Blends and Films" filed Feb. 27, 1998 claiming a U.S. priority Ser. No. 08/808,093, filed Feb. 28, 1997, now U.S. Pat. No. 5,928,740 which applications, patent, and disclosures are hereby incorporated by reference in their entireties.

The inventive blend will find utility as the innermost heat sealing layer of a tubular film in many multilayer embodiments. Films having 3 to 5 or more layers with at least one layer comprising the blend are contemplated, especially films having a layer comprising at least 50 percent by weight of copolymer of ethylene with at least one alpha-olefin or at least one vinyl ester or blends thereof, and/or a layer comprising a vinylidene chloride copolymer, a nylon or a copolymer of ethylene with a vinyl alcohol. In a preferred three, four or five layer embodiment, an oxygen barrier layer of a vinylidene chloride copolymer, a nylon or a copolymer of ethylene with a vinyl alcohol is between the inventive layer and either a layer comprising at least 50 percent by weight of copolymer of ethylene with at least one alpha-olefin or at least one vinyl ester or blends thereof, or another layer comprising the inventive blend.

Films having exceptionally high puncture resistance values, especially high maximum puncture forces and total energy absorption values may be produced according to the invention. Maximum ram puncture forces of at least 70 to 90 to 100 Newtons or higher, preferably at least 110, more preferably at least 120 Newtons, beneficially at least 140 Newtons, advantageously at least 150 Newtons, and most preferably at least 200 Newtons may be achieved in films of the invention. Films having maximum ram puncture stress values of at least 110 MPa, preferably at least 150 MPa, and more preferably at least 160 MPa may be achieved. Also, inventive films having total energy absorption values (at maximum puncture force) of at least 0.60 Joules, preferably at least 0.90, more preferably at least 1.0 Joules, beneficially at least 1.20 Joules, advantageously at least 1.50 Joules, and most preferably at least 2.0 Joules may be achieved.

Polymers of broad molecular weight or which are polymodal in molecular weight distribution are contemplated, as are blends having very narrow molecular weight distributions.

An advantage of the invention is that use of the presently disclosed blends facilitates a broad heat sealing range and enhances biorientability for irradiated films.

Upon exposure to irradiation sufficient to cause cross-linking, heat sealable layers tend to diminish in their heat sealing ability. However, an antioxidant may be added to the heat sealable inner layer of the tubular article to inhibit cross-linking within the polymer, thereby reducing the adverse effects of over-irradiation upon the heat sealing properties. Addition of an antioxidant allows the irradiation dosage to be sufficiently high for other layers of a multilayer film to retain the beneficial effects of irradiation. Films may be crosslinked by chemical agents or by irradiation, preferably at a level of 1 to 10 Mrad, more preferably 2–6 Mrad.

As recognized in the art, resin properties may be modified by blending in additional resins or additives such as colorants, processing aids, antiblock agents and slip agents, etc. The specific polymer blends described above may be further blended with additional resins such as very low density polyethylene (VLDPE), linear low density polyethylene (LLDPE), low density polyethylene (LDPE), high density polyethylene (HDPE), ionomers, polyamides, polypropylenes, ethylene acrylates or esters, various olefinic polymers or copolymers, adhesive resins; or may be formed into multilayer films with one or more additional layers of such resins or blends thereof.

The resins and others may be mixed by well known methods using commercially available tumblers, mixers or blenders. Also, well known additives such as processing aids, slip agents, antiblocking agents, pigments, and mixtures thereof may be incorporated into any or all layers.

In one embodiment, a polymeric film layer is provided which comprises a blend of:
(a) a first polymer having a melting point of 80 to 98° C., preferably 80 to 92° C., which comprises a copolymer of ethylene and hexene-1;
(b) a second polymer having a melting point of 115 to 128° C. which comprises a copolymer of ethylene and at least one α-olefin; and
(c) a third polymer having a melting point of 60 to 110° C. which comprises a copolymer of ethylene and a vinyl ester or an alkyl acrylate; and
when the first polymer has a melting point greater than 92° C., the blend may otherwise be:
(i) free from EAOs having a melting point (m.p.) less than 90° C. or from 55 to 85° C.;
ii) have less than 30 wt. % of EAOs having an m.p. less than 90° C. or from 55 to 85° C.;
(iii) have greater than 50 wt. % EAOs having a m.p. less than 90° C. or from 55 to 85° C.; or
(iv) have from 30 to 50 wt. % EAOs having a m.p. less than 90° C. or from 55 to 85° C., based upon the total weight of the blend layer.

In a preferred process for making films, the resins and any additives are introduced to an extruder (generally one extruder per layer) where they are melt plastified by heating and then transferred to an extrusion (or coextrusion) die for formation into a tube. Extruder and die temperatures will generally depend upon the particular resin or mixture being processed and suitable temperature ranges for commercial resins are known in the art, or provided in technical bulletins available from resin manufacturers. Processing temperatures may vary depending upon other process parameters chosen. For example, according to the invention, in extrusion or coextrusion of the polymer blends of the invention, barrel and die temperatures may range between about 140° C. and 185° C. However, variations are expected which may depend upon such factors as polymer resin selection, use of other resins e.g. in the blend or in separate layers in a multilayer film, the manufacturing process used, and particular equipment and other process parameters utilized. Actual process parameters including process temperatures are expected to be set by one skilled in the art without undue experimentation in view of the present disclosure.

Blends of the invention may be manufactured into various useful articles e.g. cast films using e.g. a slot die followed by tentering to achieve biaxial orientation, or tubular films using an annular die followed by trapped bubble expansion to achieve biaxial stretching. In a preferred embodiment, extrusion by a trapped bubble or double bubble process of the type described in U.S. Pat. No. 3,456,044 is used. In a preferred process for making an oriented or heat shrinkable film, a primary tube comprising the inventive plastic blend is extruded, and after leaving the die is inflated by admission of air, cooled, collapsed, and then preferably oriented by reinflating to form a secondary bubble with reheating to the film's orientation (draw) temperature range. Machine direction (M.D.) orientation is produced by pulling or drawing the primary tube e.g. by using pairs of rollers traveling at different speeds, and transverse direction (T.D.) orientation is obtained by radial bubble expansion. The oriented film is set by rapid cooling. Advantageously, M.D. and T.D. stretch ratios are from 3:1 to 5:1 with a ratio of about 4:1 preferred. Films of various embodiments may have shrinkage values at 90° C. of up to 45% or higher in either or both directions. Some preferred films have at least 45% shrinkage values at 90° C.

Films may be monolayer or multilayer, preferably of 10 mils (254µ) or less, more preferably of 5 mil (127µ) or less. Multilayer films have the following preferred layer thicknesses.

The thickness of the heat sealable inner thermoplastic first layer is typically from 0.2 to 2.0 mils (5–51µ). Thinner layers may perform the aforedescribed functions, particularly in structures of 5 or more layers.

In gas barrier films (generally providing a barrier to oxygen transmission), the barrier layer thickness is preferably from 0.1 to 0.5 mils (2.5–12.7µ). Thinner barrier layers may not perform intended functions and thicker layers do not appreciably improve performance. As used herein the term "barrier layer" means an oxygen gas barrier layer unless otherwise specified.

In one barrier layer embodiment of this invention the outer thermoplastic layer of the enclosing multilayer film is on the opposite side of the core layer from the inner layer, and in direct contact with the environment. In a preferred three layer embodiment this outer layer is directly adhered to the core layer. Since it is seen by the user/consumer, it should enhance optical properties of the film. Also, it should withstand contact with sharp objects and provide abrasion resistance, for these reasons it is often termed the abuse layer.

The outer layer is preferably formed of a similar blend to that of the inner layer so that both such layers utilize the first, second and third polymers defined above, preferably a blend of (i) EVA, (ii) EAO (such as VLDPE), and (iii) an ethylene-hexene-1 copolymer having an m.p. of 80 to 98° C., preferably 80 to 92° C. The three polymers each typically comprises 20 to 40 wt. % of the layer. EVA when used in the outer layer preferably has 3% to 18% vinyl acetate content to provide good shrinkability. Blends of EAOs are also usefully employed in the outer layer.

Alternatively, the inner, outer, or intermediate layers may be formed of other thermoplastic materials, for example, polyamides, styrenic copolymers e.g. styrene-butadiene copolymer, polypropylenes, ethylene-propylene copolymers, ionomers, or alpha-olefin polymers and in particular members of the polyethylene family such as (LLDPE), VLDPE, HDPE, LDPE, ethylene vinyl ester copolymer or ethylene alkyl acrylate copolymer or various blends of two or more of these materials.

The thermoplastic outer layer thickness is typically 0.5 to 1.0 mils. Thinner layers may be less effective for abuse resistance, however thicker layer though more expensive may advantageously be used to produce films having unique highly desirable puncture resistance and/or abuse resistance properties. Heavy gauge films, typically 5 to 7 mils or more, are needed in demanding applications which are usually satisfied by very expensive and complex laminated film structures and/or secondary packaging materials such as bone guards, pads, and overwrap.

Unless otherwise noted, the following physical properties are used to describe the invention, films and seals. These properties are measured by either the test procedures described below or tests similar to the following methods.
Average Gauge: ASTM D-2103
Tensile Strength: ASTM D-882, method A
1% Secant Modulus: ASTM D-882, method A
Oxygen Gas Transmission Rate ($O_2$GTR): ASTM D-3985-81
Elmendorf Tear Strength: ASTM D-1922
Percent Elongation at Break: ASTM D-882, method A
Molecular Weight Distribution: Gel permeation chromatography
Gloss: ASTM D-2457, 45° Angle
Haze: ASTMD-1003-52
Melt Index: ASTM D-1238, Condition E (190° C.) (except for propene-based (>50% $C_3$ content) polymers tested at Condition L(230° C.))
Melting Point: ASTM D-3418, peak m.p. determined by DSC with a 10° C./min. heating rate.
Vicat Softening Point (Vsp): ASTM D-1525-82

All ASTM test methods noted herein are incorporated by reference into this disclosure.

Shrinkage Values: Shrinkage values are obtained by measuring unrestrained shrink of a 10 cm. square sample immersed in water at 90° C. (or the indicated temperature if different) for ten seconds. Four test specimens are cut from a given sample of the film to be tested. Specimens are cut into squares of 10 cm length (M.D.) by 10 cm. length (T.D.). Each specimen is completely immersed for 10 seconds in a 90° C. (or the indicated temperature if different) water bath. The specimen is then removed from the bath and the distance between the ends of the shrunken specimen is measured for both the M.D. and T.D. directions. The difference in the measured distance for the shrunken specimen and each original 10 cm. side is multiplied by ten to obtain percent shrinkage in each direction. The shrinkage of 4 specimens is averaged and the average M.D. and T.D. shrinkage values reported. The term "heat shrinkable film at 90° C." means a film having an unrestrained shrinkage value of at least 10% in at least one direction. Shrink Force: The shrink force of a film is that force or stress required to prevent shrinkage of the film and was determined from two samples taken from each film. Each film sample was cut 1" (2.54 cm) wide by 7" (17.8 cm) long in the machine direction and 1" (2.54 cm) wide by 7" (17.8 cm) long in the transverse direction. The average film thickness was determined and recorded. Each film sample was then secured between the two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was recorded. At the end of this time, the film sample was removed from the bath and allowed to cool to room temperature whereupon the force in grams at room temperature was also recorded. The shrink force for the film sample was then determined from the following equation wherein the results is obtained in grams permit of film thickness (g/mil):

$$\text{Shrink Force (g/mil)} = F/T$$

wherein F is the force in grams and T is the average thickness of the film samples in mils.

Impulse Seal Range

The impulse sealing range test determines acceptable voltage ranges for impulse sealing plastic films. A SENTINEL Model 12-12AS laboratory sealer made by Packaging Industries Group, Inc., Hyannis, Mass., U.S.A. was used. This sealer is equipped with a replacement sealing ribbon (available from Koch Supplies of Kansas City, Mo.) for a Multivac AG100 brand packaging machine. In this test, two 4 inch wide (T.D. direction) samples are cut from a tubular film. The impulse sealer has controls for coolant flow, impulse voltage and time, and seal bar pressure, and except for impulse voltage are set at the following conditions:

0.5 seconds impulse time (upper ribbon only)
2.2 seconds cooling time 50 psi (345 kPa) jaw pressure 0.3 gallon per minute (1 liter per minute) of cooling (about 75° F. (22° C.)) water flow One of the samples is folded in half for use in determining a minimum sealing voltage. This folding simulates folding which may inadvertently occur during conventional bag sealing operations. The folded sample which now has four sheets or portions of film (hereinafter referred to as "sheet portions") is placed into the sealer and by trial and error the minimum voltage to seal the bottom two sheet portions to each other was determined.

The maximum voltage is determined by placing 2 sheet portions in the sealer and activating the seal bar. The film sample is manually pulled with about 0.5 lb. of force and the voltage which does not cause burn through or significant distortion of the seal is determined.

Hot Water Seal Strength (HWSS) Test

In commercial use, food packaging bags are filled with food product, e.g. poultry, then evacuated through the mouth end of the bag and sealed, e.g., by an impulse sealing machine. The strength of seals of heat shrinkable bags is measured by determining the time for a seal to fail when under certain conditions the seal is immersed in hot water e.g. at 95° C. The HWSS test is designed to test the seal integrity of a bag's seals by simulating a bagged food shrinking and/or cooking packaging application. The hot water seal strength is measured by a test described as the "restrained shrinkage-seal strength test" in Funderburk et al U.S. Pat. No. 3,900,635 which patent is hereby incorporated by reference. The seal strength of the sealed test bags is determined using a metal frame fabricated from wire to simulate the contours of a bulky food such as whole poultry, and the frame is placed inside the test bag. The so-opened bag and test frame is then immersed in water at 95° C.±0.5° C. with the seal at the bottom end, and the time to failure of the seal was measured for ten bags and the average is reported along with the minimum and maximum time to failure. Times are measured in seconds up to a maximum of 300 seconds. After 300 seconds, the test of each sample was discontinued regardless of failure and averages were calculated using 300 seconds for intact bags. The maximum and minimum sealing temperatures for which bags may be effectively sealed is determined by trial and error to provide information about the sealing range over which test bags may be sealed. A wide sealing range is desirable to minimize operator error and seal failure due to e.g. drift of temperature control and environmental conditions and other process variations such as e.g. film thickness.

Tensile Seal Strength (Seal Strength) Test

Five identical samples of film are cut 1 inch (2.54 cm) wide and at least 5 inches (77 cm) long with a 1 inch (2.54 cm) wide seal portion centrally and transversely disposed. Opposing end portions of a film sample are secured in opposing clamps in a temperature controlled chamber of an Instron 4501 Universal Testing Instrument. The film is secured in a taut snug fit between the clamps without stretching prior to beginning the test. The test chamber door is closed and the chamber is heated to the test temperature at which time the instrument is activated to pull the film via the clamps transverse to the seal at a uniform rate of 5 inches (127 cm) per minute until failure of the film (breakage of film or seal, or delamination and loss of film integrity). The test temperature and lbs. force at break are measured and recorded. The test is repeated for four additional samples and the average lb. at break reported.

Hot Water Puncture Test

Hot water puncture values are obtained by a hot water puncture test as follows. Water is heated to 95±1° C. A straight stainless steel metal rod of ⅜ inch (0.95 cm) diameter is formed into a probe by shaping one end to a conical point. This sharpened point has the configuration of a right circular cone, and the angle between the cone axis and an element of the conical surface at the vertex is 37°. This sharp point is then rounded to a spherical tip of about 1/16 inch diameter. The pointed rod is fastened to a wooden block so that the rounded point projects 1½ inches (3.8 cm) beyond the end of the 7 inch (17.8 cm) long rectangular wooden block. A specimen about 3 inches (7.6 cm) wide in the transverse direction (TD) and about 18 inches (45.7 cm) long is cut from the test sample material. One end of the specimen is placed on the end of the wooden block opposite the pointed rod. The specimen is wrapped around the end of the sharpened rod and back to the wooden block on the opposite side, where it is secured. The film thickness in the area of contact with the sharpened rod is measured in order to assure that the film specimen thickness is truly representative of the given test sample material. The specimen and pointed rod are quickly immersed five inches (12.7 cm) into the hot water and a timer is started. The timer is stopped when the point punctures the film specimen or at 120 seconds without puncture, and the time recorded. The test procedure is repeated 5 more times with new specimens. The times required for penetration are then averaged for the six TD specimens. Resistance to puncture times of below 6–7 seconds are generally considered unacceptable, while times of 20 seconds or more are good, 60 seconds or more are very good and 120 seconds or more are excellent.

Ram Puncture Test

The ram puncture test is used to determine the maximum puncture load or force, and the maximum puncture stress of a flexible film when struck by a hemispherically shaped striker. This test provides a quantitative measure of the puncture resistance of thin plastic films. Values of this test will differ from those generated by a dynamic puncture test due to differences in striker geometry, loading rate and geometry and available energy.

Referring to FIG. 1, a schematic drawing (not to scale) of a ram puncture tester 10 is depicted having a base 11 and a shelf 12 separated by fixed pillars 13 forming a sample placement area 14.

In conducting the ram puncture test, an approximately 5 inch (12.7 cm) diameter film sample is obtained and its thickness measured and recorded. This sample is clamped in place across a 3 inch (7.6 cm) diameter circular opening in a ring fixture 15 by holding the film sample taut, but not stretched, between the planar circular ring fixture 15 having a compressive O-ring and an opposing metal ring to secure the film in a circle. This fixture 15 is positioned to hold the film plane perpendicular to the path of striker 16 located above the film. The striker 16 travels downward in the direction of and under the influence of the gravitational force of the Earth. The striker 16 is a 3.95 mm. diameter steel ball 17 welded to a 5 cm. long steel shaft 18 of 95 mil (0.24 cm) diameter. The shaft is attached to a 50 lb full-scale Dytran™ piezoelectric load cell 19 (available from Dytran Instruments, Inc., U.S.A.) which is affixed to an aluminum crosshead 20. The crosshead assembly forms a 3.00 kg mass which travels vertically, under the influence of gravity, along 2 hardened steel guide shafts 21 which are held in a fixed spaced apart position parallel position by attachment to bottom shelf 12 and top plate 22. Back pillars 23 provide stability to the tester 10. Four linear bearings are press-fit into the crosshead to provide precise, repeatable, low-friction travel along the guide shafts 21 downward to shock absorber pads 24. Striker 16 is actuated by latch release knob 25, and load cell information passed via line 26 to a low impedance voltage mode (LIVM) (power supply not shown) which is connected to a data acquisition system in computer 27 having a monitor 28. Shelf 12 has a circular opening 29 permitting striker 16 to contact the film sample contained in fixture 15.

Figure 2:
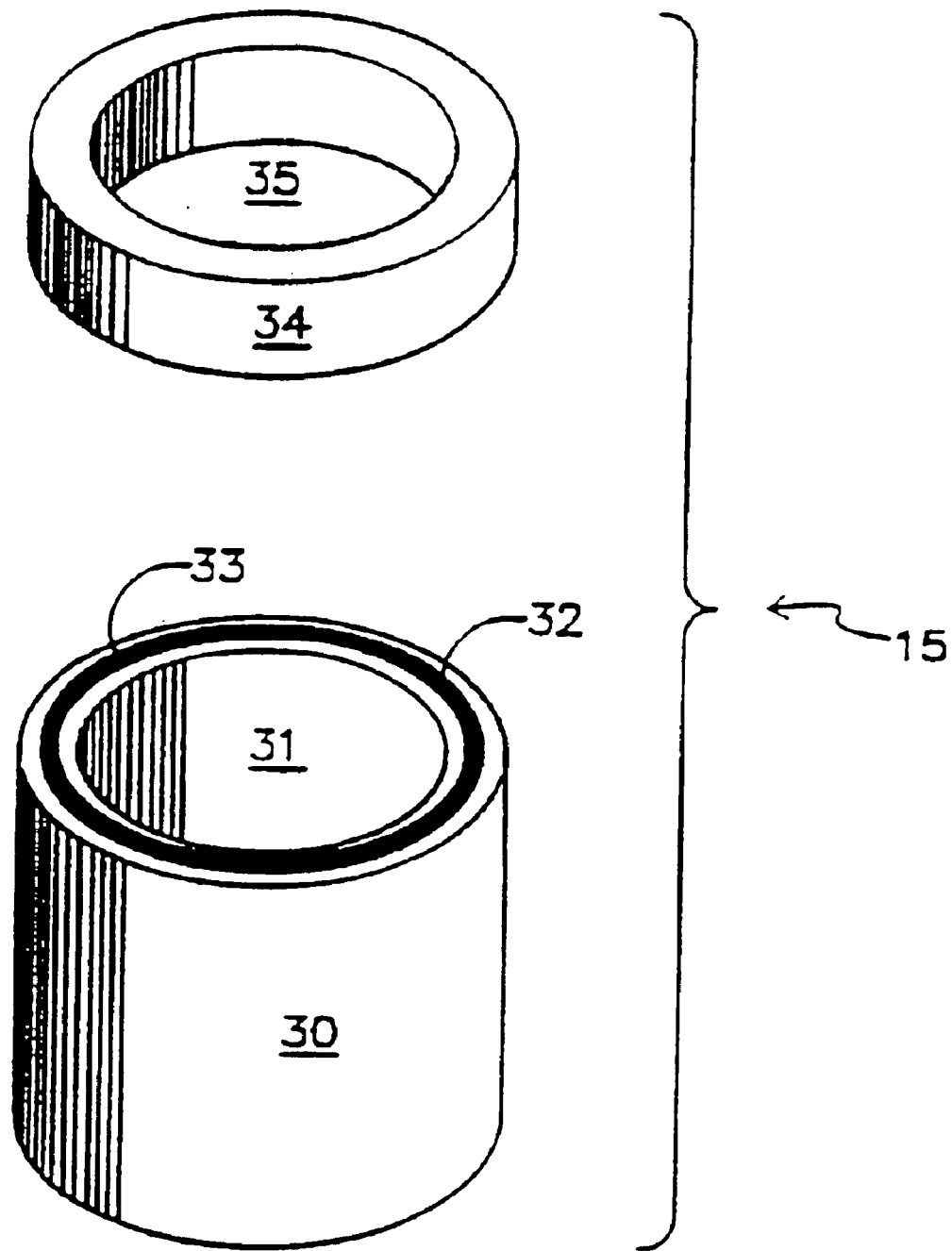
FIG. 2 is an exploded view of a specialty film holder.

Referring now to FIG. 2, films are tested by circumferentially clamping them over a 3" diameter hole using a specialty film holder fixture 15. The film holder 15 is an aluminum tube 30 having a circular opening 31. The tube 30 has a circular machined groove 32 to accept a rubber O-ring 33 at one end. The film (not shown) is placed across the O-ring 33 and a mating upper cylindrical section 34 having an opening 35 is firmly held without stretching against the film by clamps (not shown). The clamped film is then centered underneath the puncture tip at the base of the drop tower (see FIG. 1). This places the plane of the film surface 28.4 cm below the tip of the hemispherical striker tip 17 (drop hieght). The crosshead 20 is released and propelled by gravity toward the clamped film at a velocity $v_0$ which is kinematically related to the drop height.

Figure 3:
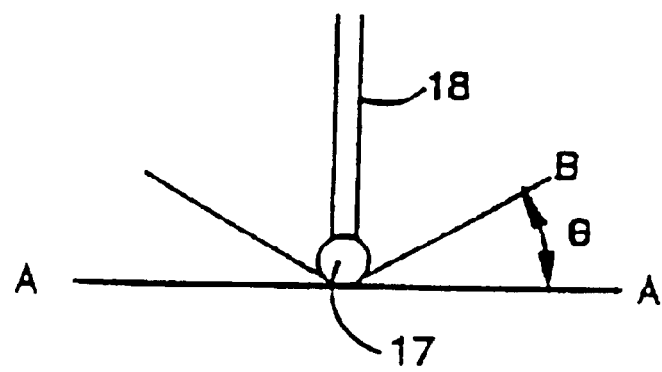
FIG. 3 is a schematic view depicting geometry of striker impact with film.

Referring now to FIG. 3, when the striker shaft 18 pulls the striker tip 17 into contact with the film, the film deforms from plane A—A and resists the impact force through uniform multidirectional tensile stresses across the thickness of the film. The angle of deflection of the film theta ($\theta$) is defined by the angle between the clamped film position (plane A—A) and that of the stretched film (indicated as position B—B) at the peak puncture load recorded during impact. This angle, always less than 90°, is automatically measured and recorded by a data acquisition system in the computer (see FIG. 1). The load cell force output is recorded at a frequency of 300 kHz beginning at roughly 1 msec. prior to impact and as the striker impacts, penetrates, and punctures the film sample. Assuming that the membrane stresses are in the plane of the film (no bending stresses), and that the measured load depends upon the geometry of the striker, then the maximum stress $\sigma$ may be determined by the following equation: $P_{max}=P_{max}/(2 \text{ nrT} \sin \theta)$, where $P_{max}$= maximum force or load; r=radius of the circle circumscribed by the cross-section of the hemispherical striker as it is superimposed on the plane of the film; T=the underformed film thickness; sin $\theta$ is the sine of the angle between the plane of the sample holder and the fully deflected film sample at the moment of puncture. The Total Energy Absorption "E" may be calculated by integrating the load displacement curve according to the following equation:

$$E = v_0 \int_0^\tau P \, dt + g \int_0^\tau t P \, dt - \frac{1}{2m} \left[ \int_0^\tau P \, dt \right]^2$$

Where E is total energy; $v_0$ is striker speed at the moment of impact with the film sample; P is force; t is time to puncture from impact; g is gravitational acceleration; and m is mass of the crosshead including the striker. The test is repeated and an arithmetic mean reported for 4 samples.

Those skilled in the art will recognize that equipment dimensions such as the drop height, striker shaft length, and/or mass of the crosshead assembly may be increased to accommodate testing of hard to puncture films.

Following are examples and comparative examples given to illustrate the invention.

In all the following examples, unless otherwise indicated, the film compositions were produced generally utilizing the apparatus and method described in U.S. Pat. No. 3,456,044 (Pahlke) which describes a coextrusion type of double bubble method and in further accordance with the detailed description above. In the following examples, all layers were extruded (coextruded in the multilayer examples) as a primary tube which was cooled upon exiting the die e.g. by spraying with tap water. This primary tube was then reheated by radiant heaters(although means such as conduction or convection heating may be used) with further heating to the draw (orientation) temperature for biaxial orientation accomplished by an air cushion which was itself heated by transverse flow through a heated porous tube concentrically positioned around the moving primary tube. Cooling was accomplished by means of a concentric air ring. Draw point temperature, bubble heating and cooling rates and orientation ratios were generally adjusted to maximize bubble stability and throughput for the desired amount of stretching or orientation. All percentages are by weight unless indicated otherwise.

The polymers used in the following examples are identified as follows unless otherwise noted.

First Polymer

EAO-$A_1$ comprises a copolymer predominantly of ethylene with hexene-1 monomer. It has a reported density of about 0.895 g/cm$^3$, a melt index of 0.8 dg/min. and a dominant melting point of 85° C. (minor peak at about 105° C.) and was available under the trademark Exact™ SLX 9092 from Exxon Chemical Company of Houston, Tex., U.S.A.

EAO-$A_2$ is the same polymer as $A_1$ except its melt index was 0.4 dg/min.

EAO-$A_3$ comprises an ethylene copolymer predominantly of ethylene with hexene-1 monomer. It has a reported density of about 0.901 g/cm$^3$, a melt index of 1.2 dg/min., a melting point of 96° C. and is available under the trademark Exact™ 3032 from Exxon Chemical Company of Houston, Tex., U.S.A EAO-$A_4$ comprises an ethylene copolymer predominantly of ethylene with hexene-1 monomer. It has a reported density of about 0.898 g/cm$^3$, a melt index of 0.8 dg/min., a melting point of 89° C. and is available under the trademark Exact™ 9110 from Exxon Chemical Company of Houston, Tex., U.S.A.

Second Polymer

EAO-B, comprises an ethylene-α-olefin copolymer of very low density polyethylene sold by Dow Chemical Company of Midland, Mich., U.S.A. under the trademark ATTANE™ XU 61509.32. It is a copolymer of ethylene and octene-1 reportedly having: a melt index of about 0.5 dg/min.; a density of about 0.912 g/cm$^3$; and a dominant melting point of about 122–123° C. with a second significant peak at about 105° C. and a minor peak at about 119° C.

EAO-$B_2$ comprises an ethylene-α-olefin copolymer of very low density polyethylene sold by Dow Chemical Company of Midland, Mich., U.S.A. under the trademark ATTANE™ XU 61520.01. It is a copolymer of ethylene and octene-1 reportedly having: a melt index of about 1.0 dg/min.; a density of about 0.912 g/cm$^3$; a Vicat softening point of 95° C.; and a dominant melting point of about 122–123° C., a second significant peak at about 104° C., and a minor peak at about 119° C.

EAO-$B_3$ comprises an ethylene-α-olefin copolymer of very low density polyethylene sold by Dow Chemical Company of Midland, Michigan U.S.A. under the trademark ATTANE™ 4403. It is a copolymer of ethylene and octene-1 reportedly having a melt index of about 1.0 dg/min. and a density of about 0.905 g/cm$^3$, and a melting point of about 122–123° C.

EAO-B$_4$ comprises an ethylene-octene-1 copolymer reportedly having a melt index of about 0.8 dg/min. and a density of about 0.906 g/cm$^3$ and a melting point of about 122–123° C. that is available from Dow Chemical Company under the trademark ATTANE™ 4203.

Third Polymer

EVA-A$_1$ is a third polymer comprising a copolymer of ethylene and vinyl acetate (EVA) available from Exxon Chemical Company of Houston, Tex., U.S.A. under the trademark Escorene™ LD 701.06. It reportedly has the following properties: 10.5 wt. % vinyl acetate content, 0.93 g/cm$^3$ density, 0.19 dg/min. melt index, and a melting point of about 97° C.

Other Polymers

EAO-C$_1$ comprises a copolymer predominantly of ethylene with butene-1 monomer. It has a reported density of about 0.888 g/cm$^3$, a melt index of 2.2 dg/min., a melting point of 70° C. and is available under the trademark Exact™ 4053 from Exxon Chemical Company of Houston, Tex., U.S.A.

EAO-C$_2$ comprises a copolymer predominantly of ethylene with butene-1 monomer. It has a reported density of about 0.885 g/cm$^3$, a melt index of 0.8 dg/min., a melting point of about 68° C. and is available under the trademark Exact™ 9036 from Exxon Chemical Company.

EAO-C$_3$ comprises a copolymer predominantly of ethylene with octene-1 monomer. It has a reported density of about 0.895 g/cm$^3$, a melt index of 1.6 dg/min., a melting point of about 94–95° C. (minor peak at about 84° C.) and is available under the trademark AFFINITY™ PF 1140 from Dow Chemical Company.

EAO-C$_4$ comprises a copolymer predominantly of ethylene with butene-1 monomer. It has a reported density of 0.888 g/cm$^3$, an M.I. of 2.2 dg/min., a melting point of 70° C. and is available under the trademark Exact™ 4011 from Exxon Chemical Company.

EAO-C$_5$ comprises a copolymer of ethylene, hexene-1 and butene-1. This terpolymer has a reported density of 0.902 g/cm$^3$, an M.I. of 1.2, a melting point of 94° C., a Vsp of 79° C., an $\overline{M}_w/\overline{M}_n <2.5$ and is available under the trademark Exact™ 3033 from Exxon Chemical Company.

EAO-C$_6$ comprises a copolymer predominantly of ethylene with butene-1 monomer. It has a reported density of about 0.885 g/cm$^3$, a melt index of 0.5 dg/min., a melting point of 68° C. and is available under the trademark Tafmer™ A0585X from Mitsui Chemical Inc., Tokyo, Japan.

EXAMPLES 1–3

In Examples 1 and 2, a biaxially stretched, heat shrinkable, monolayer film of the invention was made and its properties tested. Example 3 is a comparative example of a commercially acceptable biaxially stretched, heat shrinkable, monolayer film not of the invention.

For Examples 1 and 2, thermoplastic resins generally in pellet form were mixed together to form an inventive blend of: 33.0 wt. % of a first polymer comprising EAO-A$_1$ a second polymer comprising 23.0 wt. % of EAO-B$_1$; and a third polymer comprising 37.0 wt. % of EVA-A$_1$; 5.0% by weight of a titanium dioxide color concentrate sold under the trademark PM 11406E118 and 2.0% by weight of a slip processing aid (trademark PM 1137SE118) both sold by Techmer PM of Clinton, Tenn., U.S.A.

The blended resins were melt plastified in an extruder and a monolayer thermoplastic tube was extruded. The extruder barrel and extrusion die temperature profile was set at about 330° F. (166° C.) to about 345° F. (174° C.). The extruded primary plastic tube was then cooled, reheated, biaxially stretched, and cooled according to a double bubble process and the resultant biaxially stretched film wound on a reel. The machine direction (M.D.) draw or orientation ratio was about 4.8:1 and the transverse direction (T.D.) bubble or orientation ratio was about 4.2:1. The draw point or orientation temperature is below the melting point for the layer to be oriented and above that layer's Vicat softening point (Vsp). The draw point temperature of the films of Examples 1 and 2 are believed to have been about 160 to 175° F. (71–79° C.). Draw point temperature, bubble cooling rates and orientation ratios are generally adjusted to maximize bubble stability with use of higher throughput rates and lower draw point temperatures believed to provide films having higher puncture resistance relative to use of lower throughputs or higher orientation temperatures. A comparative film, Example 3, was similarly made except as noted below. The film of Example 3 was a blend of 56.4% of EAO-B$_2$;34.3% of EVA-A$_1$; 5% TiO$_2$ color concentrate (PM 11406E118); and 4.3% processing aid (PM 11368E118) available from Techmer PM of Clinton, Tenn., U.S.A. The processing and orientation conditions were similar to those above except that the M.D./T.D. orientation ratios were about 4.9:1 and 3.9:1, respectivly. The resultant films were tested and properties are listed in Table 1 below.

TABLE 1

| Ex. No. | AVG. GAUGE mil ($\mu$) | TENSILE STRENGTH at RT X10$^3$ psi (MPa) MD/TD | ELONGATION AT BREAK at RT % MD/TD | 1% SECANT MODULUS X10$^3$ psi (MPa) MD/TD | RAM PUNCTURE Force Newton | RAM PUNCTURE Energy Joule | SHRINK at 90° C. % MD/TD | SHRINK FORCE 90° C. g/$\mu$ MD/TD | SHRINK FORCE RT g/$\mu$ MD/TD | TEAR STRENGTH g/mil (g/$\mu$) MD/TD |
|---|---|---|---|---|---|---|---|---|---|---|
| 1 | 2.21 (56.1) | 17.4/17.3 (120/119) | 205/205 | 22.9/27.1 (158/187) | 125 | 1.37 | 49/54 | 7.0/6.8 | 2.8/3.6 | 9/11 (0.35/0.43) |
| 2 | 2.51 (63.8) | 17.4/16.8 (120/116) | 221/230 | 22.6/24.7 (156/170) | 131 | 1.40 | 48/54 | 6.8/7.0 | 2.2/2.9 | 10/12 (0.39/0.47) |
| 3 | 2.46 (62.5) | 16.0/13.2 (110/91) | 230/220 | 26.3/25.3 (181/174) | 93 | 0.67 | 32/41 | 6.7/7.0 | 2.7/4.2 | 15/17 (0.59/0.67) |

RT = Room Temperature (~20–23° C.)

From Table 1 we see that the inventive films of Examples 1 and 2 have comparable or superior properties to those measured for the commercially acceptable film of Example 3. The inventive films have slightly higher tensile strengths, significantly higher shrinkage values, and comparable shrink forces at elevated temperatures. Advantageously, the tear strengths of the inventive films are 33 to 40% lower than for the comparative example 3. Lower tear strengths are an advantage in heat sealing operations using impulse sealing technology where the sealing apparatus both seals and cuts the film with the film trim being removed by tearing along the cut. Lower tear strengths enable the trim to be removed quickly and without damage to the seal or film. The inventive films also have greatly superior puncture resistance properties. The force required to puncture the inventive films by the ram puncture test is 34 to 41% greater than that of the comparative film, and the total energy absorbed before puncture is double that of the comparative film.

The above film samples were not irradiatively treated. However, they may also be usefully crosslinked by irradiation e.g. at a level of 2–6 megarads (Mrad) after biaxial stretching (which irradiative process is hereinafter referred to as post-irradiation), in the manner generally described in Lustig et al, U.S. Pat. No. 4,737,391 which is hereby incorporated by reference.

EXAMPLES 4–11

In Examples 4–8, biaxially stretched, heat shrinkable, coextruded, multilayer films of the invention were made and their physical properties tested. Examples 9–11 are comparative examples not of the invention.

Examples 4–11 are three layer films. One extruder was used for each layer. Each extruder was connected to an annular coextrusion die from which heat plastified resins were coextruded forming a primary tube having a first inner layer, a second core layer and a third outer layer. The first and third layers being directly attached to opposing sides of the second core layer. The first/second/third layer thickness ratio was about 62:9:29.

In Examples 4–8, the resin mixture for each layer was hopper fed into an attached single screw extruder where the mixture was heat plastified and extruded through a 3 layer coextrusion die into a primary tube. Extruder barrel temperatures for the second (core) layer were between about 255–285° F. (124–141° C.); for the first (inner) layer was about 290–350° F. (143–177° C.); and for the third (outer) layer was about 290–340° F. (143–171° C.). The extrusion die had an annular exit opening of 3½ inch diameter with a 0.040 inch gap (8.89 cm×0.102 cm). The coextrusion die temperature profile was set from about 320° F. to 350° F. (160–177° C.). The extruded multilayer primary tube was cooled by spraying with cold tap water 45–60° F. (about 7–16° C.).

The cooled primary tube was flattened by passage through a pair of nip rollers. In Examples 4–8, a flattened tube of about 2¹¹⁄₁₆ to 2¾ inches (6.8 to 7.0 cm) flatwidth was produced. The cooled flattened primary tube was reheated, biaxially stretched, and cooled. The cooled, biaxially stretched and oriented film was flattened and wound on a reel. The orientation ratio was about 4.7:1 to 4.9:1 M.D. and about 4.4:1 to 4.9:1 T.D. for all the films. The draw point or orientation temperature was below the predominant melting point for each layer oriented and above that layer's predominant glass transition point (Tg) and is believed to be about 68–85° C. for Examples 4–11. The resultant films of Examples 4–11 having an average gauge of 1.85 to 2.10 mil, had an excellent appearance.

For Example 4, the heat sealing layer was the first layer of the multilayer film and the inner layer of the film tube. The first layer comprised an inventive blend of: about 33.0 wt. % of a first polymer comprising $EAO-A_2$; a second polymer comprising 23.0 wt. % of $EAO-B_2$ and a third polymer comprising 36.0 wt. % of $EVA-A_1$; 4.0% of a stabilizer additive in an EVA carrier resin sold under the trademark Ampacet 500301 by Ampacet Corp. of Tarrytown, N.Y., U.S.A.; and 4.0% by weight of a processing aid which combined fluoroelastomer and erucamide in an ethylene α-olefin copolymer carrier resin.

For Examples 4–8, each core layer comprised a 5.5:1 blend of vinylidene chloride-methylacrylate copolymer and vinylidene chloride-vinyl chloride copolymer and a minor amount (about 2–3%) of conventional plasticizing, lubricating and/or coloring additives such as ultramarine blue, see e.g. U.S. Pat. No. 4,798,751 which is hereby incorporated by reference in its entirety.

For Example 4, the third (outer) layer used polymers described above. The third layer comprised an inventive blend of: a first polymer of about 33.0 wt. % of $EAO-A_2$; a second polymer comprising 25.0 wt. % $EAO-B_2$; and a third polymer comprising 40.0 wt. % of $EVA-A_1$ and 2.0% by weight of a processing aid (Ampacet 500904).

For Example 5, the composition was as described for Example 4 except: (a) the first polymer was $EAO-A_1$; (b) the processing aid in the inner layer was changed to 4% Ampacet 100594 which combines a fluoroelastomer processing aid with an oleamide slip additive in an EAO carrier resin; and the processing aid in the outer layer was changed to 2.0% Ampacet 100510 which combines a fluoroelastomer processing aid with an oleamide slip additive in an EAO carrier resin.

For Example 6, the composition was as described for Example 5 except: in the inner and outer layers the first polymer is replaced with $EAO-A_3$; and the second polymer is replaced with $EAO-B_3$.

For Example 7, the composition was as described for Example 5 except: that in each of the inner and outer layers, the first polymer was $EAO-A_2$ and the second polymer was replaced with $EAO-B_1$.

For Example 8, the composition was as described for Example 7 except: that in each of the inner and outer layers, the first polymer was $EAO-A_1$ and the amount of $EAO-A_1$ in the inner layer was increased to 35% and the antiblock additive was decreased to 2% and is commercially available from Techmer PM under the trademark Techmer PM 11381E118. The processing aids in the inner and outer layers were replaced with fluoroelastomer and erucamide combination processing aides using in the inner layer an aid available from Techmer under the trademark Techmer PM 11416E118, and in the outer layer an aid available from Techmer under the trademark Techmer PM 11378E118.

For Comparative Example 9, the comparative film was as described for the inventive film of Example 8 except that in the inner and outer layers the first polymer is replaced with $EAO-C_1$ and the second polymer is replaced with $EAO-B_2$.

For Comparative Example 10, the comparative film was as described for the inventive film of Example 7 except that in the inner and outer layers the first polymer is replaced with $EAO-C_2$.

For Comparative Example 11, the comparative film was as described for the inventive film of Example 5 except that in the inner and outer layers the first polymer is replaced with $EAO-C_3$.

The multilayer films of Examples 4–11 were irradiated after orientation by electron beam according to methods well known in the art to a level of 3.75 Mrad. Physical properties of the irradiated multilayer films were tested and are reported in Tables 2 and 3.

TABLE 2

| Ex. No. | AVG. GAUGE mil ($\mu$) | TENSILE STRENGTH at RT X10³ psi (MPa) MD/TD | RAM PUNCTURE | | | SHRINK at 90° C. % MD/TD | HAZE % | GLOSS at 45° Angle H.U. | TEAR STRENGTH g/mil (g/$\mu$) MD/TD |
|---|---|---|---|---|---|---|---|---|---|
| | | | Force Newton | Stress MPa | Total Energy Joule | | | | |
| 4 | 2.01 (51) | 12.2/14.0 (84/96) | 90 | 142 | 0.95 | 43/51 | 9.6 | 71 | 17/21 (0.67/0.83) |
| 5 | 2.02 (51) | 13.5/14.3 (93/99) | 72 | 113 | 0.59 | 41/48 | 10.2 | 71 | 21/31 (0.83/1.2) |
| 6 | 2.08 (53) | 11.1/14.2 (76/98) | 103 | 133 | 0.92 | 44/49 | 12.0 | 69 | 16/23 (0.63/0.91) |
| 7 | 1.86 (47) | 12.7/15.0 (87/103) | 88 | 149 | 0.87 | 43/52 | 10.7 | 61 | 18/16 (0.71/0.63) |
| 8 | 2.04 (52) | 12.3/15.6 (85/108) | 96 | 148 | 0.96 | 45/52 | 9.6 | 72 | 25/31 (0.98/1.2) |
| 9 | 2.19 (56) | 10.3/10.6 (71/73) | 60 | 87 | 0.54 | 47/52 | 9.7 | 73 | 29/48 (1.1/1.9) |
| 10 | 2.18 (55) | 11.3/11.3 (78/78) | 85 | 112 | 0.82 | 52/53 | 10.9 | 76 | 34/55 (1.3/2.2) |
| 11 | 2.33 (59) | 11.9/12.2 (82/84) | 76 | 103 | 0.63 | 43/49 | 9.3 | 78 | 47/64 (1.9/2.5) |

RT = Room Temperature (~20–23° C.)

TABLE 3

| Ex. No. | IMPULSE SEAL RANGE min/max. volts | ELONGATION AT BREAK at RT % MD/TD | 1% SECANT MODULUS at RT MPa MD/TD | SHRINK FORCE AT 90° C. g/mil (g/$\mu$) MD/TD | SHRINK FORCE AT RT g/mil (g/$\mu$) MD/TD |
|---|---|---|---|---|---|
| 4 | 28–48 | 130/174 | 236/247 | 148/144 (5.8/5.7) | 103/88 (4.1/3.5) |
| 5 | 29–44 | 184/235 | 274/252 | 161/155 (6.3/6.1) | 87/92 (3.4/3.6) |
| 6 | 33–48 | 153/233 | 188/194 | 145/137 (5.7/5.4) | 69/97 (2.7/3.8) |
| 7 | 25–47 | 115/176 | 253/266 | 163/147 (6.4/5.8) | 90/104 (3.5/4.1) |
| 8 | 25–47 | 155/185 | 268/255 | 151/158 (5.9/6.2) | 75/111 (3.0/4.4) |
| 9 | 28–47 | 227/244 | 201/198 | 113/109 (4.4/4.3) | 77/70 (3.0/2.8) |
| 10 | 31–48 | 196/213 | 163/158 | 137/102 (5.4/4.0) | 88/80 (3.5/3.1) |
| 11 | 31–46 | 213/240 | 177/163 | 133/127 (5.2/5.0) | 64/93 (2.5/3.7) |

RT = Room Temperature (~20–23° C.)

Referring now to Tables 2 and 3, Comparative Example 9 presents physical property values which are acceptable for food packaging film useful for packaging processed meats. Example 8 of the invention has comparable or better values for shrink, puncture resistance and impulse seal range relative to Comparative Example 9, as well as relative to comparative examples 10 and 11, for multilayer films of substantially the same gauge thickness. Multilayer films of the present invention demonstrate excellent tensile strengths, and 1% secant modulus values. The optical properties were also quite good and the haze and gloss values reflect measurements made on films that have been coated with an antiblock starch powder. The elongation at break of the inventive film is also good. Film of the invention processed well.

The films of the invention have desirable sealing properties. The impulse seal range test demonstrates broader sealing range than that of the control. 1 and 2 volt differences in sealing range values are significant and the 2 volt extension on either end of the range is believed to translate into broader ranges for many commercially available sealers other than the SENTINEL.

In controlled field tests, bags formed from the films of Examples 8 and 9 were used to package short loins and evacuated and sealed with commercial impulse sealing machines. During the sealing operation, air was evacuated from the short loin containing bag and the evacuated bag was temporarily sealed by mechanically clamping near the mouth end and then spaced inwardly from the clamp the bag was impulse sealed. The excess film was severed from the sealed bag by a knife cutting across the mouth end between the impulse seal and the clamp. The inventive film tested out with no burn through leakers, no seal failures and only a 12% failure rate mostly due to low vacuum, at load-off for short loins compared to a 16% failure for films similar to comparative Example 9. In another test, the inventive film had only 7% failures with 8.5% failures for another commercially successful film for this application.

The above tests for leakers, and impulse seal range demonstrate films having a heat sealing layer can be made according to the invention to produce better seals. These seals are stronger, and less subject to failure due to variations in heat sealing process parameters and equipment and have a desirable combination of high shrinkability at low temperatures e.g. 90° C., high puncture resistance and a broad sealing range.

EXAMPLES 12–15

In Examples 12–14 (of the invention), biaxially stretched, heat shrinkable 3-layer coextruded films were made as described above for the inventive film of Example 8 at various times but differed in processing as noted below. Comparative Example 15 (not of the present invention) is a film similar to a commercially acceptable film useful for fresh red meat packaging.

Regarding the inventive films of Examples 12–14, the layer ratio was the same as for Example 8 and the formulations were the same except as follows. The films were all irradiated by an electron beam curing unit to varying levels to promote crosslinking. The biaxially stretched films of Examples 12–15 were irradiated at dosages of: 3.75, 3.00, 4.00, and 5.00 Megarads, respectively.

In Examples 12–15, a flattened primary tube of about 5½ to 11¼ inches circumference was produced. The biaxially stretched films were produced in tubes of varying diameter, with the resultant films having the following circumferences for respective Examples 12–15: 22 inches (56 cm), 52 inches (132 cm), 34 inches (86 cm), and 48 inches (122 cm). The M.D. draw or orientation ratio was about 4.7:1 to 5.2:1. and the T.D. ratio was about 3.8:1 to 5.0:1 for all films.

Physical properties of the irradiated multilayer films were tested and are reported in Tables 4 and 5.

TABLE 4

| Ex. No. | AVG. GAUGE mil (μ) | TENSILE STRENGTH at RT X10³ psi (MPa) MD/TD | RAM PUNCTURE Force Newton | RAM PUNCTURE Stress MPa | RAM PUNCTURE Total Energy Joule | SHRINK at 90° C. % MD/TD | HAZE % | GLOSS at 45° Angle H.U. | TEAR STRENGTH g/mil (g/μ) MD/TD |
|---|---|---|---|---|---|---|---|---|---|
| 12 | 1.92 (49) | 11.9/13.4 (82/92) | 85 | 139 | 0.68 | 43/51 | 10.6 | 75 | 16/30 (0.63/1.2) |
| 13 | 2.51 (64) | ND | 121 | 153 | 1.05 | 43/51 | 9.4 | 73 | 22/12 (0.86/0.47) |
| 14 | 3.68 (93) | 11.1/13.2 (77/91) | 149 | 128 | 1.32 | 44/49 | 13.2 | 67 | 16/20 (0.63/0.79) |
| 15 | 2.60 (66) | 12.8/14.4 (88/99) | 112 | 137 | 1.12 | 47/53 | 7.2 | 78 | 59/51 (2.3/2.0) |

ND = Not Determined
RT = Room Temperature (~20–23° C.)

TABLE 5

| Ex. No. | AVG. GAUGE mil (μ) | IRRADIATION Mrad | ELONGATION AT BREAK at RT % MD/TD | 1% SECANT MODULUS MPa MD/TD | SHRINK FORCE AT 90° C. g/mil (g/μ) MD/TD | SHRINK FORCE AT RT g/mil (g/μ) MD/TD |
|---|---|---|---|---|---|---|
| 12 | 1.92 (49) | 3.75 | 183/242 | 271/291 | 156/154 (6.1/6.1) | 25/35 (0.98/1.4) |
| 13 | 2.51 (64) | 3.00 | ND | ND | ND | ND |
| 14 | 3.68 (93) | 3.50 | 141/219 | 284/264 | 159/133 (6.3/5.2) | 74/81 (2.9/3.2) |
| 15 | 2.60 (66) | 5.00 | 258/267 | 250/249 | 136/153 (5.4/6.0) | 73/114 (2.9/4.5) |

RT = Room Temperature (~20–23° C.)
ND = Not Determined

Referring now to Tables 4 and 5, Examples 12–15 all present physical property values which are acceptable for food packaging films which are commercially useful for packaging articles e.g. fresh or processed meats. Puncture force and total energy absorbed increased as a function of average gauge for the inventive films of Examples 12–14. These ram puncture properties are better than the film of comparative example 15. Also tear strength in the machine and transverse directions are both advantageously lower than comparative example 15. The films of Examples 12–14 also have similar values for haze, gloss, and shrinkage as for the commercially acceptable film of comparative example 15. The haze and gloss values reflect measurements made on films that have been coated with an antiblock powder of starch.

Examples 12–14 are three layered films. However, multilayered films of two or four or more layers are contemplated by the invention. The inventive multilayer films may include tie or adhesive layers as well as layers to add or modify various properties of the desired film such as heat sealability, toughness, abrasion resistance, tear resistance, puncture resistance, optical properties, gas or water barrier properties, shrinkability, and printability. These layers may be formed by any suitable method including coextrusion, extrusion coating, and lamination.

EXAMPLES 16–18

In Examples 16 and 17, biaxially stretched, heat shrinkable, coextruded, multilayer films of the invention were made and their properties tested. Example 18 is a comparative example of a biaxially stretched, heat shrinkable, coextruded, multilayer film not of the invention.

cessing aid was changed to 3% of the above described Techmer PM 11384.

Examples 16–18 had M.D. and T.D. orientation ratios of 4.5:1 to 4.6:1 and 3.2:1 to 3.6:1, respectively.

The properties of the unirradiated films were tested and are reported in Table 6 below.

TABLE 6

| Ex. No. | AVG. GAUGE mil ($\mu$) | RAM PUNCTURE | | SHRINK at 90° C. % MD/TD | SHRINK FORCE | | TEAR STRENGTH g/mil ($g/\mu$) MD/TD |
|---|---|---|---|---|---|---|---|
| | | Maximum Force Newtons | Total Energy Joules | | 90° C. $g/\mu$ MD/TD | RT $g/\mu$ MD/TD | |
| 16 | 2.32 (58.9) | 85.8 | 0.677 | 46/43 | 6.2/4.8 | 2.6/2.7 | 23/55 (0.91/2.2) |
| 17 | 2.54 (64.5) | 128 | 1.534 | 51/46 | 6.7/4.6 | 3.0/2.6 | 54/51 (2.1/2.0) |
| 18 | 2.68 (68.1) | 84.3 | 0.791 | 55/52 | 6.1/5.0 | 2.9/2.1 | 51/70 (2.0/2.8) |

RT = Room Temperature (~20–23° C.)

Examples 16–18 are three layer films. One extruder was used for each layer. Each extruder was connected to an annular coextrusion die from which heat plastified resins were coextruded forming a primary tube having a first inner layer, a second core layer and a third outer layer, the first and third layers being directly attached to opposing sides of the second core layer. The first/second/third layer thickness ratio was about 62:9:29. These films were made by a process and under conditions similar to those described above for Examples 4–11 except as noted below.

For Example 16, the heat sealing layer was the first layer of the multilayer film and the inner layer of the film tube. The first layer comprised an inventive blend of: about 25.0 wt. % of EAO-$A_1$; a second polymer comprising 25.0 wt. % of EAO-$B_2$; and a third polymer comprising 46.0 wt. % of EVA-$A_1$; and 4% Ampacet 100594.

For Examples 16–18, each core layer comprised a 5.5:1 blend of vinylidene chloride-methylacrylate copolymer and vinylidene chloride-vinyl chloride copolymer.

For Example 16, the third (outer) layer used polymers described above with respect to the first layer. The third layer comprised an inventive blend of: a first polymer of about 25.0 wt. % of EAO-$A_1$; a second polymer comprising 25.0 wt. % of EAO-$B_2$; and a third polymer comprising 47.0 wt. % of EVA-$A_1$; and 3.0% by weight of a fluoroelastomer processing aid with an oleamide slip agent in an ethylene α-olefin copolymer carrier resin (Techmer PM 11384).

For Example 17 of the invention, the composition was as described for Example 16 except: in both the inner and outer layers the amount of the first polymer EAO-$A_1$ was increased to 60.0% and the amount of the third polymer EVA-$A_1$ was decreased to 18%; in the inner layer the second polymer was changed to 18% EAO-$B_1$; and in the outer layer the second copolymer was changed to 19% EAO-$B_1$.

For the Comparative Example 18 (not of this invention), the first layer comprised a blend of: 33.9% of EAO-$C_4$; 17.0% of EAO-$C_1$; 17.0% of EAO-$B_2$; 28.1% of EVA-$A_1$; and 4% of the above described processing aid Ampacet 100594.

The third (outer) layer of the film of Example 18 was identical to the inner layer for that Example except that the amount of EAO-$C_4$ was increased to 34.9% and the pro- Referring to Table 6, it is seen that the inventive film of Example 16 has an unexpected and beneficially lower tear strength relative to the comparative Example 18 while having comparable maximum puncture force in a thinner film. The shrink forces and shrinkage values all show suitable values for commercially acceptable films. The slightly lower total energy value is attributable to the thinner gauge. Example 17 is dramatically better in puncture properties having a 50% higher maximum puncture force and double the energy absorption relative to the comparative film, and the tear strength was over 25% lower in the transverse direction.

EXAMPLES 19–25

In Examples 19–25, biaxially stretched, heat shrinkable, coextruded, multilayer films of the invention were made and their physical properties tested.

Examples 19–25 are three layer films. Resins were coextruded forming a primary tube having a first inner layer, a second core layer and a third outer layer with a thickness ratio of about 62:9:29.

In Examples 19–25, for each layer, the resin mixture was hopper fed into an attached single screw extruder where the mixture was heat plastified and extruded through a three layer coextrusion die into a primary tube. The extruder barrel temperatures for the second (core)layer were between about 250–275° F. (121–135° C.); and for the first (inner) layer and the third (outer) layer were about 310–340° F. (154–171° C.). The die had an annular exit opening of 2⅜ inch diameter with a 0.080 inch gap (6.03 cm×0.203 cm). The die temperature profile was set from about 300° F. to 330° F. (149–166° C.). The extruded multilayer primary tube was cooled by spraying with cold tap water (about 7–14° C.).

The cooled primary tube was flattened by passage through a pair of nip rollers and a flattened tube of about 5⅜ to 5½ inches (13.7 to 14.0 cm) flatwidth was produced. The cooled flattened primary tube was reheated, biaxially stretched, and cooled.

The cooled, biaxially stretched and oriented film was flattened and wound on a reel. The M.D. draw ratio was about 4.4:1 to 4.8:1 and the T.D. orientation ratio was about 3.4:1 to 4.1:1 for all the films. The draw point temperature is believed to be about 167–185° F. (75–85° C.) for all the Examples. The resultant films of Examples 19–25 having an average gauge of 2.3 to 2.8 mil (58–71μ) were biaxially oriented and had an excellent appearance.

For Example 19, the heat sealing layer was the first layer of the multilayer film and the inner layer of the film tube. The first layer comprised an inventive blend of: about 30.0 wt. % of a first polymer comprising $EAO-A_1$; second polymer comprising 33.0 wt. % of $EAO-B_2$; and a third polymer comprising 33.0 wt. % of $EVA-A_1$; 4.0% of an a processing aid which combined fluoroelastomer and erucamide in an ethylene α-olefin copolymer carrier resin sold under the trademark Ampacet 500905 by Ampacet Corp. of Tarrytown, N.Y., U.S.A.

For Example 23 of the invention, the composition was as described for Example 21 except that the first and third polymers were present in amounts of 60 and 18 wt. %, of the inner layer respectively, and 60 and 17 wt. % in the outer layer, respectively.

For Example 24 of the invention, the composition was as described for Example 23 except that the second polymer was replaced with $EAO-B_1$.

For Example 25 of the invention, the composition was as described for Example 23 except as follows. The second polymer was replaced with $EAO-B_2$. The properties of the unirradiated films were tested and are reported in Table 7 below.

TABLE 7

| Ex. No. | AVG. GAUGE mil (μ) | RAM PUNCTURE | | | SHRINK at 90° C. % MD/TD | HAZE % | GLOSS at 45° Angle H.U. | TEAR STRENGTH g/mil (g/μ) MD/TD |
|---|---|---|---|---|---|---|---|---|
| | | MAXIMUM FORCE Newton | STRESS MPa | TOTAL ENERGY Joule | | | | |
| 19 | 2.43 (62) | 113 | 147 | 1.11 | 46/47 | 2.6 | 87 | 24/37 (0.94/1.5) |
| 20 | 2.73 (69) | 132 | 152 | 1.49 | 48/50 | 2.1 | 90 | 64/77 (2.5/3.0) |
| 21 | 2.56 (65) | 137 | 168 | 1.58 | 51/49 | 2.3 | 90 | 24/37 (0.94/1.5) |
| 22 | 2.59 (66) | 139 | 170 | 1.71 | 51/51 | 1.6 | 90 | 47/75 (1.9/3.0) |
| 23 | 2.33 (59) | 136 | 184 | 1.71 | 51/52 | 1.7 | 90 | 55/45 (2.2/1.8) |
| 24 | 2.52 (64) | 141 | 177 | 1.77 | 52/51 | 1.8 | 89 | 52/66 (2.0/2.6) |
| 25 | 2.58 (66) | 142 | 173 | 1.75 | 52/50 | 2.2 | 89 | 33/29 (1.3/1.1) |

RT = Room Temperature (~20–23° C.)

For Examples 19–25, each core layer comprised a 5.5:1 blend of vinylidene chloride-methylacrylate copolymer and vinylidene chloride-vinyl chloride copolymer.

For Example 19, the third (outer) layer used polymers described above with respect to the first layer. The third layer comprised an inventive blend of: a first polymer of about 30.0 wt. % of $EAO-A_1$; a second polymer comprising 35.0 wt. % of $EAO-B_2$; and a third polymer comprising 32.0 wt. % of $EVA-A_1$; and 3.0% by weight of a processing oleamide slip aid in an ethylene-α-olefin copolymer carrier resin (Ampacet 500903A).

For Example 20 of the invention, the composition was as described for Example 19 except that the first and third polymers were present in amounts of 45 and 18 wt. %, of the inner layer respectively, and 45 and 17 wt. % in the outer layer, respectively.

For Example 21 of the invention, the composition was as described for Example 19 except as follows. The second polymer of both the inner and outer layers was present in respective amounts of 18 and 20 wt. % of $EAO-B_4$. The first polymer was present in both the inner and outer layers in an amount of 45 wt. % of each respective layer.

For Example 22 of the invention, the composition was as described for Example 21 except as follows. The first polymer was changed to $EAO-A_1$. The second and third polymers were present in respective amounts of 33 and 18 wt. % of the inner layer, and in respective amounts of 35 and 17 wt. % of the outer layer.

Referring to Table 7, it is demonstrated that biaxially stretched films having high shrinkage values and excellent optical properties may be made according to the invention with surprisingly high puncture resistance. The maximum puncture force, stress and total energy absorbed, for all the examples, is very high. Advantageously these high values make the inventive films less likely to be punctured during use thereby causing damage to products packaged therein. As the amount of the first polymer of ethylene hexene-1 copolymer in the inventive layers increases the maximum puncture force and total energy absorbed increases indicating films that are more resistant to failure by puncture. Also the inventive film embodiments of Examples 19, 21, and 25 all demonstrate unexpectedly low and advantageous tear strengths. It is also evident that a variety of second polymers may be used in the inventive blends to produce films having improved properties. The optical properties were also quite good and these haze and gloss values reflect measurements made on films that have not been coated with any antiblock powder or starch.

EXAMPLES 26–30

In Examples 26–30, biaxially stretched, heat shrinkable, coextruded, multilayer films of the invention were made and their physical properties tested. The films were made by a process similarly to that disclosed above for Examples 12–14, except as noted below. All of these inventive films were of the same composition, but varied in film thickness.

The orientation ratios were 5.0:1 to 5.3:1 (M.D.) and 3.8:1 to 4.0:1 (T.D.). The draw point temperatures were measured for the films of Examples 27, 28,29, and 30 to be 177° F. (81° C.), 175° F. (79° C.), 172° F. (78° C.), and 163° F. (73° C.), respectively. The film of example 26 was irradiated to a level of about 3.75 Mrad and had a tube circumference of about 28 inches (71 cm.) whereas the films of Examples 27–30 all were irradiated to a level of about 4.00 Mrad and had a tube circumference of about 34 inches (86 cm.).

For each of the films of Examples 26–30, the first layer comprised an inventive blend of: about 58.0 wt. % of EAO-$A_1$; a second polymer comprising 18.0 wt. % of EAO-$B_1$; and a third polymer comprising 18.0 wt % of EVA-$A_1$; 2.0% of a stabilizer (Techmer PM 11381E118), U.S.A.; and 4.0% by weight of a processing aid which combined fluoroelastomer and erucamide in an ethylene α-olefin copolymer carrier resin which is available under the trademark Techmer PM 11416E118 by Techmer PM of Clinton, Tenn., U.S.A.

For Examples 26–30, each core layer comprised a 5.5:1 blend of vinylidene chloride-methylacrylate copolymer and vinylidene chloride-vinyl chloride copolymer.

For Examples 26–30, the third (outer) layer used polymers described above with respect to the first layer. The third layer comprised an inventive blend of: a first polymer of about 60.0 wt. % of EAO-$A_1$; a second polymer comprising 20.0 wt. % of EAO-$B_1$; and a third polymer comprising 18.0 wt. % of EVA-$A_1$; and 2.0% by weight of a fluoroelastomer and erucamide processing aid in an ethylene-α-olefin copolymer carrier resin (Techmer PM 11378E118).

The properties of the irradiated films were tested and are reported in Tables 8 and 9 below.

TABLE 8

| Ex. No. | AVG. GAUGE mil ($\mu$) | IRRADIATION Mrad | RAM PUNCTURE | | | SHRINK at 90° C. % MD/TD | HAZE % | GLOSS at 45° Angle H.U. | TEAR STRENGTH g/mil (g/$\mu$) MD/TD |
|---|---|---|---|---|---|---|---|---|---|
| | | | MAXIMUM FORCE Newton | STRESS MPa | TOTAL ENERGY Joule | | | | |
| 26 | 2.32 (59) | 3.75 | 133 | 181 | 1.27 | 48/54 | 7.2 | 74 | 17/17 (0.67/0.67) |
| 27 | 2.67 (68) | 4.00 | 150 | 178 | 1.55 | 47/54 | 8.7 | 75 | 39/36 (1.5/1.4) |
| 28 | 3.24 (82) | 4.00 | 174 | 169 | 1.76 | 48/53 | 9.2 | 75 | 38/42 (1.5/1.7) |
| 29 | 4.06 (103) | 4.00 | 202 | 157 | 2.06 | 48/53 | 12.9 | 72 | 24/30 (0.94/1.2) |
| 30 | 4.45 (113) | 4.00 | 222 | 158 | 2.40 | 48/52 | 15.6 | 68 | 28/38 (1.1/1.5) |

TABLE 9

| Ex. No. | TENSILE STRENGTH at RT X$10^3$ psi (Mpa) MD/TD | ELONGATION AT BREAK at RT % MD/TD | 1% SECANT MODULUS X$10^3$ psi MPa MD/TD | SHRINK FORCE AT 90° C. g/mil (g/$\mu$) MD/TD | SHRINK FORCE AT RT g/mil (g/$\mu$) MD/TD |
|---|---|---|---|---|---|
| 26 | 14.3/17.0 (99/117) | 189/220 | 33.8/31.1 (233/215) | 172/163 (6.8/6.4) | 57/61 (2.2/2.4) |
| 27 | 12.1/16.0 (83/110) | 137/200 | 32.5/37.7 (224/260) | 159/149 (6.3/5.9) | 71/85 (2.8/3.3) |
| 28 | 12.1/14.3 (83/99) | 144/217 | 35.1/34.6 (242/238) | 173/152 (6.8/6.0) | 68/87 (2.7/3.4) |
| 29 | 12.7/12.8 (88/88) | 168/197 | 34.9/41.6 (241/287) | 173/158 (6.8/6.2) | 82/94 (3.2/3.7) |
| 30 | 12.0/13.6 (83/94) | 160/197 | 36.6/38.0 (252/262) | 168/162 (6.6/6.4) | 74/128 (2.9/5.0) |

RT = Room Temperature (~20–23° C.)

Referring to Tables 8 and 9, the puncture resistance of the inventive films of Examples 26–30 is surprisingly and advantageously high, as defined by the maximum force to puncture, stress, and total energy absorbed. Puncture resistance improves with increasing film thickness while the shrinkage and shrink force properties are relatively constant. Desirably and unexpectedly low tear strengths were also measured indicating easier cutting of the film during bag formation and/or packaging operations. The combination of low tear strength with high puncture resistance is unexpected and surprising. The films were comparable or superior to commercially available films with respect to shrinkage values, shrink forces, optical properties, and tensile properties. The inventive films of Examples 29 and 30 in particular have phenomenally high maximum puncture forces and total energy absorbed in combination with low tear strengths in both the machine and transverse directions. These extremely good properties are not predicted from the prior art and are of great practical utility in packaging films e.g. for fresh red meat applications. The optical properties were also quite good for the thick films made and these haze and gloss values reflect measurements made on films that have been coated with an antiblock powder of starch.

Biaxially stretched, heat shrinkable 5-layer coextruded films may also be made using similar equipment as for the above examples except that additional extruders and a five layer coextrusion die may be used. Various dies known in the art may be used including e.g. spiral dies. Films may be made under similar conditions and e.g. as noted below. The resins may be heat plastified by extruders and extruded through the die into a primary tube having five concentric sequential layers (1,2,3,4,5) with the first layer being the inside surface layer of the tube and the fifth layer being the exterior surface layer of the tube. The first/second/third/fourth/fifth layer ratio may be e.g. 10/50/7/10/23.

EXAMPLES 31–84

Examples 31–84 are additional illustrative embodiments contemplated by the invention. The structures of these examples are listed in Tables 10–13. These structures made be moldings, sheets, tubes, or films. Inventive films having the indicated structures may be made by processes similar to those disclosed above including, without limitation, blown bubble, double bubble or trapped bubble, tenter frame, co-extrusion, and coating lamination processes (all of which processes are suitable for producing all the films of the invention including unoriented, uni- or bi-axially oriented, heat shrinkable or non-heat shrinkable films. Structures of the invention may be crosslinked or not, e.g. by irradiation at level of 2–5 Mrad or higher either before or after any stretching or shaping or orientation process. All of the inventive films of these or any of the above disclosed embodiments may be used for packaging materials, as overwraps or formed into bags. These films or bags may be closed by clipping, but also have excellent heat sealing properties.

In Examples 31–42 and 62, inventive blends are shown as the first layer of a multilayer structure, e.g. film, of at least 5 layers, whereas in Examples 43–61 inventive blends are shown as an interior layer of a multilayer structure of at least 5 layers, however it is to be appreciated that the blend is inventive in its own right and may comprise the structure of monolayer or multilayer structures of 2 or more layers as either or both of one or more surface or interior layers. Also, in Examples 63–84 monolayer structures are shown, but it is to be appreciated that these disclosed structures may form one or more layers of a multilayer structure e.g. heat shrinkable film. Referring to Tables 10–13 various structures are shown of the invention.

TABLE 10

| Ex. # | First Layer | Second Layer | Third Layer | Fourth Layer | Fifth Layer |
|---|---|---|---|---|---|
| 31 | 28% A + 30% D + 20% B + 20% C + 2% E | 75% D + 25% C | $O_2$ Barrier Layer e.g. EVOH or pvdc | 75% D + 25% C | 80% D + 18% B + 2% E |
| 32 | 28% A + 30% D + 20% B + 20% C + 2% E | 75% D + 25% C | $O_2$ Barrier Layer e.g. EVOH or pvdc | 75% D + 25% C | 98% F + 2% E |
| 33 | 28% A + 30% D + 20% B + 20% C + 2% E | 75% D + 25% C | $O_2$ Barrier Layer e.g. EVOH or pvdc | 75% D + 25% C | 28% A + 30% D + 20% B + 20% C + 2% E |
| 34 | 28% A + 30% D + 20% B + 20% C + 2% E | 30% A + 50% D + 20% C | $O_2$ Barrier Layer e.g. EVOH or pvdc | 30% A + 50% D + 20% C | 28% A + 50% D + 20% C + 2% E |
| 35 | 28% A + 20% C + 30% D + 20% F + 2% E | 25% C + 75% G | $O_2$ Barrier Layer e.g. EVOH or pvdc | 25% C + 75% G | 80% D + 18% F + 2% E |
| 36 | 28% A + 50% D + 20% F + 2% E | 20% B + 25% C + 55% G | $O_2$ Barrier Layer e.g. EVOH or pvdc | 25% C + 75% G | 98% F + 2% E |
| 37 | 28% A + 20% C + 30% D + 20% B + 2% E | 75% D + 25% C | $O_2$ Barrier Layer e.g. EVOH or pvdc | 75% D + 25% C | 28% A + 50% D + 20% B + 2% E |
| 38 | 28% A + 20% C + 30% D + 20% B + 2% E | 30% A + 50% D + 20% C | $O_2$ Barrier Layer e.g. EVOH or pvdc | 30% A + 50% D + 20% C | 28% A + 50% D + 20% C + 2% E |
| 39 | 28% D + 30% A + 20% B + 20% C + 2% E | 75% A + 25% C | $O_2$ Barrier Layer e.g. EVOH or pvdc | 75% A + 25% C | 80% D + 18% B + 2% E |
| 40 | 28% D + 30% A + 20% B + 20% C + 2% E | 75% A + 25% C | $O_2$ Barrier Layer e.g. EVOH or pvdc | 75% A + 25% C | 98% F + 2% E |

TABLE 11

| Ex. # | First Layer | Second Layer | Third Layer | Fourth Layer | Fifth Layer |
|---|---|---|---|---|---|
| 41 | 28% D + 30% A + 20% B + 20% C + 2% E | 75% A + 25% C | $O_2$ Barrier Layer e.g. EVOH or pvdc | 75% A + 25% C | 28% A + 30% D + 20% B + 20% C + 2% E |
| 42 | 28% A + 30% D + 20% B + 20% C + 2% E | 30% D + 50% A + 20% C | $O_2$ Barrier Layer e.g. EVOH or pvdc | 30% D + 50% A + 20% C | 28% A + 50% D + 20% C + 2% E |
| 43 | 28% D + 50% A + 20% F + 2% E | 20% B + 25% C + 55% G | $O_2$ Barrier Layer e.g. EVOH or pvdc | 25% C + 75% G | 80% D + 18% F + 2% E |
| 44 | 28% D + 50% A + 20% F + 2% E | 20% B + 25% C + 55% G | $O_2$ Barrier Layer e.g. EVOH or pvdc | 25% C + 75% G | 98% F + 2% E |
| 45 | 28% D + 50% A + 20% B + 2% E | 20% B + 55% D + 25% C | $O_2$ Barrier Layer e.g. EVOH or pvdc | 75% D + 25% C | 28% D + 50% A + 20% B + 2% E |
| 46 | 28% D + 50% A + 20% B + 2% E | 30% A + 20% B + 30% D + 20% C | $O_2$ Barrier Layer e.g. EVOH or pvdc | 30% A + 50% D + 20% C | 28% D + 50% A + 20% C + 2% E |
| 47 | 40% A + 58% F + 2% E | 50% A + 25% C + 25% F | $O_2$ Barrier Layer e.g. EVOH or pvdc | 50% A + 25% C + 25% F | 40% A + 58% F + 2% E |
| 48 | 40% A + 58% H + 2% E | 50% A + 25% C + 25% H | $O_2$ Barrier Layer e.g. EVOH or pvdc | 75% A + 25% C + 25% H | 98% F + 2% E |
| 49 | 40% A + 58% I + 2% E | 50% A + 25% C + 25% I | $O_2$ Barrier Layer e.g. EVOH or pvdc | 50% A + 25% C + 25% I | 40% A + 58% I + 2% E |

TABLE 11-continued

| Ex. # | First Layer | Second Layer | Third Layer | Fourth Layer | Fifth Layer |
|---|---|---|---|---|---|
| 50 | 40% D + 58% F + 2% E | 20% A + 30% D + 30% F + 20% C | O₂ Barrier Layer e.g. EVOH or pvdc | 30% D + 50% F + 20% C | 40% D + 58% F + 2% E |

TABLE 21

| Ex. # | First Layer | Second Layer | Third Layer | Fourth Layer | Fifth Layer |
|---|---|---|---|---|---|
| 51 | 40% D + 58% G + 2% E | 25% C + 75% G | O₂ Barrier Layer e.g. EVOH or pvdc. | 25% C + 75% G | 40% D + 58% G + 2% E |
| 52 | 40% D + 58% I + 2% E | 25% C + 75% I | O₂ Barrier Layer e.g. EVOH or pvdc. | 25% C + 75% I | 98% I + 2% E |
| 53 | 98% F + 2% E | 20% A + 20% B + 35% D + 25% C | O₂ Barrier Layer e.g. EVOH or pvdc. | 75% D + 25% C | 98% F + 2% E |
| 54 | 98% G + 2% E | 30% A + 20% B + 30% D + 20% C | O₂ Barrier Layer e.g. EVOH or pvdc. | 30% A + 50% D + 20% C | 98% G + 2% E |
| 55 | 98% H + 2% E | 25% B + 50% G + 25% C | O₂ Barrier Layer e.g. EVOH or pvdc. | 75% G + 25% C | 98% H + 2% E |
| 56 | 98% F + 2% E | 25% B + 50% G + 25% C | O₂ Barrier Layer e.g. EVOH or pvdc. | 75% G + 25% C | 98% F + 2% E |
| 57 | 98% F + 2% E | 25% B + 50% G + 25% C | O₂ Barrier Layer e.g. EVOH or pvdc. | 75% G + 25% C | 98% F + 2% E |
| 58 | 98% I + 2% E | 75% 1 + 25% C | O₂ Barrier Layer e.g. EVOH or pvdc. | 75% I + 25% C | 98% I + 2% E |
| 59 | 98% F + 2% E | 20% A + 25% C + 55% F | O₂ Barrier Layer e.g. EVOH or pvdc. | 25% C + 75% F | 98% F + 2% E |
| 60 | 98% H + 2% E | 25% C + 75% H | O₂ Barrier Layer e.g. EVOH or pvdc. | 25% C + 75% H | 98% H + 2% E |
| 61 | 98% G + 2% E | 25% B + 50% G + 25% C | O₂ Barrier Layer e.g. EVOH or pvdc. | 75% G + 25% C | 98% G + 2% E |
| 62 | 20% C + 78% I + 2% E | 75% A + 25% C | O₂ Barrier Layer e.g. EVOH or pvdc. | 75% A + 25% C | 98% I + 2% E |

TABLE 13

| Example # | Layer Composition |
|---|---|
| 63 | 58% G + 20% B + 20% C + 2% E |
| 64 | 53% H + 25% D + 20% C + 2% E |
| 65 | 28% A + 50% F + 20% C + 2% E |
| 66 | 78% I + 20% C + 2% E |
| 67 | 50% I + 30% D + 18% C + 2% E |
| 68 | 20% C + 78% I + 2% E |
| 69 | 25% A + 20% B + 53% F + 2% E |
| 70 | 20% C + 78% H + 2% E |
| 71 | 25% A + 20% C + 53% G + 2% E |
| 72 | 40% F + 40% A + 20% C |
| 73 | 25% A + 20% C + 30% F + 35% D |
| 74 | 35% G + 25% A + 20% B |
| 75 | 40% G + 20% B + 20% C + 20% D |
| 76 | 40% H + 40% A + 20% C |
| 77 | 40% H + 40% D + 20% C |
| 78 | 40% I + 40% A + 20% C |
| 79 | 50% I + 30% D + 20% C |
| 80 | 75% I + 25% C |
| 81 | 75% H + 25% C |
| 82 | 50% G + 25% B + 25% C |
| 83 | 55% F + 25% A + 20% C |
| 84 | 50% H + 30% G + 20% C |

Referring to Tables 10 and 11, Component A comprises a first polymer having a melting point (m.p.) of 80 to 98° C. comprising a copolymer of predominantly ethylene and at least one α-olefin comprising hexene-1. Component B comprises a second polymer (115 to 128° C. m.p.) comprising a copolymer of ethylene and at least one α-olefin (EAO). Component C comprises a third polymer (60 to 110° C. m.p.) comprising a copolymer of ethylene and a vinyl ester (e.g. EVA) or an alkyl acrylate. Component D comprises an EAO, preferably a copolymer of predominantly ethylene and octene-1, (85 to 110° C. m.p.), and preferably having a $\overline{M}_w/\overline{M}_n$<3.5. Component E comprises a processing aid. Component F comprises an interpolymer having at least two melting points, one of which is of 85 to 110° C., and another of which is of 115 to 128° C. Component G comprises an interpolymer having at least two melting points, one of which is of 80 to 98° C. and relates to a component being a copolymer of ethylene and hexene-1, and another of which is of 85 to 110° C. and relating to a component being a copolymer of ethylene and at least one α-olefin (preferably octene-1). Component H comprises an interpolymer having at least two melting points, one of which is of 80 to 98° C. and relates to a component being a copolymer of ethylene and hexene-1, and another of which is of 115 to 128° C. and relating to a component being a copolymer of ethylene and at least one α-olefin (preferably octene-1). Component I comprises an interpolymer having at least three melting points, the first of which is 80 to 98° C. and relates to a component being a copolymer of ethylene and hexene-1, the second of which is of 85 to 110° C. and relating to an EAO component preferably a copolymer of ethylene and octene-1, and the third of which is of 115 to 128° C. and relating to a component being a copolymer of ethylene and at least one α-olefin (preferably octene-1) each of the three m.p. peaks being at least 5° C. apart from one another.

Referring to the above embodiments disclosed in Examples 1–30 and those disclosed in Tables 10–13, the invention contemplates the use of blends of the first, second, and/or third polymer components which are made in situ by the polymer resin manufacturer as, for example, interpolymers. Thus, the claimed and disclosed blends may be of separate resins, e.g. in pellet or powder form, which are combined by dry, wet or melt mixing post-polymer manufacture, e.g. by a converter or film manufacturer, or alternatively one or more of the polymer components may be formed with an additional polymer by the resin manufacturer using a process where monomer streams or components feed a sequential or simultaneous catalyst system. Interpolymerized products (i.e. interpolymers) are contemplated by the present invention and included within the definition thereof. An interpolymer means a polymer product comprising at least two polymers e.g. copolymers of ethylene which are polymerized in either a single reactor or separate multiple reactors operated in parallel or series, e.g. as disclosed in Parikh et al, PCT Application No. US92/11269 (Publication No. WO 93/13143) entitled "Ethylene Interpolymer Polymerizations" filed Dec. 29, 1992 claiming a U.S. priority Ser. No. 07/815,716, filed Dec. 30, 1991, which application and disclosure is hereby incorporated by reference in its entirety.

In another aspect of the invention, one or more gas barrier layers may be incorporated into a multilayer film as either an intermediate or surface layer or both. For example, ethylene vinyl alcohol copolymer (EVOH), vinylidene chloride-methylacrylate copolymer, nylon such as nylon 6 or amorphous nylon, polyvinylidene chloride-vinyl chloride copolymer (PVDC), acrylonitriles and other materials having oxygen barrier properties may be used in one or more layers such as the core layer. Blends of gas barrier resins may also be used e.g. a blend of nylon with EVOH. Typical gas barrier films will have an $O_2$ transmission of less than 15 cc/100 in$^2$ for 24 hrs. at 1 atm. In various multilayer embodiments well known adhesive resins such as maleic anhydride modified EVAs or polyethylenes, or acrylic acid or methacrylic acid copolymers e.g. with ethylene may be used in addition to or in place of various polymers indicated above in intermediate or outer layers to adhere to adjacent layers. Use of such adhesives may be advantageous e.g. to bond polymers such as EVOH to ethylene polymer containing layers such as VLDPE.

For preferred 5 layer film embodiments, the total film thickness is typically such that of the total film thickness, the first layer will typically comprise 10–50%; the second layer, 10–50%; the third layer, 5–10%; the fourth layer, 10–25%; and the fifth layer, 10–25%.

Puncture resistance of the inventive compositions when made into oriented films may be dramatically affected by adjustment of the draw point temperature. Inventive films having unexpectedly high puncture resistance properties including very high total energy absorption E and maximum puncture force P are made by carefully controlling the draw point temperature. The unique formulations result in dramatic property improvements. Shrinkage values, shrink force, and puncture resistance properties are all strongly affected by draw point temperature. If the film is oriented at too high a temperature these properties will be unnecessarily low and not take full advantages of the invention for some uses. The best draw point temperature may be experimentally found without undue experimentation by those skilled in the art and may depend upon the exact formulation selected, number of layers, thicknesses, orientation speeds, etc.

Figure 4:
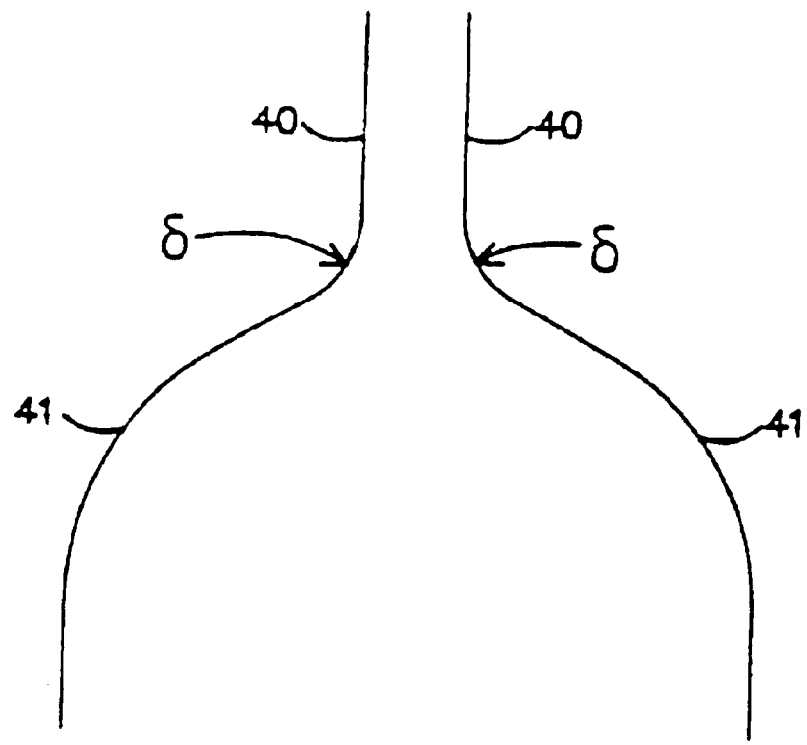
FIG. 4 is a schematic view of film tube expansion.

The puncture resistance values demonstrated by the invention are greatly superior to many prior art films. The draw point temperature may be measured by an infrared pyrometer directed as close to the actual bubble expansion draw point as possible. The draw point is the point location on the primary tube that begins to stretch greatly as it transitions to a secondary bubble. Referring to FIG. 4 of the drawings a schematic view of a primary tube 40 is presented with the draw point indicated by arrows δ resulting in an expanded oriented film 41. Good films of the invention may be made at orientation (draw point) temperatures of 183° F. and the like, but the inventive films permit the manufacture of extraordinary films having dramatically improved puncture properties by utilizing lower draw point temperatures, especially draw point temperatures in the range of 150 to 190° F. (65–88° C.), and preferably of 65 to 79° C.

Those skilled in the art of manufacturing biaxially oriented films know of different and various processes of such manufacture and the inventive films include biaxially oriented or biaxially stretched films regardless of the method used for their production as well as uniaxially oriented and essentially unoriented films including slot cast and hot blown films.

In another embodiment the second polymer of the inventive blend described above is replaced with a copolymer predominantly of ethylene with at least one α-olefin, preferably octene-1 (85 to 110° C. m.p.), and preferably has a $\overline{M}_w/\overline{M}_n$<3.5.

In yet another embodiment, advantageous blends, films and processes for making films may utilize a copolymer of ethylene and octene-1 (80 to 98° C. m.p.) as the first polymer in place of, or in addition to, the ethylene hexene-1 copolymer described above.

Further examples of preferred embodiments particularly useful e.g. for processing and packaging films in applications where products undergo post-cooking surface pasteurization and/or are cook-in foods, such as cooked turkey breasts, hams, and/or beef are presented below.

EXAMPLES 85–89

In Examples 86–89, inventive biaxially stretched, heat shrinkable, coextruded, multilayer films were made and tested. Example 85 is a comparative example not of the present invention.

Examples 86–89 are essentially four layer films; however due to equipment availability during experimental runs, a 5 layer die was used and the identical layer formulation was used for both the fourth and fifth layers (Example 85 is essentially a three layer film because the first and second layers had identical formulations as well as the fourth and fifth layers). Use of the 5 layer die to make what is formula-wise a four layer film (three layer for Example 85) is reflected in the following composition table. One extruder was used for each layer. Each extruder was connected to the same annular coextrusion die from which heat plastified resins were coextruded forming a primary tube having a first inner layer, a second intermediate layer, a third core layer, a fourth intermediate layer, and a fifth outer layer. First and fifth layers were directly attached to opposing sides of the third core layer via second and fourth intermediate layers respectively. The first/second/third/fourth/fifth layer thickness ratio was about 10:50:6.6:23.4:10.

In Examples 85–89, for each layer, the resin mixture was hopper fed into an attached single screw extruder where the mixture was heat plastified and extruded through a 5 layer coextrusion die into a primary tube. The extruder barrel temperatures for the third (core) layer was about 270–295° F. (132–146° C.); and for the remaining layers was about 325–350° F. (163–177° C.). The die temperature profile was set from about 310° F. to 330° F. (154–166° C.). The coextruded primary tube was cooled by spraying with cold tap water 45–60° F. (about 7–16° C.).

The cooled primary tube was flattened by passage through a pair of nip rollers. In Examples 85–89, a flattened primary tube of about 3⁵⁄₁₆ inches (10.0 cm) flatwidth was produced. The cooled flattened primary tube was reheated, biaxially stretched, and cooled again.

The cooled, stretched film was flattened and wound on a reel. The M.D. draw ratio was about 3.5:1 to 3.6:1 and the T.D. orientation ratio was about 3.6:1 to 3.7:1 for the films of Examples 85–87. For Examples 88 and 89, the M.D./T.D. orientation ratios were 4.4:1/3.8:1, and 3.9:1/3.7:1, respectively. The draw point or orientation temperature was below the predominant melting point for each layer oriented and above that layer's predominant Tg and is believed to be about 68–85° C. for Examples 85–89. The resultant biaxially oriented films of Examples 85–89 all had good shrinkage values at 90° C.

For Examples 85–89, the film structures were as follows. The heat sealing layer was the first layer of the multilayer film and the inner layer of the film tube. The layer compositions are given in Table 14 below. Percentages are based upon weight for the indicated layer.

Referring to Table 14, EAO-B$_2$ is an ethylene-α-olefin copolymer of VLDPE sold by Dow. The EVA used in these examples was a copolymer of ethylene and vinyl acetate copolymer sold by the Exxon Chemical Co. under the brand designation ESCORENE™ LD 701 with the following reported properties, a density($\rho$) of 0.93 g/cm$^3$, a vinyl acetate content of 10.5 wt. %, and a melt index (M.I.) of about 0.19 dg/min., and an m.p. of about 97° C. C$_3$C$_2$ is reportedly a random copolymer of propylene and ethylene having an m.p.<136° C., a $\rho$ of about 0.895 g/cm$^3$, a Vsp of about 120° C. (ASTM 1525 (1 Kg)) and a M.I. at 230° C. and 2.16 Kg of about 5 dg/min. (available from Solvay & Cie as a bioriented film grade resin, trademark Eltex P KS 409). The stabilizer is a stabilizing antiblock additive that is available from Techmer PM$_n$, Clinton, Tenn., U.S.A. under the trademark Techmer PM 11381E118. The processing aid (PM 11368E118), and the slip/processing aid (PM 11378E118) are also available from Techmer PM.

For Examples 85–89, each core layer comprised a 5.5:1 blend of vinylidene chloride-methylacrylate copolymer (vdc-ma) and vinylidene chloride-vinyl chloride copolymer (vdc-vc). Minor amounts of plasticizing, lubricant and/or colorant additives such as ultramarine blue were also used and are designated as PC additives in the tables. For these and other examples a preferred blend of vinylidene chloride-methylacrylate copolymer (vdc-ma) and vinylidene chloride-vinyl chloride copolymer (vdc-vc) is disclosed in U.S. Pat. No. 4,798,751 which patent is hereby incorporated by reference in its entirety.

The above film samples were not irradiatively treated. However, they may also be usefully crosslinked by irradiation e.g. at a level of 2–6 megarads (Mrad) after biaxial stretching (which irradiative process is hereinafter referred to as post-irradiation), in the manner generally described in Lustig et al, U.S. Pat. No. 4,737,391 which is hereby incorporated by reference. Additional properties of Examples 85–87 were tested and reported in Table 15.

TABLE 14

| Ex. No. | First Layer (Inner) | Second Layer | Third Layer (Core) | Fourth Layer | Fifth Layer (Outer) |
|---|---|---|---|---|---|
| 85 | 23% EAO B$_2$<br>33% EAO C$_1$<br>38.75% EVA<br>3.25% Process. Aid<br>2% Stabilizer | 23% EAO B$_2$<br>33% EAO C$_1$<br>38.75% EVA<br>3.25% Process. Aid<br>2% Stabilizer | 82.5% vdc-ma<br>15% vdc-vc<br>2.5% PC additive | 25% EAO B$_2$<br>33% EAO C$_1$<br>40% EVA<br>2% slip/process. aid | 25% EAO B$_2$<br>33% EAO C$_1$<br>40% EVA<br>2% slip/process. aid |
| 86 | 94.75% EAO B$_2$<br>3.25% Process. Aid<br>2% Stabilizer | 23% EAO B$_2$<br>33% EAO C$_1$<br>38.75% EVA<br>3.25% Process. Aid<br>2% Stabilizer | 82.5% vdc-ma<br>15% vdc-vc<br>2.5% PC additive | 25% EAO B$_2$<br>33% EAO C$_1$<br>40% EVA<br>2% slip/process. aid | 25% EAO B$_2$<br>33% EAO C$_1$<br>40% EVA<br>2% slip/process. aid |
| 87 | 74.75% EAO B$_2$<br>20% EAO C$_1$<br>3.25% Process. Aid<br>2% Stabilizer | 23% EAO B$_2$<br>33% EAO C$_1$<br>38.75% EVA<br>3.25% Process. Aid<br>2% Stabilizer | 82.5% vdc-ma<br>15% vdc-vc<br>2.5% PC additive | 25% EAO B$_2$<br>33% EAO C$_1$<br>40% EVA<br>2% slip/process. aid | 25% EAO B$_2$<br>33% EAO C$_1$<br>40% EVA<br>2% slip/process. aid |
| 88 | 94.75% EAO B$_2$<br>3.25% Process. Aid<br>2% Stabilizer | 40% EAO B$_2$<br>20% EAO C$_1$<br>34.75% EVA<br>3.25% Process. Aid<br>2% Stabilizer | 82.5% vdc-ma<br>15% vdc-vc<br>2.5% PC additive | 42% EAO B$_2$<br>20% EAO C$_1$<br>36% EVA<br>2% slip/process. aid | 42% EAO B$_2$<br>20% EAO C$_1$<br>36% EVA<br>2% slip/process. aid |
| 89 | 100% C$_3$C$_2$ | 40% EAO B$_2$<br>20% EAO C$_1$<br>34.75% EVA<br>3.25% Process. Aid<br>2% Stabilizer | 82.5% vdc-ma<br>15% vdc-vc<br>2.5% PC additive | 42% EAO B2<br>20% BAO C1<br>36% EVA<br>2% slip/process. aid | 42% EAO B$_2$<br>20% EAO C$_1$<br>36% EVA<br>2% slip/process. aid |

TABLE 15

| Ex. No. | Avg. GAUGE mil (micron) | FLAT WIDTH (mm) | ELONGATION AT BREAK % at RT MD/TD | TENSILE STRENGTH X10³ psi at RT (MPa) MD/TD | 1% SECANT MODULUS X10³ psi at RT (MPa) MD/TD | SKRINK at 90° C. % MD/TD | O₂GTR†* at RT 0% RH | HAZE % | GLOSS AT 45° ANGLE Hunter Units |
|---|---|---|---|---|---|---|---|---|---|
| 85 | 2.47 (62.7) | 368 | 279/255 | 10.7/9.8 (74/68) | 33.2/31.5 (229/217) | 35/48 | 43 (66) | 9.5 | 60 |
| 86 | 2.63 (66.8) | 365 | 297/233 | 10.9/11.7 (75/80) | 35.2/35.6 (243/245) | 35/46 | ND | 6.1 | 76 |
| 87 | 2.79 (70.9) | 362 | 304/241 | 10.5/10.9 (72/75) | 30.4/34.2 (210/236) | 35/47 | ND | 5.5 | 79 |

†Oxygen gas transmission rate (O₂GTR) in units of cm³ per meter² per 24 hours at 1 atmosphere for the film tested.
*For O₂GTR the film thickness is below the rate in microns ( ).
ND = NOT DETERMINED
RT = ROOM TEMPERATURE (~20–23° C.)
RH = RELATIVE HUMIDITY Referring to Tables 14 and 15, Comparative Example 85 has property values acceptable for commercially useful processed meat packaging films. Examples 86 and 87 of the invention have comparable or better values for shrink, tensile and optical properties relative to Comparative Example 85, for films of substantially the same gauge thickness. Multilayer films of the invention demonstrate excellent shrinkage values and tensile properties. The optical properties (low haze and high gloss) were excellent. The elongation at break of the inventive film is also good and the film processed well. The O₂ barrier properties of the exemplified films are controlled by the core layer which utilized a copolymer blend that is known to provide excellent oxygen and moisture barrier properties. Inasmuch as the same thickness core layer was used in both the inventive examples 86–89 and control example 85, similarly excellent barrier properties are expected for all films of examples 85–89. Examples 86–89 are all expected to have desirable sealing and puncture resistant properties as more fully demonstrated by examples below.

EXAMPLES 90–95

In Examples 91–95, biaxially stretched, heat shrinkable, coextruded, multilayer films of the invention were made and tested. Comparative Example 90 is similar to comparative example 85.

Examples 91 and 93–95 are essentially four layer films; however due to experimental run equipment availability, a 5 layer die was used and the identical layer formulation was used for both the fourth and fifth layers (Examples 90 and 92, also used a 5 layer die, and are essentially 3 layer films because the first arid second layers had identical formulations as well as the fourth and fifth layers). Use of a 5 layer annular coextrusion die to make what is formula-wise a 4 layer film (3 layer for Examples 90 and 92) is reflected in the following table. Each extruder (one per layer) was connected to the same die from which heat plastified resins were coextruded forming a primary tube having a first inner layer, a second intermediate layer, a third core layer, a fourth intermediate layer, and a fifth outer layer. First and fifth layers are directly attached to opposing sides of the third core layer via second and fourth intermediate layers respectively. The first/second/third/fourth/fifth layer thickness ratio was about 10:50:6.6:23.4:10.

For each layer, the resin mixture was hopper fed into an attached single screw extruder, heat plastified and coextruded into a primary tube. The extruder barrel temperatures were about 325–350° F. (163–177° C.) for all layers, except the third (core) layer was about 270–295° F. (132–146° C. The die temperature profile was set from about 310° F. to 330° F. (154–166° C.). The extruded multilayer primary tube was cooled by spraying with cold tap water 45–60° F. (about 7–16° C.).

The cooled tube was flattened by a pair of nip rollers. In Examples 90, 91, and 94, a tube of about 3¹⁵⁄₁₆ inches (10.0 cm) flatwidth was produced (3⅞ inches (9.8 cm) for Examples 92 and 93, and 4¹⁄₁₆ inches (10.3 cm) for Ex. 95). The cooled flattened primary tubes were reheated, biaxially stretched into film, re-cooled, flattened and wound on a reel. M.D. and T.D. orientation ratios were about 3.6:1 to 3.8:1, and about 3.2:1 to 3.3:1, respectively for Examples 90–95. The orientation temperature was below the predominant m.p. for each layer oriented and above that layer's predominant glass transition point (Tg) (believed to be about 68–85° C. for Examples 90–95). The resultant films of Examples 90–95 all had excellent shrinkage values at 90° C.

For Examples 90–95, the film structures were as follows. The heat sealing layer was the first layer of the multilayer film and the inner layer of the film tube. The layer compositions are given in Table 16 below. Percentages are based upon weight for the indicated layer. Referring to Table 16, the materials are as described in Examples 85–89 except as noted. EAO-A₄ is a copolymer predominantly of ethylene with hexene-1 monomer, having a reported density of 0.898 g/cm³, a M.I. of 0.8 dg/min., and a peak m.p. of 89° C. (Exact™ SLX 9110).

The above films were not irradiatively treated. However, they may also be usefully crosslinked by irradiation e.g. at a level of 2–6 megarads (Mrad) after biaxial stretching (which irradiative process is hereinafter referred to as post-irradiation), in the manner generally described in Lustig et al, U.S. Pat. No. 4,737,391 which is hereby incorporated by reference.

Additional properties of Examples 90–95 were tested and are reported in Table 17.

TABLE 16

| | Layer Composition | | | | |
|---|---|---|---|---|---|
| Ex. No. | First Layer (Inner) | Second Layer | Third Layer (Core) | Fourth Layer | Fifth Layer (Outer) |
| 90 | 23% EAO $B_2$<br>33% EAO $C_1$<br>38.75% EVA<br>3.25% Process. Aid<br>2% Stabilizer | 23% EAO $B_2$<br>33% EAO $C_1$<br>38.75% EVA<br>3.25% Process. Aid<br>2% Stabilizer | 82.5% vdc-ma<br>15% vdc-vc<br>2.5% PC additive | 25% EAO $B_2$<br>33% EAO $C_1$<br>40% EVA<br>2% slip/process. aid | 25% EAO $B_2$<br>33% EAO $C_1$<br>40% EVA<br>2% slip/process. aid |
| 91 | 94.75% EAO $B_2$<br>3.25% Process. Aid<br>2% Stabilizer | 23% EAO $B_2$<br>33% EAO $C_1$<br>38.75% EVA<br>3.25% Process. Aid<br>2% Stabilizer | 82.5% vdc-ma<br>15% vdc-vc<br>2.5% PC additive | 25% EAO $B_2$<br>33% EAO $C_1$<br>40% EVA<br>2% slip/process. aid | 25% EAO $B_2$<br>33% EAO $C_1$<br>40% EVA<br>2% slip/process. aid |
| 92 | 33% EAO $A_4$<br>23% EAO $B_2$<br>38.75% EVA<br>3.25% Process. Aid<br>2% Stabilizer | 33% EAO $A_4$<br>23% EAO $B_2$<br>38.75% EVA<br>3.25% Process. Aid<br>2% Stabilizer | 82.5% vdc-ma<br>15% vdc-vc<br>2.5% PC additive | 33% EAO $A_4$<br>25% EAO $B_2$<br>40% EVA<br>2% slip/process. aid | 33% EAO $A_4$<br>25% EAO $B_2$<br>40% EVA<br>2% slip/process. aid |
| 93 | 94.75% EAO $B_2$<br>3.25% Process. Aid<br>2% Stabilizer | 33% EAO $A_4$<br>23% EAO $B_2$<br>38.75% EVA<br>3.25% Process. Aid<br>2% Stabilizer | 82.5% vdc-ma<br>15% vdc-vc<br>2.5% PC additive | 33% EAO $A_4$<br>25% EAO $B_2$<br>40% EVA<br>2% slip/process. aid | 33% EAO $A_4$<br>25% EAO $B_2$<br>40% EVA<br>2% slip/process. aid |
| 94 | 69.75% EAO $B_2$<br>25% EVA<br>3.25% Process. Aid<br>2% Stabilizer | 33% EAO $A_4$<br>23% EAO $B_2$<br>38.75% EVA<br>3.25% Process. Aid<br>2% Stabilizer | 82.5% vdc-ma<br>15% vdc-vc<br>2.5% PC additive | 33% EAO $A_4$<br>25% EAO $B_2$<br>40% EVA<br>2% slip/process. aid | 33% EAO $A_4$<br>25% EAO $B_2$<br>40% EVA<br>2% slip/process. aid |
| 95 | 100% $C_3C_2$ | 33% EAO $A_4$<br>23% EAO $B_2$<br>38.75% EVA<br>3.25% Process. Aid<br>2% Stabilizer | 82.5% vdc-ma<br>15% vdc-vc<br>2.5% PC additive | 33% EAO $A_4$<br>25% EAO $B_2$<br>40% EVA<br>2% slip/process. aid | 33% EAO $A_4$<br>25% EAO $B_2$<br>40% EVA<br>2% slip/process. aid |

TABLE 17

| EX. No. | Avg. GAUGE mil (micron) | FLAT WIDTH (mm) | TENSILE STRENGTH $X10^3$ psi at RT (MPa) MD/TD | ELONGATION AT BREAK % at RT MD/TD | 1% Secant Modulus $X10^3$ psi at RT MD/TD Mpa | SHRINK at 90° C. % MD/TD | SHRINK FORCE at 90° C. g/mil (Kg/cm) MD/TD | SHRINK FORCE at RT g/mil (Kg/cm) MD/TD | $O_2$GTR†* at RT 0% RH | HAZE % | GLOSS AT 45° ANGLE H.U. |
|---|---|---|---|---|---|---|---|---|---|---|---|
| 90 | 2.16 (55) | 327 | 11.5/9.2 (79/64) | 280/305 | 27.5/32.6 (189/224) | 41/48 | 61/45 | 32/33 | 45 (64) | 6.6 | 69 |
| 91 | 3.09 (78) | 327 | 11.7/10.7 (80/74) | 328/276 | 30.6/32.7 (211/225) | 41/47 | 48/50 | 23/32 | ND | 3.8 | 83 |
| 92 | 3.00 (76) | 311 | 11.3/11.7 (78/81) | 271/280 | 30.0/30.6 (207/211) | 39/47 | 51/54 | 28/43 | ND | 4.2 | 79 |
| 93 | 3.22 (82) | 311 | 11.0/10.5 (76/73) | 273/301 | 28.6/28.9 (197/199) | 39/47 | 47/51 | 24/35 | ND | 4.5 | 80 |
| 94 | 2.43 (62) | 333 | 11.8/11.3 (81/78) | 226/305 | ND | 37/46 | 45/46 | 20/37 | ND | 6.3 | 69 |
| 95 | 2.68 (68) | 333 | 11.8/11.7 (81/81) | 265/257 | ND | 36/48 | 45/54 | 29/40 | 40 (71) | 3.8 | 81 |

ND = NOT DETERMINED
RT = ROOM TEMPERATURE (~20–23° C.)
RH = RELATIVE HUMIDITY
†Oxygen gas transmission rate ($O_2$GTR) in units of $cm^3$ per $meter^2$ per 24 hours at 1 atmosphere for the film tested.
*For $O_2$GTR the film thickness is below the rate in microns ( ).

Referring now to Tables 16 and 17, Comparative Example 90 is similar to Comparative Ex. 85 and presents acceptable physical property values for commercially useful processed meat packaging films. Ex. 91 of the invention has comparable or better values for shrink and tensile properties relative to Comparative Ex. 90. The optical properties of Ex. 91 are superior to comparative Ex. 90. It is expected from further work demonstrated below that inventive films of the formulation of Ex. 91 will have superior puncture and sealing properties to the film of Ex. 90. Ex. 92 is an example of the invention having excellent overall properties, however for post-pasteurization processing which subjects films to extended exposure to water at elevated temperatures, the embodiments of Ex. 92–95 have greatly superior properties for this type of application as further demonstrated below in additional examples. Ex. 92–95 have comparable or better values for shrink, tensile and optical properties relative to Comparative Ex. 90. Multilayer films of the invention demonstrate excellent low haze and high gloss, very good shrinkage values, and excellent tensile properties. The $O_2$ barrier properties of the exemplified inventive multilayer films are controlled by the core layer which utilizes a copolymer blend that is known to provide excellent oxygen and moisture barrier properties. Inasmuch as the same thickness core layer was used in both the inventive Examples 91–95 and the control Ex. 90, similarly excellent barrier properties are expected for all films of Ex. 91–95 and this is seen in the measured value for Ex. 95. The films of Ex. 86–89 are all expected to have desirable sealing and puncture resistant properties as more fully demonstrated by examples presented below.

EXAMPLES 96–103

In Examples 97–103, biaxially stretched, heat shrinkable, coextruded, multilayer films of the invention were made and their physical properties tested. Ex. 96 is a comparative example not of the invention and is similar to Comparative Ex. 85 and 90.

Examples 97–99 and 101–103 are essentially four layer films; however due to equipment availability during experimental runs, a 5 layer die was used and the identical layer formulation was used for both the fourth and fifth layers (Ex. 96 and 100, also were made using a 5 layer die, and are essentially 3 layer films because the first and second layers had identical formulations as well as the fourth and fifth layers). Use of the 5 layer die to make what is formula-wise a four layer film(three layer for Examples 96 and 100) is reflected in the following composition Table 18. Each extruder (one per layer) was connected to the same annular coextrusion die. Heat plastified resins were coextruded from this die forming a primary tube having 5 layers (first inner, second intermediate, third core, fourth intermediate, and fifth outer). The first and fifth layers were directly attached to opposing sides of the third core layer via second and fourth intermediate layers respectively. The first/second/third/fourth/fifth layer thickness ratio was about 10:47:9:24:10 except for Ex. 103 where the layer ratio was about 7:48:9:25:11.

In Examples 96–103, for each layer, the resin mixture was hopper fed into an attached single screw extruder where the mixture was heat plastified and extruded through a 5 layer coextrusion die into a primary tube. The extruder barrel temperatures for the third (core) layer was between about 255–280° F. (124–138° C.); for the remaining layers was about 300–350° F. (149–177° C.). The die temperature profile was set from about 320° F. to 340° F. (160–171° C.).

The extruded primary tube was cooled by spraying with cold tap water 45–60° F. (about 7–16° C.).

The cooled primary tube was flattened by passage through a pair of nip rollers. In Examples 96–103, a flattened primary tube of about 3 1/16–3 1/8 inches (7.8–7.9 cm) flatwidth was produced. The cooled flattened primary tubes were reheated, biaxially stretched, and re-cooled.

The biaxially stretched and oriented film was flattened and wound on a reel. The M.D. draw ratio was about 4.8:1 to 4.9:1 and the T.D. orientation ratio was about 4.2: 1. The orientation temperature was below the predominant m.p. for each layer oriented and above that layer's predominant Tg and is believed to be about 68–85° C. for Examples 96–103. The resultant biaxially oriented films of Examples 96–103 all had excellent shrinkage values at 90° C.

For Examples 96–103, the heat sealing layer was the first layer of the multilayer film and the inner layer of the film tube. The layer compositions are given in Table 18 below. Percentages are based upon weight for the indicated layer. Referring to Table 18, the materials are as described for Examples 85–95 except as noted otherwise. LLDPE is a linear low density polyethylene and is a copolymer predominantly of ethylene with hexene-1 monomer, having a reported density of about 0.917 g/cm$^3$, an M.I. of 1.0 dg/min., a sharp peak m.p. of 120° C. and a second m.p. of 108.5° C., which is available under the trademark Exceed™ 350D60 from Exxon Chemical Co. The stabilizer used was available from Techmer PM of Clinton, Tenn., U.S.A. under the trademark PM 11505E125. The processing aid used in Ex. 96–98 and 100–102 was available from Ampacet Corp. of Tarrytown, N.Y., U.S.A. under the trademark Ampacet LR 91161 (Ampacet LR 91228 for Ex. 99 and 103). The slip/processing aid used in the fourth and fifth layers of Ex. 100–103 and first layer of Ex. 100–102 was available under the trademark Ampacet LR 91160 from Ampacet Corp. of Tarrytown, N.Y., U.S.A.

The multilayer films of Ex. 96–103 were irradiated after orientation by electron beam according to methods well known in the art to a level indicated in Table 18. The flatwidth for all of the biaxially stretched film Ex. 96–103 was about 13 inches (33.0 cm) (13 inches for all examples except 12 15/16 for Ex. 100; and 13 3/16 for Ex. 102).

Irradiated films of Examples 96–103 were tested and results reported in Tables 19 and 20.

TABLE 18

| Ex. No. | First Layer (Inner) | Second Layer | Third Layer (Core) | Fourth Layer | Fifth Layer (Outer) | Irradiated Mrad |
|---|---|---|---|---|---|---|
| 96 | 23% EAO B$_2$<br>33% EAO C$_1$<br>38% EVA<br>4% Proc. Aid<br>2% Stabilizer | 23% EAO B$_2$<br>33% EAO C$_1$<br>39% EVA<br>4% Proc. Aid<br>2% Stabilizer | 72.15% vdc-ma<br>25.35% vdc-vc<br>2.5% PC additive | 25% EAO B$_2$<br>33% EAO C$_1$<br>40% EVA<br>2% slip/proc. aid | 25% EAO B$_2$<br>33% EAO C$_1$<br>40% EVA<br>2% slip/proc. aid | 4 |
| 97 | 69% EAO B$_2$<br>25% EVA<br>4% Proc. Aid<br>2% Stabilizer | 23% EAO B$_2$<br>33% EAO C$_1$<br>39% EVA<br>4% Proc. Aid<br>2% Stabilizer | 72.15% vdc-ma<br>25.35% vdc-vc<br>2.5% PC additive | 25% EAO B$_2$<br>33% EAO C$_1$<br>40% EVA<br>2% slip/proc. aid | 25% EAO B$_2$<br>33% EAO C$_1$<br>40% EVA<br>2% slip/proc. aid | 4 |
| 98 | 69% LLDPE<br>25% EVA<br>4% Proc. Aid<br>2% Stabilizer | 23% EAO B$_2$<br>33% EAO C$_1$<br>39% EVA<br>4% Proc. Aid<br>2% Stabilizer | 72.15% vdc-ma<br>25.35% vdc-vc<br>2.5% PC additive | 25% EAO B$_2$<br>33% EAO C$_1$<br>40% EVA<br>2% slip/proc. aid | 25% EAO B$_2$<br>33% EAO C$_1$<br>40% EVA<br>2% slip/proc. aid | 4 |

TABLE 18-continued

| | Layer Composition | | | | | |
|---|---|---|---|---|---|---|
| Ex. No. | First Layer (Inner) | Second Layer | Third Layer (Core) | Fourth Layer | Fifth Layer (Outer) | Irradiated Mrad |
| 99 | 100% $C_3C_2$ | 23% EAO $B_2$<br>33% EAO $C_1$<br>39% EVA<br>4% Proc. Aid<br>2% Stabilizer | 72.15% vdc-ma<br>25.35% vdc-vc<br>2.5% PC additive | 25% EAO $B_2$<br>33% EAO $C_1$<br>40% EVA<br>2% slip/proc. aid | 25% EAO $B_2$<br>33% EAO $C_1$<br>40% EVA<br>2% slip/proc. aid | 5 |
| 100 | 33% EAO $A_4$<br>23% EAO $B_2$<br>38% EVA<br>4% slip/proc. Aid<br>2% Stabilizer | 33% EAO $A_4$<br>23% EAO $B_2$<br>38% EVA<br>4% Proc. Aid<br>2% Stabilizer | 72.15% vdc-ma<br>25.35% vdcvc<br>2.5% PC additive | 33% EAO $A_4$<br>25% EAO $B_2$<br>40% EVA<br>2% slip/proc. aid | 33% EAO $A_4$<br>25% EAO $B_2$<br>40% EVA<br>2% slip/proc. aid | 3.75 |
| 101 | 94% EAO $B_2$<br>4% slip/proc. Aid<br>2% Stabilizer | 33% EAO $A_4$<br>23% EAO $B_2$<br>38% EVA<br>4% Proc. Aid<br>2% Stabilizer | 72.15% vdc-ma<br>25.35% vdcvc<br>2.5% PC additive | 33% EAO $A_4$<br>25% EAO $B_2$<br>40% EVA<br>2% slip/proc. aid | 33% EAO $A_4$<br>25% EAO $B_2$<br>40% EVA<br>2% slip/proc. aid | 3.75 |
| 102 | 94% LLDPE<br>4% slip/proc. Aid<br>2% Stabilizer | 33% EAO $A_4$<br>23% EAO $B_2$<br>38% EVA<br>4% Proc. Aid<br>2% Stabilizer | 72.15% vdc-ma<br>25.35% vdcvc<br>2.5% PC additive | 33% EAO $A_4$<br>25% EAO $B_2$<br>40% EVA<br>2% slip/proc. aid | 33% EAO $A_4$<br>25% EAO $B_2$<br>40% EVA<br>2% slip/proc. aid | 3.75 |
| 103 | 100% $C_3C_2$ | 33% EAO $A_4$<br>23% EAO $B_2$<br>36.7% EVA<br>3.25% Proc. Aid<br>2% Stabilizer | 72.15% vdc-ma<br>25.35% vdcvc<br>2.5% PC additive | 33% EAO $A_4$<br>25% EAO $B_2$<br>40% EVA<br>2% slip/proc. aid | 33% EAO $A_4$<br>25% EAO $B_2$<br>40% EVA<br>2% slip/proc. aid | 5 |

TABLE 19

| EX. NO. | AVG. GAUGE mil ($\mu$) | RAM PUNCTURE | | | Hot Water Puncture seconds (microns) | Tear Strength g/mil (g/$\mu$) MD/TD | SHRINK at 90° C. % MD/TD | SHRINK at 74° C. % MD/TD | SHRINK FORCE | | GLOSS at 45° ANGLE H.U. | HAZE % |
|---|---|---|---|---|---|---|---|---|---|---|---|---|
| | | Force Newton | Energy Joule | Stress MPa | | | | | at 90° C. g/mil (Kg/cm) MD/TD | at RT g/mil (Kg/cm) MD/TD | | |
| 96 | 2.61 (66) | 109 | 1.08 | 249 | 17 (75) | 32/43 (1.3/1.7) | 48/49 | 24/30 | 158/123 (62/48) | 93/98 (37/39) | 9.6 | 71 |
| 97 | 2.72 (69) | 96.9 | 0.829 | 246 | 21 (74) | 23/89 (0.91/3.5) | 45/48 | 21/29 | 161/124 (63/49) | 89/89 (35/35) | 8.6 | 72 |
| 98 | 2.65 (67) | 86.6 | 0.667 | 243 | 22 (73) | 30/42 (1.2/1.7) | 42/47 | 19/28 | 171/131 (67/52) | 93/83 (37/33) | 7.7 | 67 |
| 99 | 2.71 (69) | 80.8 | 0.611 | 219 | 35 (67) | 31/35 (1.2/1.4) | 41/45 | 19/26 | 157/122 (62/48) | 86/98 (34/39) | 8.1 | 76 |
| 100 | 2.52 (64) | 80.8 | 0.726 | 209 | 14 (68) | 24/55 (0.94/2.2) | 46/50 | 21/31 | 165/113 (65/44) | 47/48 (19/19) | 9.0 | 69 |
| 101 | 2.48 (61) | 121 | 1.13 | 301 | 44 (69) | 13/18 (0.51/0.71) | 37/44 | 15/24 | 183/139 (72/55) | 47/65 (19/26) | 8.4 | 68 |
| 102 | 2.88 (73) | 140 | 1.27 | 291 | 59† (77) | 14/17 (0.55/0.67) | 39/44 | 17/25 | 204/158 (80/62) | 57/70 (22/28) | 9.1 | 71 |
| 103 | 2.50 (64) | 109 | 0.916 | 292 | 54‡ (70) | 18/21 (0.71/0.83) | 37/44 | 16/24 | 193/156 (76/61) | 65/83 (26/33) | 8.0 | 74 |

ND = Not Determined
RT = ROOM TEMPERATURE (~20–23° C.)
† = Reported value is average of 2 samples; average for 4 remaining samples was 120+ seconds and 78$\mu$.
‡ = Reported value is average of 3 samples; average for 3 remaining samples was 120+ seconds and 78$\mu$.

TABLE 20

| Ex. No. | TENSILE STRENGTH X10³ psi at RT (mPa) MD/TD | 1% Secant Modulus X10³ psi at RT MD/TD MPa | ELONGATION AT BREAK % at RT MD/TD | $O_2$GTR†* at RT 0% RH | Hot Water Seal Strength avg./min./max. seconds at 95° C. | | | SEAL STRENGTH Hot Bar Seal at RT/160/190/205° F. (RT/71/88/96° C.) g/cm |
|---|---|---|---|---|---|---|---|---|
| | | | | | minimum‡ temperature hot bar seal | midpoint‡ temperature hot bar seal | maximum‡ temperature hot bar seal | |
| 96 | 13.9/12.3 (96/85) | 29.0/27.1 (200/187) | 243/283 | 31 (69) | 32/21/49 380° F. (193° C.) | 35/19/47 465° F. (241° C.) | 59/29/117 550° F. (288° C.) | 1941/722/379/213 |

TABLE 20-continued

| Ex. No. | TENSILE STRENGTH X10³ psi at RT (mPa) MD/TD | 1% Secant Modulus X10³ psi at RT MD/TD MPa | ELONGATION AT BREAK % at RT MD/TD | O₂GTR†* at RT 0% RH | Hot Water Seal Strength avg./min./max. seconds at 95° C. ||| SEAL STRENGTH Hot Bar Seal at RT/160/190/205° F. (RT/71/88/96° C.) g/cm |
|---|---|---|---|---|---|---|---|---|
| | | | | | minimum‡ temperature hot bar seal | midpoint‡ temperature hot bar seal | maximum‡ temperature hot bar seal | |
| 97 | 12.5/10.9 (86/75) | 28.5/34.8 (196/240) | 219/236 | ND | 300/300/300 350 (177° C.) | 300/300/300 450° F. (232° C.) | 300/300/300 550° F. (288° C.) | 1854/704/463/359 |
| 98 | 10.9/9.4 (75/65) | 29.2/32.6 (201/225) | 178/197 | ND | 120/32/195 350° F. (177° C.) | 300/300/300 450° F. (232° C.) | 300/300/300 550° F. (288° C.) | 1880/683/441/356 |
| 99 | 12.2/10.5 (84/73) | 36.5/33.6 (251/231) | 210/241 | ND | 300/300/300 320° F. (160° C.) | 300/300/300 435° F. (224° C.) | 300/300/300 550° F. (288° C.) | 1784/840/697/525 |
| 100 | 13.5/11.1 (93/76) | 31.5/33.2 (217/229) | 247/276 | 26 (61) | 52/32/83 360° F. (182° C.) | 89/58/139 450° F. (232° C.) | 92/55/132 540° F. (282° C.) | 2152/613/306/200 |
| 101 | 12.2/14.4 (84/99) | 39.0/44.9 (269/310) | 137/238 | ND | 151/32/300 370° F. (188° C.) | 300/300/300 460° F. (238° C.) | 69/27/116 550° F. (288° C.) | 1795/758/418/281 |
| 102 | 12.6/13.0 (87/90) | 43.2/42.0 (298/290) | 143/208 | ND | 300/300/300 370° F. (188° C.) | 300/300/300 460° F. (238° C.) | 300/300/300 550° F. (288° C.) | 2653/1037/686/556 |
| 103 | 12.7/14.4 (87/99) | 49.4/58.4 (340/402) | 141/215 | ND | 300/300/300 320° F. (160° C.) | 300/300/300 410° F. (210° C.) | 300/300/300 500° F. (260° C.) | 1761/888/683/527 |

†= Oxygen gas transmission rate (O₂GTR) in units of cm³ per meter² per 24 hours at 1 atmosphere and 0% relative humidity for the film tested.
*For O₂GTR, film thickness is listed below the rate in microns ( ).
‡= Minimum, midpoint and maximum hot bar sealing temperatures are determined by trial and error. Hot bar sealing temperatures are reported below the seconds to failure. 300 seconds and higher were listed as 300 seconds.
ND = NOT DETERMINED
RT = ROOM TEMPERATURE (~20–23° C.)

Referring now to Tables 19 and 20, Examples 96–103 all present physical property values which are acceptable for food packaging films which are commercially useful for food packaging articles e.g. fresh or processed meats. Inventive films of Examples 97–99, and 101–103 are particularly well suited for use for cook-in films and in very demanding post-cooking pasteurization applications where films are used to encase food products which are then subjected to surface pasteurization as well as shrinking operations, shipment and retail sale.

The Ram Puncture Maximum Force, Total Energy Absorbed, and Stress values were excellent for all films. Examples 101 and 102 had a very high resistance to puncture at room temperature having ram puncture properties significantly better than the film of comparative Ex. 96. The Hot water puncture resistance values for Examples 97–99 and 101–103 were all 20% to over 200% greater than that measured for the control film of Ex. 96.

Seal strengths were also very high producing strong seals under a variety of conditions. Seals tested by the Seal Strength test demonstrated excellent seal strengths particularly over a range of elevated temperatures with inventive films of Examples 97–99 and 101–103 exceeding control (Ex. 96) values by 10 to over 80% at 88° C., and by 325 to over 160% at 96° C.

Hot Water Seal Strengths (HWSS) for the invention were notably higher than the control film. The HWSS test show strong seals under contact with water at elevated temperatures which test failure of the seal under simulated post-cooking pasteurization conditions.

The control film was determined to have a hot bar sealing range of about 193° C. to 288° C. and over this 95° C. range the maximum seal survival time was 117 seconds at 95° C. for seals made at 288° C. The average 95° C. seal survival time at the determined hot bar midpoint temperature for making a seal (241° C.) was only 35 seconds while the best average survival time was only 59 seconds for seals made at 288° C.

All of the inventive films of Ex. 97–103 exceeded these failure times and examples 97, 99, and 102–103 exceeded by over 400% over the entire sealing range. The combination of puncture resistance and strong seals under a variety of conditions for embodiments of the invention utilizing a heat sealing surface layer comprising a polymer or blend of polymers selected from the group consisting of: (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a m.p. of at least 105° C. and a density of at least 0.900 g/cm³ is outstanding, and exceptionally and unexpectedly good. It is very surprising that such films may be made which also have excellent optical properties of low haze, high gloss and an overall excellent appearance with desirable tensile properties including tensile strength, elongation at break and modulus with excellent shrinkage values at elevated (90° C.) temperatures and at low (74° C.) temperatures. The excellent a shrink forces demonstrate the ability to achieve and maintain a desirably tight and compact package. The O₂ barrier values measured for the films of Examples 96 and 100 are believed representative for all the films and are well suited to provide O₂ barrier properties which are desirable for some food products. Also M.D. and T.D. tear strengths for films of Examples 101–103 are both lower than comparative Ex. 96 which is an advantage in certain applications. The combination of properties shown in Tables 19 and 29 are surprising and demonstrate films superior to present commercial films. The haze and gloss values reflect measurements made on films that have been coated with an antiblock powder of starch.

Ex. 100 is essentially a three layer film while the remaining examples of the invention i.e. 97–99 and 101–103 are essentially four layer films. However, multilayered films of five (each adjacent layer is different in composition) or more layers are contemplated by the present invention. Tie or adhesive layers as well as layers to add or modify various properties such as: heat sealability; toughness; abrasion, tear, or puncture resistance; optical properties; gas or water barrier properties; shrinkability; and printability may be included. Multilayer embodiments may be formed by any suitable method including coextrusion, extrusion coating, and lamination.

EXAMPLES 104–108

In Examples 104–106, biaxially stretched, heat shrinkable, coextruded, multilayer films of the invention were made and tested. Ex. 107 and 108 are comparative examples (not of the invention) of a commercially successful cook-in $O_2$ barrier films. Comparative Ex. 108 is believed to have a $C_3C_2$ copolymer inner heat sealing layer and an EVOH $O_2$ barrier core layer.

Examples 105–106 are essentially four layer films; however due to equipment availability during experimental runs, a 5 layer die was used and the identical layer formulation was used for both the fourth and fifth layers (Ex. 104 also made with a 5 layer die, is essentially a three layer film because the first and second layers had identical formulations as well as the fourth and fifth layers). Ex. 107 is a five layer film. Ex. 108 is believed to have at least six layers. Use of the 5 layer die to make what is formula-wise a four layer film (three layer for Ex. 104) is reflected in the following composition Table 21. Each extruder (one per layer) was connected to the same annular coextuusion die from which heat plastified resins were then coextruded to form a primary tube having first inner, second intermediate, third core, fourth intermediate, and fifth outer layers. The first and fifth layers being directly attached to opposing sides of the third core layer via second and fourth intermediate layers respectively. The first/second/third/fourth/fifth layer thickness ratio for Examples 104 and 105 were about 10:47:9:24:10; and for Example 106 was about 7:48:9:25:11.

In Ex. 104–107, each layer's resin mixture was hopper fed into an attached single screw extruder, heat plastified and extruded through a 5 layer coextrusion die into a primary tube and cooled by spraying with cold tap water 45–60° F. (7–16° C.). Extruder barrel temperatures were about 295–355° F. (146–179° C.) except the third (core) layer was about 255–280° F. (124–138° C.). The die temperature profile was set from about 320° F. to 340° F. (160–171° C.).

The cooled primary tube was passed through nip rollers to produce a flattened primary tube of about 3⅛ inches (7.9 cm) flatwidth in Examples 104–106. The cooled flattened primary tubes were reheated, biaxially stretched, cooled and reeled producing a biaxially stretched flatwidth of about 13 inches (33.0 cm) was obtained (12⅜ inches (31.4 cm) for Ex. 108).

The M.D. orientation ratio was about 4.9:1. The T.D. orientation ratio was about 4.2:1. The draw point temperature was below the predominant m.p. for each layer oriented and above that layer's predominant Tg and is believed to be about 68–85° C. for Examples 104–106. The resultant biaxially oriented films of Ex. 104–106 all had excellent shrinkage values at 90° C.

For Ex. 104–106, the heat sealing layer was the first, inner layer of the film tube. Layer compositions are in Table 21 below. Percentages are based upon weight for the indicated layer. Referring to Table 21, the materials are as described for Examples 85–103 above except as noted otherwise. EVOH is a saponified ethylene vinyl acetate copolymer which had an ethylene content of 44 mole % and a m.p. of about 165° C. The stabilizer used was Techmer PM 11505E125. The processing aid (Ex. 104–106) and the slip/processing aid (Examples 104–107) used was Ampacet LR 91161. The adhesive used in Ex. 107 was an anhydride and rubber modified LLDPE.

The multilayer films of Examples 104–107 were irradiated after orientation by electron beam according to methods well known in the art to a level indicated in Table 18.

Physical properties of the irradiated multilayer films of Examples 104–106 and comparative examples 107 and 108 were tested and are reported in Table 22 and 23.

TABLE 21

| Ex. No. | First Layer (Inner) | Second Layer | Third Layer (Core) | Fourth Layer | Fifth Layer (Outer) | Irradiated Mrad |
|---|---|---|---|---|---|---|
| 104 | 58% EAO $A_4$<br>18% EAO $B_2$<br>18% EVA<br>4% Proc. Aid<br>2% Stabilizer | 58% EAO $A_4$<br>18% EAO $B_2$<br>18% EVA<br>4% Proc. Aid<br>2% Stabilizer | 72.15% vdc-ma<br>25.35% vdc-vc<br>2.5% PC additive | 60% EAO $A_4$<br>18% EAO $B_2$<br>18% EVA<br>4% slip/proc. aid | 60% EAO $A_4$<br>18% EAO $B_2$<br>18% EVA<br>4% slip/proc. aid | 4 |
| 105 | 94% EAO $B_2$<br>4% Proc. Aid<br>2% Stabilizer | 58% EAO $A_4$<br>18% EAO $B_2$<br>18% EVA<br>4% Proc. Aid<br>2% Stabilizer | 72.15% vdc-ma<br>25.35% vdc-vc<br>2.5% PC additive | 60% EAO $A_4$<br>18% EAO $B_2$<br>20% EVA<br>2% slip/proc. aid | 60% EAO $A_4$<br>18% EAO $B_2$<br>20% EVA<br>2% slip/proc. aid | 4 |
| 106 | 100% $C_3C_2$ | 58% EAO $A_4$<br>18% EAO $B_2$<br>18% EVA<br>4% Proc. Aid<br>2% Stabilizer | 72.15% vdc-ma<br>25.35% vdc-vc<br>2.5% PC additive | 60% EAO $A_4$<br>18% EAO $B_2$<br>18% EVA<br>4% slip/proc. aid | 60% EAO $A_4$<br>18% EAO $B_2$<br>18% EVA<br>4% slip/proc. aid | 4 |
| 107 | 100% $C_3C_2$ | 37.5% EAO $B_1$<br>15% EAO $C_6$<br>17.5% EVA<br>30% adhesive | 100% EVOH | 37.5% EAO $B_1$<br>15% EAO $C_6$<br>17.5% EVA<br>30% adhesive | 55.6% EAO $B_1$<br>15% EAO $C_6$<br>25% EVA<br>4.4% slip/proc. aid | 5 |

TABLE 22

| EX. NO. | AVG. GAUGE mil ($\mu$) | RAM PUNCTURE Force Newton | RAM PUNCTURE Energy Joule | RAM PUNCTURE Stress MPa | Hot Water Puncture seconds (microns) | Tear Strength g/mil (g/$\mu$) MD/TD | SHRINK at 90° C. % MD/TD | SHRINK at 74° C. % MD/TD | SHRINK FORCE at 90° C. g/mil (Kg/cm) MD/TD | SHRINK FORCE at RT g/mil (Kg/cm) MD/TD | HAZE % | GLOSS at 45° ANGLE H.U. |
|---|---|---|---|---|---|---|---|---|---|---|---|---|
| 104 | 2.54 (65) | 139 | 1.36 | 338 | 51 (93) | 35/28 (1.4/1.1) | 39/48 | 16/26 | 176/164 (69/65) | 70/110 (28/43) | 5.5 | 65 |
| 105 | 2.71 (69) | 135 | 1.28 | 315 | 68* (69) | 35/27 (1.4/1.1) | 38/47 | 16/25 | 190/156 (75/61) | 66/126 (26/50) | 5.1 | 78 |
| 106 | 2.47 (63) | 121 | 1.18 | 287 | 120+** (71) | 29/44 (1.1/1.7) | 34/44 | 14/23 | 169/161 (67/63) | 102/126 (40/50) | 7.5 | 79 |
| 107 | 2.69 (68) | 72 | 0.404 | 222 | 120+ (81) | 30/43 (1.2/1.7) | 22/34 | 11/19 | 144/118 (57/46) | 85/127 (33/50) | ND | ND |
| 108 | 2.69 (68) | 53 | 0.278 | 211 | 31 (72) | 14/22 (0.55/0.87) | 24/35 | 11/19 | ND | ND | 13.8 | 63 |

ND = Not Determined
RT = ROOM TEMPERATURE (~20–23° C.)
*= Reported value is average of 5 samples; average for 1 remaining samples was 120+ seconds and 74$\mu$.
**= Reported value is average of 5 samples; average for 1 remaining samples was 101 seconds and 74$\mu$.

TABLE 23

| Ex. No. | TENSILE STRENGTH X10³ psi at RT (mPa) MD/TD | 1% Secant Modulus X10³ psi at RT MD/TD MPa | ELONGATION AT BREAK % at RT MD/TD | O₂GTR†* at RT 0% RH | Hot Water Seal Strength avg./min./max. seconds at 95° C. minimum‡ temperature hot bar seal | Hot Water Seal Strength midpoint‡ temperature hot bar seal | Hot Water Seal Strength maximum‡ temperature hot bar seal | SEAL STRENGTH Hot Bar Seal at RT/160/190/205° F. (RT/71/88/96° C.) g/cm |
|---|---|---|---|---|---|---|---|---|
| 104 | 12.2/14.6 (84/101) | 34.5/36.4 (238/251) | 155/226 | 29 (61) | 290/197/300 330° F. (166° C.) | 280/100/300 440° F. (227° C.) | 300/300/300 550° F. (288° C.) | 1963/912/558/402 |
| 105 | 12.6/15.1 (87/104) | 35.4/35.2 (244/243) | 145/255 | ND | 183/52/300 350 (177° C.) | 300/300/300 450° F. (232° C.) | 290/195/300 550° F. (288° C.) | 1875/824/508/249 |
| 106 | 12.0/14.3 (83/99) | 40.8/44.6 (281/308) | 154/225 | ND | 300/300/300 340° F. (171° C.) | 300/300/300 445° F. (229° C.) | 300/300/300 550° F. (288° C.) | 2063/1090/747/620 |
| 107 | 9.6/7.1 (66/49) | 67.2/58.4 (463/402) | 186/269 | ND | ND | ND | ND | 2694/1340/1071/ND |
| 108 | 8.0/6.6 (55/45) | 59.6/58.8 (411/405) | 149/173 | 8.8 (58) | ND | ND | ND | 2268/1394/1069/749 |

†= Oxygen gas transmission rate (O₂GTR) in units of cm³ per meter² per 24 hours at 1 atmosphere and 0% relative humidity for the film tested.
*For O₂GTR, film thickness is listed below the rate in microns ( ).
‡=Minimum, midpoint and maximum hot bar sealing temperatures are determined by trial and error. Hot bar sealing temperatures are reported below the seconds to failure. 300 seconds and higher were listed as 300 seconds.
ND = NOT DETERMINED
RT = ROOM TEMPERATURE (~20–23° C.)

Referring now to Tables 22 and 23, Examples 104–108 all have physical properties that are acceptable for commercial food packaging films e.g. for fresh or processed meats. Examples 104–106 are particularly well suited for use as cook-in films and in very demanding post-cooking pasteurization applications where films are used to encase food products which are then subjected to surface pasteurization as well as shrinking operations, shipment and retail sale.

Ram Puncture Maximum Force, Total Energy Absorbed, and Stress values were outstanding for all films of the invention and greatly superior to the comparative films of Examples 107 and 108. Examples 104–106 had a combination of excellent properties for use in many applications including cook-in and post-cooking pasteurization processing and packaging uses. The inventive films had a very high resistance to puncture at room temperature having ram maximum puncture force values ranging from 68% to 160% better than the commercially accepted films of comparative Ex. 107 and 108. The total energy absorbed and stress values were also amazingly superior. Hot water puncture resistance values for Ex. 104–106 were all very good and better than comparative Ex. 108; and inventive Ex. 106 was comparable to comparative Ex. 107.

The shrinkage values at 90° C. were over 40% to 70% or more higher in the machine direction and over 25% to 40% or more higher in the transverse direction relative to both comparative films. Low temperature shrinkage values at 74° C. were also improved.

Seal strengths of all films tested were also very high, producing strong seals under a variety of conditions. Seals tested by the Seal Strength test demonstrated that the inventive films had excellent seal strengths particularly over a range of elevated temperatures.

Hot Water Seal Strengths (HWSS) for films of the invention were excellent. The HWSS test determine seal strength under contact with water at elevated temperatures and tests susceptibility to failure of the seal under simulated post-cooking pasteurization conditions. HWSS values for the control films were not determined but are believed to be similar to the inventive films.

The combination of puncture resistance and strong seals under a variety of conditions for embodiments of the invention utilizing a heat sealing surface layer comprising a polymer or blend of polymers selected from the group consisting of: (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a m.p. of at least 105° C. and a density of at least 0.900 g/cm³ is outstanding, exceptionally desirable and unexpectedly good. It is very surprising that such films may be made which also have excellent optical properties of low haze, high gloss and an overall excellent appearance with desirable tensile properties including superior tensile strength, elongation at break and low modulus with excellent and superior shrinkage values at elevated (90° C.) temperatures and at low (74° C.) temperatures. The excellent shrink forces demonstrate the ability to achieve and maintain a desirably tight and compact package.

All examples have desirable $O_2$ barrier values. The measured value for Ex. 104 is believed to be representative of Examples 105 and 106, and that for comparative Ex. 108 representative of comparative Ex. 107. Comparative Ex. 107 and 108 used EVOH as a core layer for $O_2$ barrier properties. EVOH is an excellent $O_2$ barrier, but its barrier properties deteriorate in contact with water vapor. Vinylidene chloride copolymers have $O_2$ barrier properties unaffected by moisture. Tables 22 and 23 show surprising combinations of properties that are superior to present commercial films. The haze and gloss values were of films coated with an antiblock powder of starch. Ex. 104 is essentially a 3 layer film while the remaining examples of the invention i.e.105 and 106 are essentially four layer films. However, as noted above, multilayered films of five (each adjacent layer is different) or more layers are contemplated by the invention which may include tie or adhesive layers as well as layers to add or modify various properties of the desired film such as heat sealability, toughness, abrasion resistance, tear resistance, puncture resistance, optical properties, gas or water barrier properties, shrinkability, and printability.

EXAMPLES 109–115

Examples 109–115 are biaxially stretched, heat shrinkable, coextruded, multilayer film embodiments of the invention having a layer composition as described in Table 24. Heat shrinkable films of Examples 109–114 were made and their physical properties tested.

Ex. 109–114 are essentially 4 layer films; during experimental runs, a 5 layer die was used and essentially identical layer formulations were used for both the fourth and fifth layers. Each extruder (one per layer) was connected to the same annular coextrusion die and heat plastified resins were coextruded forming a primary tube having a first inner, second intermediate, third core, fourth intermediate, and fifth outer layer. The first and fifth layers were directly attached to opposing sides of the third core layer via second and fourth intermediate layers respectively. The first/second/third/fourth/fifth layer thickness ratio was about 10:47:9:10:24.

In Examples 109–114, each film was made using equipment and process conditions similar to those for Ex. 104–106 except as noted below. The die temperature profile was set from about 320° F. to 345° F. (160–174° C.) and a flattened primary tube of about 3⅛–3½ inches (7.9–8.9 cm) flatwidth was produced with a biaxially stretched flatwidth of about 13 inches. The M.D. draw ratio was about 4.8:1 and the T.D. bubble ratio was about 3.7:1 to 3.8:1.

For Ex. 109–115, the heat sealing layer is the first and inner layer of the film tube. Layer compositions are in Table 21 below. Percentages are based upon weight for the indicated layer. Referring to Table 24, the materials are as described for Examples 85–107 above, but the stabilizer used was Techmer PM 11505E125. The processing aid and the slip/processing aid used in Examples 109–114 were Ampacet 101233 and 101237, respectively, from Ampacet Corp. of Tarrytown, N.Y., U.S.A.

The multilayer films of Examples 109–114 were irradiated after orientation by electron beam to a level in Table 24 and their properties tested and reported in Table 25.

TABLE 24

| Ex. No. | First Layer (Inner) | Second Layer | Third Layer (core) | Fourth Layer | Fifth Layer (Outer) | Irradiated Mrad |
|---|---|---|---|---|---|---|
| 109 | 100% $C_3C_2$ | 58.75% EAO $A_4$ + 18% EAO $B_1$<br>18% EVA<br>3.25% Proc. Aid<br>2% Stabilizer | 72.15% vdc-ma<br>25.35% vdc-vc<br>2.5% PC additive | 60% EAO $A_4$<br>18% EAO $B_1$<br>18% EVA<br>4% slip/proc. aid | 60% EAO $A_4$<br>18% EAO $B_1$<br>18% EVA<br>4% slip/proc. aid | 5 |
| 110 | 100% $C_3C_2$ | 38.75% EAO $A_4$<br>38% EAO $B_1$<br>18% EVA<br>3.25% Proc. Aid + 2% Stab. | 72.15% vdc-ma<br>25.35% vdc-vc<br>2.5% PC additive | 40% EAO $A_4$<br>38% EAO $B_1$<br>18% EVA<br>4% slip/proc. aid | 40% EAO $A_4$<br>38% EAO $B_1$<br>18% EVA<br>4% slip/proc. aid | 5 |
| 111 | 100% $C_3C_2$ | 46% EAO $B_1$<br>30.75% EAO $C_6$<br>18% EVA<br>3.25% Proc. Aid + 2% Stab. | 72.15% vdc-ma<br>25.35% vdc-vc<br>2.5% PC additive | 48% EAO $B_1$<br>30% EAO $C_6$<br>18% EVA<br>4% slip/proc. aid | 48% EAO $B_1$<br>30% EAO $C_6$<br>18% EVA<br>4% slip/proc. aid | 5 |
| 112 | 100% $C_3C_2$ | 54% EAO $B_1$<br>15.75% EAO $C_6$<br>25% EVA<br>3.25% Proc. Aid + 2% Stab. | 72.15% vdc-ma<br>25.35% vdc-vc<br>2.5% PC additive | 56% EAO $B_1$<br>15% EAO $C_6$<br>25% EVA<br>4% slip/proc. aid | 56% EAO $B_1$<br>15% EAO $C_6$<br>25% EVA<br>4% slip/proc. aid | 5 |
| 113 | 100% $C_3C_2$ | 33% EAO $A_4$<br>23% EAO $B_1$<br>38.75% EVA<br>3.25% Proc. Aid + 2% Stab. | 72.15% vdc-ma<br>25.35% vdc-vc<br>2.5% PC additive | 33% EAO $A_4$<br>25% EAO $B_1$<br>38% EVA<br>4% slip/proc. aid | 33% EAO $A_4$<br>25% EAO $B_1$<br>38% EVA<br>4% slip/proc. aid | 5 |

TABLE 24-continued

| Ex. No. | First Layer (Inner) | Second Layer | Third Layer (core) | Fourth Layer | Fifth Layer (Outer) | Irradiated Mrad |
|---|---|---|---|---|---|---|
| 114 | 100% $C_3C_2$ | 46% EAO $A_4$<br>23% EAO $B_1$<br>25.75% EVA<br>3.25% Proc. Aid + 2% Stab. | 72.15% vdc-ma<br>25.35% vdc-vc<br>2.5% PC additive | 46% EAO $A_4$<br>25% EAO $B_1$<br>25% EVA<br>4% slip/proc. aid | 46% EAO $A_4$<br>25% EAO $B_1$<br>25% EVA<br>4% slip/proc. aid | 5 |
| 115 | 70% $C_3C_2$<br>30% LLDPE | 58.75% EAO $A_4$ + 18% EAO $B_1$<br>18% EVA<br>3.25% Proc. Aid<br>2% Stabilizer | 72.15% vdc-ma<br>25.35% vdc-vc<br>2.5% PC additive | 60% EAO $A_4$<br>18% EAO $B_2$<br>18% EVA<br>4% slip/proc. aid | 60% EAO $A_4$<br>18% EAO $B_2$<br>18% EVA<br>4% slip/proc. aid | 5 |

TABLE 25

| EX. NO. | AVG. GAUGE mil ($\mu$) | RAM PUNCTURE | | | Hot Water Puncture seconds (microns) | SHRINK at 90° C. % MD/TD | HAZE % | GLOSS at 45° Hunter Units |
|---|---|---|---|---|---|---|---|---|
| | | Force Newton | Energy Joule | Stress MPa | | | | |
| 109 | 2.53 (64) | 132 | 1.27 | 311 | 120+† (76) | 40/46 | 9.4 | 80 |
| 110 | 2.52 (64) | 132 | 1.16 | 296 | 120+†† (80) | 34/42 | 7.7 | 82 |
| 111 | 2.69 (68) | 97 | 0.82 | 238 | 49 (80) | 39/43 | 8.4 | 79 |
| 112 | 2.64 (67) | 102 | 0.81 | 267 | 72††† (76) | 34/42 | 10.7 | 78 |
| 113 | 2.71 (69) | 124 | 1.12 | 297 | 120+‡ (73) | 38/44 | 7.8 | 81 |
| 114 | 2.56 (65) | 120 | 1.11 | 296 | 120+‡‡ (67) | 36/44 | 7.8 | 81 |

†= Reported value is average of 5 samples; average for 1 remaining samples was 113 seconds and 76$\mu$.
††= Reported value is average of 5 samples; average for 1 remaining samples was 89 seconds and 79$\mu$.
†††= Reported value is average of 4 samples; average for 2 remaining samples was 120+ seconds and 80$\mu$.
‡= Reported value is average of 4 samples; average for 2 remaining samples was 69 seconds and 76$\mu$.
‡‡= Reported value is average of 4 samples; average for 2 remaining samples was 67 seconds and 65$\mu$.

Referring now to Tables 24–25, Examples 109–114 all present physical property values which are acceptable for food packaging films which are commercially useful for packaging articles e.g. fresh or processed meats. The resultant biaxially oriented films of Examples 109–114 all had excellent shrinkage values at 90° C. Inventive films of Examples 109–115 are particularly well suited for use for cook-in films and in very demanding post-cooking pasteurization applications where films are used to encase food products which are then subjected to surface pasteurization as well as shrinking operations, shipment and retail sale.

The Ram Puncture Maximum Force, Total Energy Absorbed, and Stress values were outstanding for all films of the invention and greatly superior to the comparative films of Examples 107 and 108 (see Table 22). The inventive films of the embodiments of Examples 109–114 had a combination of excellent properties for use in a variety of film applications including use in demanding cook-in and post-cooking pasteurization processing and packaging applications. The inventive films of examples 104–106 had a very high resistance to puncture at room temperature as particularly demonstrated by the ram maximum puncture force values and the total energy absorbed. Hot water puncture resistance values for Examples 109–114 were all very good being better than comparative Ex. 108; and inventive examples 109, 110, 113, and 114 were comparable to comparative Ex. 107.

The shrinkage values at 90° C. for the inventive films were all greatly increased over both comparative films in both the machine and transverse directions. Haze was excellent and low. Gloss was excellent and high. The films had an excellent appearance.

While this invention has been described with reference to certain specific embodiments, it will be recognized by those skilled in the art that many variations are possible without departing from the scope and spirit of the invention.

What is claimed is:

1. A flexible, biaxially stretched, heat shrinkable polymeric film having at least one layer comprising a blend of at least three copolymers comprising:

20 to 85 weight percent of a first polymer having a melting point of 80 to 98° C. comprising at least one copolymer of ethylene and hexene-1;

5 to 35 weight percent of a second polymer having a melting point of 115 to 128° C. comprising at least one copolymer of ethylene and at least one α-olefin; and 10 to 50 weight percent of a third polymer having a melting point of 60 to 110° C. comprising at least one copolymer of ethylene and a vinyl ester, an alkyl acrylate, acrylic acid, or methacrylic acid; wherein said first and second polymers have a combined weight percentage of at least 50 weight percent, said weight percentage being based upon the total weight of said first, second and third polymers; and wherein said film has a maximum ram puncture force of at least 70 Newtons, a ram puncture stress of at least 110 MPa, and a tear propagation strength "x" such that $10 \leq x \leq 40$ grams per mil in each of the machine and transverse directions or x<25 grams per mil in at least one of the machine and transverse directions.

2. A film, as defined in claim 1, wherein said first polymer has a melting point of 80 to 92° C.

3. A film, as defined in claim 1, wherein said first polymer is a bipolymer.

4. A film, as defined in claim 1, wherein said first polymer is a terpolymer of: ethylene, butene-1 and hexene-1 or ethylene, hexene-1, octene-1.

5. A film, as defined in claim 1, wherein said second polymer comprises a copolymer of ethylene and octene-1.

6. A film, as defined in claim 1, wherein said third polymer is selected from the group consisting of ethylene vinyl acetate copolymer, ethylene methylacrylate copolymer, ethylene butylacrylate copolymer, ethylene ethylacrylate copolymer, ethylene acrylic acid copolymer, and ethylene methacrylic acid copolymer.

7. A film, as defined in claim 1, wherein said third polymer comprises a copolymer of ethylene and vinyl acetate.

8. A film, as defined in claim 1, further comprising a fourth polymer having a melting point of 80 to 110° C.

9. A film, as defined in claim 1, having a haze value of less than 10%.

10. A film, as defined in claim 1, wherein said film has a tear propagation strength of 15 to 25 g/mil in at least one of the machine and transverse directions.

11. A film, as defined in claim 1, wherein said film has a shrinkage value at 90° C. of at least 45% in at least one of the machine and transverse directions.

12. A film, as defined in claim 1, wherein said film has a total energy at maximum puncture force of at least 0.60 Joule.

13. A film, as defined in claim 1, wherein said film has a total energy at maximum puncture force of at least 0.90 Joule.

14. A film, as defined in claim 1, wherein said film has a maximum ram puncture force of at least 90 Newtons.

15. A film, as defined in claim 1, wherein said film has a maximum ram puncture force of at least 100 Newtons.

16. A film, as defined in claim 1, wherein said film has a maximum ram puncture force of at least 110 Newtons.

17. A film, as defined in claim 1, wherein said film has a ram puncture stress of at least 140 MPa.

18. A film, as defined in claim 1, wherein said first polymer has a $\overline{M}_w/\overline{M}_n$ of 1.5 to 3.0.

19. A film, as defined in claim 1, wherein said first polymer has a $\overline{M}_w/\overline{M}_n$ of 2.2 to 2.6.

20. A film, as defined in claim 1, wherein said first polymer has a melt index of 1.5 to 3.0 dg/min.

21. A film, as defined in claim 1, wherein said first polymer has a melt index of 0.3 to 1.5 dg/min.

22. A film, as defined in claim 1, further comprising at least three additional polymeric layers.

23. A film, as defined in claim 1, wherein said layer comprising a blend has been irradiatively crosslinked.

24. A film, as defined in claim 1, wherein said film forms a tube having an inner heat sealing layer comprising said blend.

25. A film, as defined in claim 1, wherein said film is fabricated into bags.

26. A film, as defined in claim 1, further comprising a gas barrier layer and said film has an oxygen transmission rate of less than 15 cc/100 in² for 24 hrs. at 1 atm.

27. A film, as defined in claim 1, wherein said blend comprises at least 50 percent by weight of said layer based on the total weight of the layer.

28. A film, as defined in claim 1, wherein said first polymer is present in an amount of 25 to 45 weight percent, based upon the total weight of the first, second and third polymers.

29. A film, as defined in claim 1, wherein said first polymer is present in an amount of 30 to 40 weight percent, based upon the total weight of the first, second and third polymers.

30. A film, as defined in claim 1, wherein said first polymer is present in an amount of 45 to 85 weight percent, based upon the total weight of the first, second and third polymers.

31. A film, as defined in claim 1, wherein at least one of said first, second, and third polymers comprises an interpolymer.

32. A film, as defined in claim 1, wherein at least one interpolymer comprises said first and second polymers.

33. A film, as defined in claim 22, wherein said film comprises:
a first heat sealing surface layer comprising a polymer selected from the group consisting of: (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm³;
a second intermediate layer,
a third core layer comprising at least 80% by weight, based on said third layer's weight, of at least one copolymer of vinylidene chloride with from 2 to 20 weight percent, based on said copolymer's weight, of vinyl chloride or methyl acrylate; and
a fourth surface layer;
wherein at least one of said second and said fourth layers comprise a blend of at least three copolymers comprising:
20 to 85 weight percent of a first polymer having a melting point of 80 to 98° C. comprising at least one copolymer of ethylene and hexene-1;
5 to 35 weight percent of a second polymer having a melting point of 115 to 128° C. comprising at least one copolymer of ethylene and at least one α-olefin; and
10 to 50 weight percent of a third polymer having a melting point of 60 to 110° C. comprising at least one copolymer of ethylene and a vinyl ester, an alkyl acrylate, acrylic acid, or methacrylic acid; wherein said first and second polymers have a combined weight percentage of at least 50 weight percent, said weight percentage being based upon the total weight of said first, second and third polymers; and wherein said film has a maximum ram puncture force of at least 70 Newtons, a ram puncture stress of at least 110 MPa, and a tear propagation strength "x" such that $10 \leq x \leq 40$ grams per mil in each of the machine and transverse directions or x<25 grams per mil in at least one of the machine and transverse directions; and said core layer is disposed between said second and said fourth layers.

34. A film, as defined in claim 33, wherein said film has a shrinkage value at 90° C. of at least 40% in at least one of the machine and transverse directions.

35. A film, as defined in claim 33 or 34, wherein said film has a tensile seal strength of at least 400 g/cm at 88° C.

36. A film, as defined in claim 33, wherein said film has a tensile seal strength of at least 600 g/cm at 88° C.

37. A film, as defined in claim 33 or 34, wherein said film has a hot water puncture resistance value of at least 40 seconds at 95° C.

38. A film, as defined in claim 33, wherein said film has a hot water puncture resistance value of at least 100 seconds at 95° C.

39. A film, as defined in claim 33 or 34, wherein said film has an average hot water seal strength of at least 200 seconds at 95° C.

40. A film, as defined in claim 33 or 34, wherein said film has an average hot water seal strength of at least 300 seconds at 95° C.

41. A film, as defined in claim 1 or 33, wherein said film has a ram puncture stress of at least 275 MPa.

42. A film, as defined in claim 33, wherein said melting point of said first heat sealing surface layer polymer (b) is at least 115° C.

43. A biaxially stretched, heat shrinkable film comprising at least three layers, a first layer comprising a blend of at least three polymers comprising: a first polymer having a melting point of 80 to 98° C. comprising a copolymer of ethylene and hexene-1; a second polymer having a melting point of 115 to 128° C. comprising a copolymer of ethylene and at least one α-olefin; a third polymer having a melting point of 60 to 110° C. comprising a copolymer ethylene and a vinyl ester or alkyl acrylate; a third layer comprising at least 50 percent by weight of copolymer of ethylene with at least one alpha-olefin or at least one vinyl ester or blends thereof, and a second layer comprising a vinylidene chloride copolymer, a nylon or a copolymer of ethylene with a vinyl alcohol; said film having a ram puncture force of at least 70 Newtons, a ram puncture stress of at least 110 MPa, and a tear propagation strength "x" such that 10≦x≦40 grams per mil in each of the machine and transverse directions or x<25 grams per mil in at least one of the machine and transverse directions.

44. A flexible, thermoplastic, biaxially stretched, heat shrinkable film having at least one layer comprising a blend of at least three copolymers comprising:
    45 to 85 weight percent of a first polymer having a melting point of 80 to 98° C. comprising at least one copolymer of ethylene and hexene-1;
    5 to 35 weight percent of a second polymer having a melting point of 115 to 128° C. comprising at least one copolymer of ethylene and at least one α-olefin; and
    10 to 50 weight percent of a third polymer having a melting point of 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers; and wherein said film has a maximum ram puncture force of at least 120 Newtons.

45. A film, as defined in claim 44, wherein said maximum ram puncture force is at least 150 Newtons.

46. A film, as defined in claim 44, wherein said maximum ram puncture force is at least 200 Newtons.

47. A film, as defined in claim 44, wherein said film has a total energy absorption of at least 1.20 Joules.

48. A film, as defined in claim 44, wherein said film has a total energy absorption of at least 1.50 Joules.

49. A film, as defined in claim 44, wherein said film has a total energy absorption of at least 2.0 Joules.

50. A film, as defined in claim 44, wherein said film has a maximum stress of at least 150 MPa.

51. A film, as defined in claim 44, wherein said film has a maximum stress of at least 275 MPa.

52. A film, as defined in claim 44, wherein at least one of said first, second, and third polymers comprises an interpolymer.

53. A film, as defined in claim 44, further comprising at least four additional thermoplastic layers.

54. A film, as defined in claim 44, wherein said film comprises:
    a first heat sealing surface layer comprising a polymer selected from the group consisting of: (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm$^3$;
    a second intermediate layer;
    a third core layer comprising at least 80% by weight, based on said third layer's weight, of at least one copolymer of vinylidene chloride with from 2 to 20 weight percent, based on said copolymer's weight, of vinyl chloride or methyl acrylate; and
    a fourth surface layer;
    wherein at least one of said second and said fourth layers comprise said blend of at least three copolymers, and said core layer is disposed between said second and said fourth layers.

55. A film, as defined in claim 54, wherein said film has a shrinkage value at 90° C. of at least 40% in at least one of the machine and transverse directions.

56. A film, as defined in claim 54 or 55, wherein said film has a tensile seal strength of at least 400 g/cm at 88° C.

57. A film, as defined in claim 54, wherein said film has a tensile seal strength of at least 600 g/cm at 88° C.

58. A film, as defined in claim 54 or 55, wherein said film has a hot water puncture resistance value of at least 40 seconds at 95° C.

59. A film, as defined in claim 54, wherein said film has a hot water puncture resistance value of at least 100 seconds at 95° C.

60. A film, as defined in claim 54 or 55, wherein said film has an average hot water seal strength of at least 200 seconds at 95° C.

61. A film, as defined in claim 54 or 55, wherein said film has an average hot water seal strength of at least 300 seconds at 95° C.

62. A film, as defined in claim 54, wherein said film has a ram puncture stress of at least 275 MPa.

63. A film, as defined in claim 54, wherein said melting point of said first heat sealing surface layer polymer (b) is at least 115° C.

64. A biaxially stretched, heat shrinkable film comprising at least three layers, wherein said first layer comprises a blend of at least three polymers comprising: a first polymer having a melting point of 80 to 98° C. comprising a copolymer of ethylene and hexene-1; a second polymer having a melting point of 115 to 128° C. comprising a copolymer of ethylene and at least one α-olefin; a third polymer having a melting point of 60 to 11° C. comprising a copolymer ethylene and a vinyl ester or alkyl acrylate; a third layer comprising at least 50 percent by weight of copolymer of ethylene with at least one alpha-olefin or at least one vinyl ester or blends thereof, and a second layer between said first and third layers; said second layer comprising a vinylidene chloride copolymer, a nylon or a copolymer of ethylene with a vinyl alcohol; said film having a maximum ram puncture force of at least 120 Newtons, and a total energy absorption of at least 1.20 Joules.

65. A film, as defined in claim 64, wherein said maximum ram puncture force is at least 150 Newtons.

66. A film, as defined in claim 64, wherein said maximum ram puncture force is at least 200 Newtons.

67. A film, as defined in claim 64, wherein said film has a total energy absorption of at least 1.50 Joules.

68. A film, as defined in claim 64, wherein said film has a total energy absorption of at least 2.0 Joules.

69. A film, as defined in claim 64, wherein at least one of said first, second, and third polymers comprises an interpolymer.

70. A film, as defined in claim 64, wherein at least one interpolymer comprises said first and second polymers.

71. A film, as defined in claim 64, wherein said first layer is a surface heat sealing layer.

72. A polymer blend of at least three copolymers consisting essentially of:
   20 to 85 weight percent of a first polymer having a melting point of 80 to 98° C. comprising at least one copolymer of ethylene and hexene-1:
   5 to 35 weight percent of a second polymer having a melting point of 115 to 128° C. comprising at least one copolymer of ethylene and at least one α-olefin:
   10 to 50 weight percent of a third polymer having a melting point of 60 to 110° C. comprising at least one copolymer of ethylene and a vinyl ester or an alkyl acrylate;
   wherein said first and second polymers have a combined weight percentage of at least 50 weight percent, said weight percentage being based upon the total weight of said first, second and third polymers; and
   wherein at least one of said first, second, and third polymers comprises an interpolymer.

73. A blend, as defined in claim 72, wherein said first and second polymers comprises an interpolymer.

74. A flexible film, wherein said film comprises:
   a heat sealing surface layer comprising a polymer selected from the group consisting of: (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm$^3$;
   an intermediate layer;
   a core layer;
   an outer protective surface layer;
   wherein at least one of said intermediate and said outer protective layers comprise a polymer blend of at least three copolymers consisting essentially of:
   20 to 85 weight percent of a first polymer having a melting point of 80 to 98° C. comprising at least one copolymer of ethylene and hexane-1;

5 to 35 weight percent of a second polymer having a melting point of 115 of 128° C. comprising at least one copolymer of ethylene and at least one α-olefin;
   10 to 50 weight percent of a third polymer having a melting point of 60 to 110° C. comprising at least one copolymer of ethylene and a vinyl ester or an alkyl acrylate;
   wherein said first and second polymers have a combined weight percentage of at least 50 weight percent, said weight percentage being based upon the total weight of said first, second and third polymers; and said core layer is disposed between said intermediate and said outer protective layers, and said film has a hot water seal strength of at least 200 seconds at 95° C.

75. A process for making biaxially stretched, heat shrinkable film comprising:
   extruding a melt plastified primary tube comprising 20 to 85 weight percent of a first polymer having a melting point of 80 to 98° C. comprising at least one copolymer of ethylene and hexene-1;
   5 to 35 weight percent of a second polymer having a melting point of 115 to 128° C. comprising at least one copolymer of ethylene and at least one α-olefin; and
   10 to 50 weight percent of a third polymer having a melting point of 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers;
   cooling said primary tube;
   reheating said cooled tube to a draw point temperature of 68 to 88° C.;
   biaxially stretching said tube to provide a transverse direction circumference of at least 2½ times the circumference of said primary tube and a machine direction length of at least 2½ times the length of a corresponding segment of said primary tube, and cooling said biaxially stretched tube to form a biaxially stretched, heat shrinkable film having a film thickness less than 10 mil (254 microns), wherein said resultant film has a ram puncture force of at least 70 Newtons, a ram puncture stress of at least 110 MPa, and a tear propagation strength "x" such that $10 \leq x \leq 40$ grams per mil in each of the machine and transverse directions or x<25 grams per mil in at least one of the machine and transverse directions.

76. A process for making biaxially stretched, heat shrinkable film comprising:
   extruding a melt plastified primary tube comprising 20 to 85 weight percent of a first polymer having a melting point of 80 to 98° C. comprising at least one copolymer of ethylene and hexene-1;
   5 to 35 weight percent of a second polymer having a melting point of 115 to 128° C. comprising at least one copolymer of ethylene and at least one α-olefin; and
   10 to 50 weight percent of a third polymer having a melting point of 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers;
   cooling said primary tube;
   reheating said cooled tube to a draw point temperature of 68 to 88° C.;

biaxially stretching said tube to provide a transverse direction circumference of at least 2½ times the circumference of said primary tube and a machine direction length of at least 2½ times the length of a corresponding segment of said primary tube, and cooling said biaxially stretched tube to form a biaxially stretched, heat shrinkable film having a film thickness less than 10 mil (254 microns), wherein said resultant film has a ram puncture force of at least 120 Newtons, and a total energy absorption of at least 1.20 Joules.

77. A process for making biaxially stretched, heat shrinkable film comprising a polymeric blend A comprising:

extruding a melt plastified primary tube comprising 20 to 85 weight percent of a first polymer having a melting point of 80 to 98° C. comprising at least one copolymer of ethylene and hexene-1;

5 to 35 weight percent of a second polymer having a melting point of 115 to 128° C. comprising at least one copolymer of ethylene and at least one α-olefin;

10 to 50 weight percent of a third polymer having a melting point of 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers;

cooling said primary tube;

reheating said cooled tube to a draw point temperature of 65 to 88° C.;

biaxially stretching said tube to provide a transverse direction circumference of at least 2½ times the circumference of said primary tube and a machine direction length of at least 2½ times the length of a corresponding segment of said primary tube, and cooling said biaxially stretched tube to form a biaxially stretched, heat shrinkable film having a film thickness less than 10 mil (254 microns);

wherein a multilayer primary tube is made by coextrusion or coating lamination and said resultant biaxially stretched film comprises:

a heat sealing surface layer comprising a polymer selected from the group consisting of: (a) at least 50% by weight of a copolymer of propene and at least one 0-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm³;

an intermediate layer;

a core layer comprising at least 80% by weight, based on said third layer's weight, of at least one copolymer of: EVOH; or vinylidene chloride with from 2 to 20 weight percent, based on said copolymer's weight, of vinyl chloride or methyl acrylate;

an outer protective surface layer;

wherein at least one of said intermediate and said outer protective layers comprise said polymeric blend A, and said core layer is disposed between said intermediate and said outer protective layers, and said film has a maximum ram puncture force of at least 100 Newtons, a hot water puncture resistance of at least 100 seconds at 95° C. and a hot water seal strength of at least 200 seconds at 95° C.

78. A biaxially stretched, heat shrinkable, multilayer film useful for food processing and packaging having at least four layers comprising:

a first heat sealing surface layer comprising a polymer or blend of polymers selected from the group consisting of: (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm³;

a second polymeric layer comprising (a) from 10 to 85 wt. % of a first copolymer of ethylene and at least one $C_3$–$C_8$ α-olefin, said first copolymer having a melting point of 55 to 98° C.; (b) from 5 to 60 wt. % of a second copolymer of ethylene and at least one $C_4$–$C_8$ α-olefin, said second copolymer having a melting point of 115° C. to 128° C., (c) from 0 to 50 wt. % of a third copolymer having a melting point of 60 to 110° C. of ethylene with a vinyl ester or alkyl acrylate, wherein said first and second copolymers have a combined weight percentage of at least 50 weight percent, said weight percent being based upon the total weight of said layer;

a third layer comprising at least 80% by weight, based on said third layer's weight, of at least one copolymer of vinylidene chloride with from 2 to 20 weight percent, based on said copolymer's weight, of vinyl chloride or methyl acrylate; and a fourth polymeric layer comprising (a) from 10 to 85 wt. % of a first copolymer of ethylene and at least one $C_3$–$C_8$ α-olefin, said first copolymer having a melting point of 55 to 98° C.; (b) from 5 to 60 wt. % a second copolymer of ethylene and at least one $C_4$–$C_8$ α-olefin, said second copolymer having a melting point of 115° C. to 128° C., and (c) from 0 to 50 wt. % of a third copolymer having a melting point of 60 to 110° C. of ethylene with a vinyl ester or alkyl acrylate, wherein said first and second copolymers have a combined weight percentage of at least 50 weight percent, said weight percent being based upon the total weight of said layer; and wherein said film has a shrinkage value at 90° C. of at least 40% in at least one of the machine and transverse directions and said film has a tensile seal strength of at least 400 g/cm at 88° C.

79. A film, as defined in claim 78, wherein said film has a maximum ram puncture force of at least 70 Newtons.

80. A film, as defined in claim 78, wherein said film has a maximum ram puncture force of at least 110 Newtons.

81. A film, as defined in claim 78, 79 or 80, wherein said film has a hot water puncture resistance of at least 20 seconds at 95° C.

82. A film, as defined in claim 78, wherein said film has a hot water puncture resistance of at least 40 seconds at 95° C.

83. A film, as defined in claim 78 or 79, wherein said film has a hot water puncture resistance of at least 60 seconds at 95° C.

84. A film, as defined in claim 78 or 80, wherein said film has a hot water puncture resistance of at least 100 seconds at 95° C.

85. A film, as defined in claim 78, 79 or 80, wherein said film has a hot water seal strength of at least 200 seconds at 95° C.

86. A film, as defined in claim 78, 79, or 80, wherein said film has a hot water seal strength of at least 300 seconds at 95° C.

87. A film, a s defined in claim 78, wherein said melting point of said first heat sealing surface layer polymer (b) is at least 115° C.

88. A film, as defined in claim 78, wherein said film has a thickness less than 175 microns.

89. A film, as defined in claim 78, wherein said film has a thickness between 50 to 150 microns.

90. A film, as defined in claim 78, wherein said film has a haze value of less than 10% and a gloss, at 45° of at least 70 Hunter units.

91. A film, as defined in claim 78, wherein said film has an oxygen transmission rate of less than 45 $cm^3/m^2$ for 24 hrs. at 1 atm. at 23° C.

92. A film, as defined in claim 78, wherein said first copolymer of at least one of said second and fourth layers has a density less than 0.900 $g/cm^3$.

93. A film, as defined in claim 78, wherein said first copolymer of both said second and fourth layers has a density less than 0.900 $g/cm^3$.

94. A film, as defined in claim 78, wherein said third copolymer of both said second and fourth layers comprises 4 to 18%, by weight of said copolymer, of a vinyl ester or alkyl acrylate.

95. A film, as defined in claim 78, wherein: (a) in at least one of said second and fourth polymeric layers said first copolymer comprises at least one copolymer having a melting point of 80 to 98° C. of ethylene and hexene-1 and is present in an amount of from 20 to 85 weight percent, based upon the weight of the layer containing said first copolymer and wherein (b) said second copolymer has a melting point of 115 to 128° C. and is present in an amount of 5 to 35 weight percent based upon the weight of the layer containing said second copolymer; and (c) said third polymer having a melting point of 60 to 110° C. is present in an amount of 10 to 50 weight percent, based upon the weight of the layer containing said third polymer.

96. A film, as defined in claim 78, wherein both of said second and fourth polymeric layers comprise:
(a) 20 to 85 weight percent of a first copolymer having a melting point of 80 to 98° C. comprising at least one copolymer of ethylene and hexene-1;
(b) 5 to 35 weight percent of a said second copolymer having a melting point of 115 to 128° C.; and
(c) 10 to 50 weight percent of said third polymer having a melting point of 60 to 110° C.

97. A film, a s defined in claim 42, 63, or 87, wherein said melting point of said first heat sealing surface layer polymer (b) is at least 115° C.

98. A film, as defined in claim 95 or 96, wherein said copolymer of ethylene and hexene-1 is present in an amount of 45 to 85 wt. %.

99. A film, as defined in claim 95 or 96, wherein said copolymer of ethylene, and hexene-1 is present in an amount of 20 to 45 wt. %.

100. A polymer blend of at least three copolymers comprising:
20 to 85 weight percent of a first polymer having a melting point of 80 to 98° C. comprising at least one copolymer of ethylene and hexene-1;
5 to 35 weight percent of a second polymer having a melting point of 115 of 128° C. comprising at least one copolymer of ethylene and at least one α-olefin; and
10 to 50 weight percent of a third polymer having a melting point of 60 to 110° C. comprising at least one copolymer of ethylene and a vinyl ester or an alkyl acrylate;
wherein said first and second polymers have a combined weight percentage of at least 50 weight percent, said weight percentage being based upon the total weight of said first, second and third polymers;
wherein at least one of said first, second, and third polymers comprises an interpolymer.

101. A blend, as defined in claim 100, wherein said first and second polymers comprises an interpolymer.

102. A flexible film comprising:
a heating sealing surface layer comprising a polymer selected from the group consisting of:
(a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof and said polymer having a melting point of at least 105° C. and a density of at least 0.900 $g/cm^3$;
an intermediate layer;
a core layer;
an outer protective surface layer;
wherein at least one of said intermediate and said outer protective layers comprise a polymer blend of at least three copolymers comprising:
20 to 85 weight percent of a first polymer having a melting point of 80 to 98° C. comprising at least one copolymer of ethylene and hexene-1;
5 to 35 weight percent of a second polymer having a melting point of 115 of 128° C. comprising at least one copolymer of ethylene and at least one α-olefin; and
10 to 50 weight percent of a third polymer having a melting point of 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers; and
said core layer is disposed between said intermediate and said outer protective layers, and said film has a hot water seal strength of at least 200 seconds at 95° C.

103. A process for making biaxially stretched, heat shrinkable film comprising:
extruding a melt plastified primary tube comprising a polymeric blend A comprising 20 to 85 weight percent of a first polymer having a melting point of 80 to 98° C. comprising at least one copolymer of ethylene and hexene-1;
5 to 35 weight percent of a second polymer having a melting point of 115 to 128° C. comprising at least one copolymer of ethylene and at least one α-olefin; and
10 to 50 weight percent of a third polymer having a melting point of 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers;

cooling said primary tube;

reheating said cooled tube to a draw point temperature of 65 to 88° C.;

biaxially stretching said tube to provide a transverse direction circumference of at least 2½ times the circumference of said primary tube and a machine direction length of at least 2½ times the length of a corresponding segment of said primary tube, and cooling said biaxially stretched tube to form a biaxially stretched, heat shrinkable film having a film thickness less than 10 mil (254 microns), wherein said resultant film has a ram puncture force of at least 70 Newtons, a ram puncture stress of at least 110 Mpa, and a tear propagation strength "x" such that 10≦x≦40 grams per mil in each of the machine and transverse directions or x<25 grams per mil in at least one of the machine and transverse directions.

104. A process for making biaxially stretched, heat shrinkable film comprising:

extruding a melt plastified primary tube comprising a polymeric blend A comprising 20 to 85 weight percent of a first polymer having a melting point of 80 to 98° C. comprising at least one copolymer of ethylene and hexene-1;

5 to 35 weight percent of a second polymer having a melting point of 115 to 128° C. comprising at least one copolymer of ethylene and at least one α-olefin; and 10 to 50 weight percent of a third polymer having a melting point of 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers;

cooling said primary tube;

reheating said cooled tube to a draw point temperature of 65 to 88° C.;

biaxially stretching said tube to provide a transverse direction circumference of at least 2½ times the circumference of said primary tube and a machine direction length of at least 2½ times the length of a corresponding segment of said primary tube, and cooling said biaxially stretched tube to form a biaxially stretched, heat shrinkable film having a film thickness less than 10 mil (254 microns), wherein said resultant film has a ram puncture force of at least 120 Newtons, and a total energy absorption of at least 1.20 Joules.

105. A process for making biaxially stretched, heat shrinkable film comprising:

extruding a melt plastified primary tube comprising a polymeric blend A comprising 20 to 85 weight percent of a first polymer having a melting point of 80 to 98° C. comprising at least one copolymer of ethylene and hexene-1;

5 to 35 weight percent of a second polymer having a melting point of 115 to 128° C. comprising at least one copolymer of ethylene and at least one α-olefin; and 10 to 50 weight percent of a third polymer having a melting point of 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers;

cooling said primary tube;

reheating said cooled tube to a draw point temperature of 65 to 88° C.;

biaxially stretching said tube to provide a transverse direction circumference of at least 2½ times the circumference of said primary tube and a machine direction length of at least 2½ times the length of a corresponding segment of said primary tube, and cooling said biaxially stretched tube to form a biaxially stretched, heat shrinkable film having a film thickness less than 10 mil (254 microns), wherein a multilayer primary tube is made by coextrusion or coating lamination and said resultant biaxially stretched film comprises:

a heating sealing surface layer comprising a polymer selected from the group consisting of:

(a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof, said polymer having a melting point of at least 105° C. and a density of at least 0.900 g/cm$^3$;

an intermediate layer, a core layer comprising at least 80% by weight (based on said third layer's weight) of at least one copolymer of: EVOH; or vinylidene chloride with from 2 to 20 weight percent (based on said copolymer's weight) of vinyl chloride or methyl acrylate; and an outer protective surface layer;

wherein at lease one of said intermediate and said outer protective layers comprise said polymeric blend A and said core layer is disposed between said intermediate and said outer protective layers, and said film has a maximum ram puncture force of at least 100 Newtons, a hot water puncture resistance of at least 100 seconds at 95° C. and a hot water seal strength of at least 200 seconds at 95° C.

* * * * *

UNITED STATES PATENT AND TRADEMARK OFFICE
CERTIFICATE OF CORRECTION

PATENT NO. : 6,815,023 B1
APPLICATION NO. : 09/401692
DATED : November 9, 2004
INVENTOR(S) : Paul David Tatarka, Paul Nick Georgelos and Scott Allan Idlas It is certified that error appears in the above-identified patent and that said Letters Patent is hereby corrected as shown below:

Column 1, line 42, "meat Such" should read --meat. Such--.
Column 2, line 22, ""impulse")," should read --"impulse")--.
Column 5, line 27, "of an of" should read --of an--.
Column 9, line 7, "sale a foodstuff" should read --sale of a foodstuff--.
Column 10, line 64, "3.0 dg. min." should read --3.0 dg/min.--.
Column 11, line 44, "Exact SLX 9110" should read --EXACT SLX 9110--.
Column 13, line 1, "thermoplastic polymer;" should read --thermoplastic polymer,--; line 38, "weight Also," should read --weight. Also,--.
Column 14, line 64, ""Mermoplastic" should read --"Thermoplastic--.
Column 16, line 18, "ii)" should read --(ii)--.
Column 18, line 2, "ASTMD-1003-52" should read --ASTM D-1003-52--; line 47, "permit" should read --per mil--.
Column 21, line 24, "(drop hieght)." should read --(drop height).--; line 42, "$P_{max}=P_{max}/$, (2 nrT sin θ)" should read --$\sigma_{max}=P_{max}/(2 \pi rT \sin \theta)$--; line 43, "maximum force" should read --force--; line 45, "underformed" should read --undeformed--.
Column 22, line 44, "EAO-B," should read --EAO-$B_1$--.
Column 24, line 15, "1137SE118" should read --11378E118--; line 44, "respectivly." should read --respectively.--.
Column 30, line 1, "5.2:1. and" should read --5.2:1 and--.
Column 31, line 62, "EAO-$C_1$;" should read --EAO-$C_5$;--.
Column 33, line 12, "4.0% of an a" should read --4.0% of a--; line 59, "EAO-$B_4$ The" should read --EAO-$B_4$. The--.
Column 35, line 51, "18.0 wt %" should read --18.0 wt.%--; line 52, "(Techmer PM 11381E118), U.S.A.; and 4.0%" should read --(Techmer PM 11381E118); and 4.0%--.
Column 37, line 13, "made" should read --may--; line 21, "films." should read --films).--.
"TABLE 21" should read --TABLE 12--.
Column 43, line 3, "$3^5/_{16}$" should read --$3^{15}/_{16}$--; line 22, "ethyleneα-olefin" should read --ethylene-α-olefin--.
Column 44, line 5, "$PM_n$" should read --PM,--.
Table 14, example 89, under the column heading Fourth Layer, "42% EAO B2" should read --42% EAO $B_2$--; "20% BAO C1" should read --20% EAO $C_1$--.
Table 15, column heading, "SKRINK" should read --SHRINK--.
Column 45, line 51, "arid" should read --and--.
Column 46, line 20, "(132-146° C." should read --(132-146°C.)--.
Table 18, examples 96 - 99, under the column heading Second Layer, "39% EVA" should read --38% EVA--.
Table 18, examples 100 - 103, under the column heading Third Layer, "vdcvc" should read --vdc-vc--.

UNITED STATES PATENT AND TRADEMARK OFFICE
CERTIFICATE OF CORRECTION

PATENT NO. : 6,815,023 B1
APPLICATION NO. : 09/401692
DATED : November 9, 2004
INVENTOR(S) : Paul David Tatarka, Paul Nick Georgelos and Scott Allan Idlas It is certified that error appears in the above-identified patent and that said Letters Patent is hereby corrected as shown below:

Column 54, line 48, "excellent a" should read --excellent--; line 57, "29" should read --20--.
Column 55, line 12, "of a commercially" should read --of commercially--; line 27, "coextuusion" should read --coextrusion--.
Table 22, example 104, under the column headings RAM PUNCTURE and Force Newton, "139" should read --138--.
Table 23, example 105, under the column heading minimum temperature hot bar seal, "350 (177°C.)" should read --350° F. (177°C.)--.
Column 60, line 41, "level in Table 24" should read --level indicated in Table 24--.
Col. 66 Claim 64, line 67, "11° C." should read --110° C.--.
Col. 67 Claim 72, line 29, "hexene-1:" should read --hexene-1;--; line 32, "α-olefin:" should read --α-olefin;--.
Column 67, Claim 74, line 2, "115 of 128°" should read --115 to 128°--.
Column 69, Claim 77, line 44, "0-olefin" should read --α-olefin--.
Column 70, Claim 78, line 50, "directions and" should read --directions, and--.
Column 71, Claim 87, line 7, "A film, a s" should read --A film, as--.
Column 71, Claim 97, line 51, "A film, a s" should read --A film, as--.
Column 71, Claim 100, line 66, "115 of 128°" should read --115 to 128°--.
Column 72, Claim 102, line 39, "115 of 128°" should read --115 to 128°--.
Column 72, Claim 103, line 15, "Mpa" should read --MPa--.
Column 74, Claim 105, line 40, "layer," should read --layer;--; line 47, "lease" should read --least--.

Signed and Sealed this

Twenty-sixth Day of August, 2008

JON W. DUDAS
*Director of the United States Patent and Trademark Office*